INVENTORS.
COLIN D. MURDOCH
CHAD W. PENNEBAKER
BY
Wallace, Kinzer & Dorn
Attys.

Nov. 26, 1968 C. D. MURDOCH ET AL 3,413,624

AUTOMATIC MAGNETIC RECORDING AND PLAYBACK CONTROL SYSTEM FOR A KEYBOARD ACTUATED BUSINESS MACHINE

Filed Feb. 10, 1964 13 Sheets-Sheet 2

INVENTORS.
COLIN D. MURDOCH
CHAD W. PENNEBAKER
BY Wallace, Kinzer & Dorn
Attys.

INVENTORS.
COLIN D. MURDOCH
CHAD W. PENNEBAKER
BY Wallace, Kinzer & Dorn
ATTYS.

FIG. 5
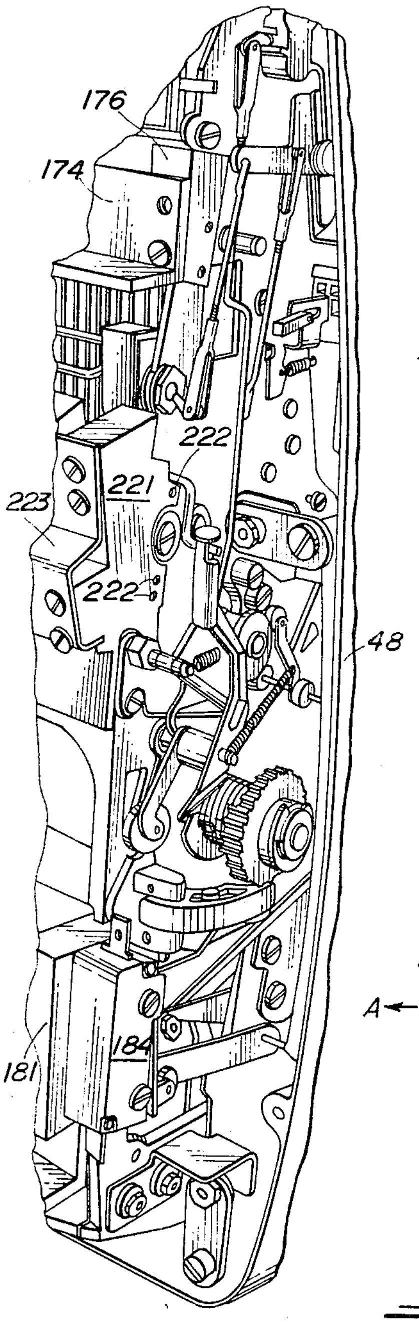
FIG. 6
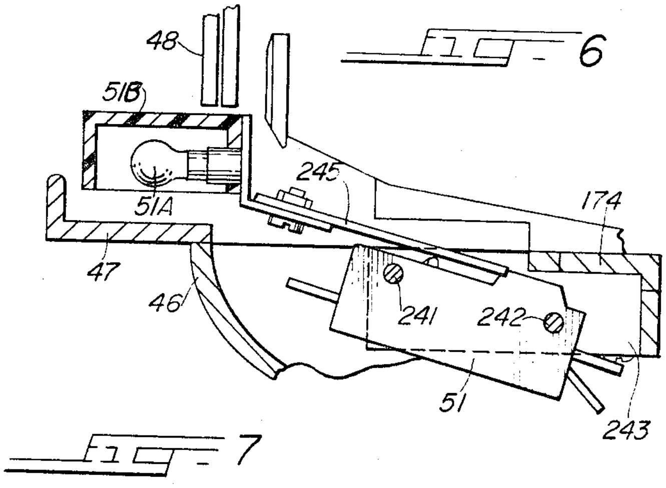
FIG. 7
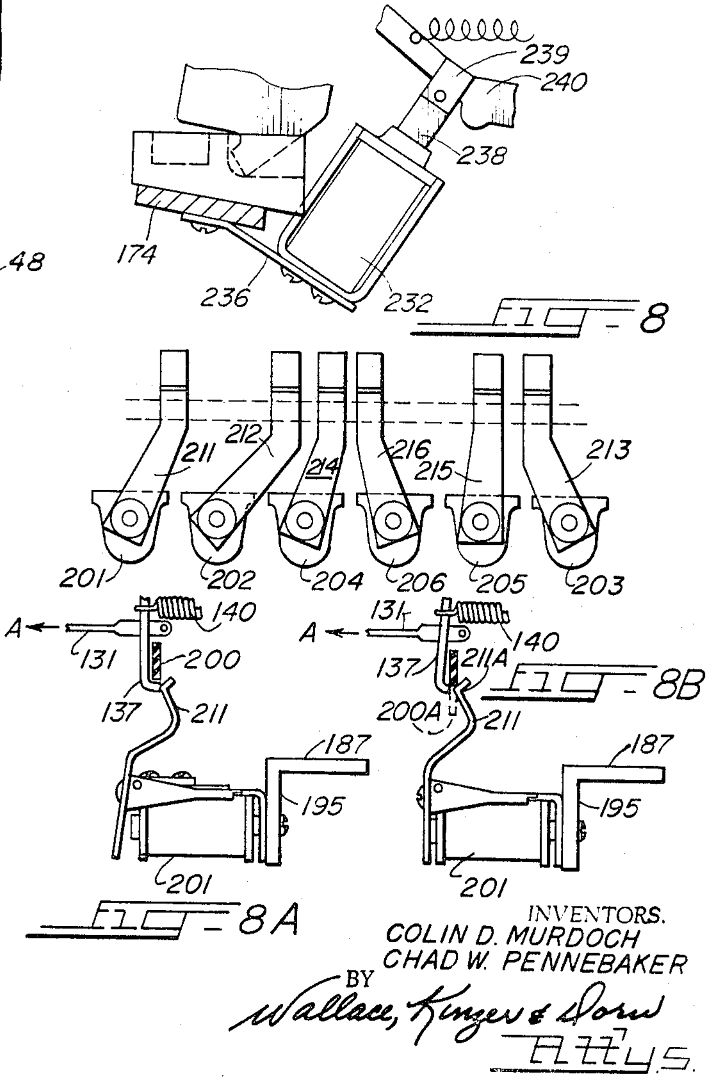
FIG. 8, FIG. 8B
FIG. 8A
INVENTORS.
COLIN D. MURDOCH
CHAD W. PENNEBAKER
BY Wallace, Kinzer & Dorn
Attys.

INVENTORS.
COLIN D. MURDOCH
CHAD W. PENNEBAKER
BY
Wallace, Kinzer & Dorn
Attys.

INVENTORS.
COLIN D. MURDOCH
CHAD W. PENNEBAKER
BY
Wallace, Kinzer & Dorn
Attys.

INVENTORS.
COLIN D. MURDOCH
CHAD W. PENNEBAKER
BY Wallace, Kinzer & Dorn
Attys

INVENTORS.
COLIN D. MURDOCH
CHAD W. PENNEBAKER
BY
Wallace, Kinzer & Dorn
Attys (ADDRESS MODIFICATION)

INVENTORS.
COLIN D. MURDOCH
CHAD W. PENNEBAKER
BY Wallace, Kinzer & Dorn
Attys.

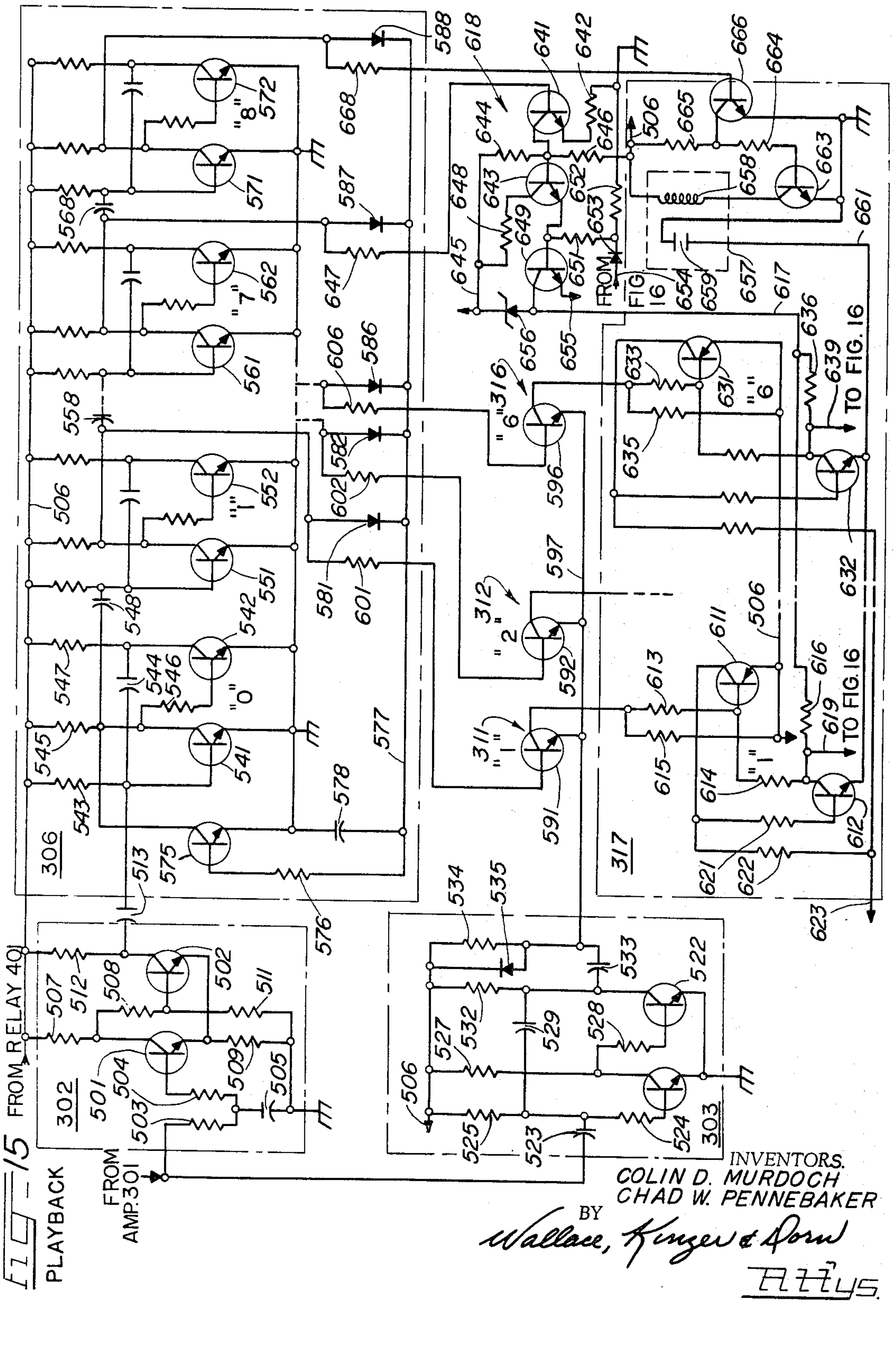
FIG-15 PLAYBACK
INVENTORS.
COLIN D. MURDOCH
CHAD W. PENNEBAKER
BY Wallace, Kinzer & Dorn
Attys.

INVENTORS.
COLIN D. MURDOCH
CHAD W. PENNEBAKER
BY Wallace, Kinzer & Dorn
ATTYS.

RECORD

INVENTORS.
COLIN D. MURDOCH
CHAD W. PENNEBAKER
BY Wallace, Kinzer & Dorn
Attys.

INVENTOR.
COLIN D. MURDOCH
CHAD W. PENNEBAKER
BY Wallace, Kinzer & Dorn
Attys.

United States Patent Office 3,413,624

Patented Nov. 26, 1968

3,413,624

AUTOMATIC MAGNETIC RECORDING AND PLAYBACK CONTROL SYSTEM FOR A KEYBOARD ACTUATED BUSINESS MACHINE

Colin D. Murdoch, Union City, and Chad W. Pennebaker, San Leandro, Calif., assignors of twenty percent to Chad W. Pennebaker, San Leandro, Calif., and eighty percent to Colin D. Murdoch, Union City, Calif.

Filed Feb. 10, 1964, Ser. No. 343,833
26 Claims. (Cl. 340—174.1)

ABSTRACT OF THE DISCLOSURE

An automatic recording and playback control system for a typewriter or other similar keyboard-actuated business machine including a plurality of character keys and function keys, including means for sensing the actuation of each of those keys and a storage register for temporary storage of code words identifying the keys as actuated. The system includes timing means for developing a predetermined sequence of individual timing signals each time a key is actuated. The code words representative of the actuated keys are recorded on a single track of a magnetic tape; an auxiliary track on the same tape records signals representative of carriage return and of the start of a message. The start-of-message code is initiated by a special key that begins recording operations. Correction circuits are provided for correcting errors in the recoding and provision is made for manual insertion of unrecorded data in the course of a playback operation to reproduce the recorded data. In one embodiment, two tapes are used, one with a principal message and the other with auxiliary data such as individual addresses and specific insertions for the body of the message, with automatic switching between the two tapes to reproduce a composite message. Blank spaces are provided on the tape, particularly at the start of each message and at the beginning of each message line, to facilitate correction, search, and other operations.

This invention relates to a new and improved system of automation for keyboard-controlled business machines. In particular, the invention pertains to a new and improved system for converting a conventional electric typewriter into an automatic recording typewriter of the kind sometimes referred to as a taping typewriter, and will be described in that connection; the invention, however, is applicable to other keyboard controlled machines, including bookkeeping and accounting machines, as will be apparent from the detailed description of the invention.

Automated typewriters of various kinds are well known in the art and have enjoyed a substantial degree of commercial acceptance. Perhaps the most successful automated typewriter systems have been those in which the necessary storage of data is maintained in the form of punched paper tape. In a taping typewriter utilizing punched paper tape, a tape punch is electrically or mechanically connected to and is actuated by the typewriter mechanism, punching a permanent tape record of the material typed in the course of a recording operation. Subsequently, the same punched tape may be fed to a tape reader that is also connected, electrically or mechanically, to the typewriter mechanism. The tape reader actuates the typewriter mechanism to reproduce copy identical with that which was typed in the course of the initial recording operation.

Another and somewhat similar system entails storage of data in large paper rolls somewhat similar to the rolls used in player pianos. Again, the message to be reproduced is recorded in the form of punched code apertures in the paper web, in this instance a relatively broad paper roll. Usually, the recording roll is punched on specialized equipment, as distinguished from the typewriter itself. The reproducing typewriter is provided with a mechanism for reading and interpreting the code apertures in the roll; this sensing mechanism is electrically or mechanically connected to the typewriter to cause the typewriter to reproduce the desired copy. At least one commercial version of this particular type of automated typing equipment utilizes pneumatic apparatus for sensing the code data on the punched paper record.

Automated typing equipment and other automated business machines that utilize punched paper tape or punched paper rolls as the storage medium present substantial difficulties with respect to the correction of mistakes. With a conventional punched-tape automated typewriter, an error on the part of the original recording typist can be corrected by typing a new punched-tape section and splicing this into the original tape. At best, this is a time-consuming and frequently difficult operation. Some systems provide a special error key to punch out all code positions in a special error code, partially alleviating this problem. The rather bulky rolls of tape produced in an automated system of this kind may present another difficulty; although they are reduced in volume as compared to the original typed material, they nevertheless require substantial storage space. Furthermore, the tape is not re-usable and represents a continuing expense item.

A number of proposals have been made for the automation of typewriters (and similar office equipment) using magnetic tape as the requisite recording medium. In general, however, equipment of this kind has not been commercially successful on smaller kinds of office machines such as typewriters and small bookkeeping machines. One problem presented by previously known magnetic tape automation systems for typewriters and similar equipment results from the generally erratic speed at which material is typed. Magnetic tape systems function best when the tape speed, during recording, is held essentially constant, since reading and interpretation of the magnetically recorded data requires that the tape move past the reading head at the same speed as it was moving when recording was accomplished. With some magnetic tape arrangements, erratic typing speeds may cause alternate bunching and stretch out of the recorded data, enhancing the possibilities of error in reproduction.

Another difficulty present in magnetic tape systems for office equipment automation pertains to the expense of the recording and reading apparatus. For complete recording of alpha-numeric data, together with the common symbols present on an ordinary typewriter, a six-bit code is required. But simultaneous recording of a six-bit code, using a magnetic tape, requires a relatively large expenditure with respect to a multiplicity of recording and reading heads or an equally large expenditure for suitable multiplexing equipment. These and other difficulties present in previously known magnetic tape systems have apparently prevented their general commercial adaptation, despite the fact that magnetic tape requires less storage space as compared with punched paper tape containing the same amount of data, and mady be re-used, whereas the paper tape cannot.

It is a principal object of the present invention, therefore, to provide a new and improved system of automation for typewriters, accounting machines, bookkeeping machines, and similar office equipment, that effectively eliminates or minimizes the above noted difficulties and disadvantages of prior art equipment.

Another object of the invention is to provide a new and improved automation system for typewriters and similar office equipment in which the storage medium employed is a magnetic tape, yet which affords effective operation regardless of variations in length of time between recording of consecutive characters without entailing unduly complex and expensive tape recording equipment.

A specific object of the invention is to provide a new and improved system for adapting a conventional electric typewriter to automated operation, utilizing a single track of ordinary magnetic tape as the principal recording medium for recording all essential typewritten or similar business data. A related object of the invention is to provide for a specialized recording of only a small number of particular functions on a second track, or in multiplexed relation on the initial track, of the magnetic tape.

Another object of the invention is to provide a magnetic tape automation system for typewriters and like office machines that permits continuous recording of data, at varying speeds, on a magnetic tape, yet provides for continuous playback of the recorded data at the maximum speed of operation for the automated machine. In particular, it is an object of the invention to permit playback with continuous constant-speed movement of the tape, despite the fact that the tape may have been stopped numerous times in the course of the recording operation.

An additional object of the invention is to protect a magnetic tape automation system for typewriters and like office equipment against errors due to switching transients and like noise signals, thereby permitting operation of the automated equipment over telephone lines and other connecting links without introducing errors into the transcribed material. This particular object of the invention is materially assisted by the form of recording used in the system, in which individual code bits are recorded as short bursts of high frequency signals, permitting effective discrimination with respect to switching transients and other momentary noise signals.

A further object of the invention is to afford a new and improved system for conversion of parallel code data to serial data, in a magnetic tape automation system for typewriters and like office machines, and a complementary system for the conversion of serial data from the tape to parallel data for operation of the machine in the print-out of recorded material.

A particular object of the invention is to afford a magnetic tape automation system for electrical typewriters and similar office equipment that permits the use of two storage tapes in a single print-out operation, and in alternation with each other, automatically, to afford an effective means for addressing letters individually, incorporating special inserts in letters or other materials, and like operations. A related object of the invention is to afford a new and improved switching system for switching between the outputs of the two storage tapes.

A general object of the invention is to provide a new and improved magnetic tape automation system for electric typewriters that can be effectively and conveniently applied to a specific typewriter without any modification of the actual typewriter structure, yet is applicable, in general, to a wide variety of different forms of typewriter apparatus.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 5 is a detail view of some of the operating mechanisms of the typewriter taken approximately as indicated by lines 5—5 in FIGS. 3 and 4, but shown in perspective;

FIG. 6 is a detail sectional view illustrating a typical control switch mounting for the typewriter, taken approximately along line 6—6 in FIG. 3;

FIG. 7 is a detail sectional view of the mounting of one operating solenoid within the typewriter;

FIGS. 8, 8A and 8B show the mechanical connections for certain operating solenoids within the typewriter;

FIG. 15 is a detail schematic diagram of some specific playback circuits that may be used in the system of the invention;

*General description*

Figure 1:
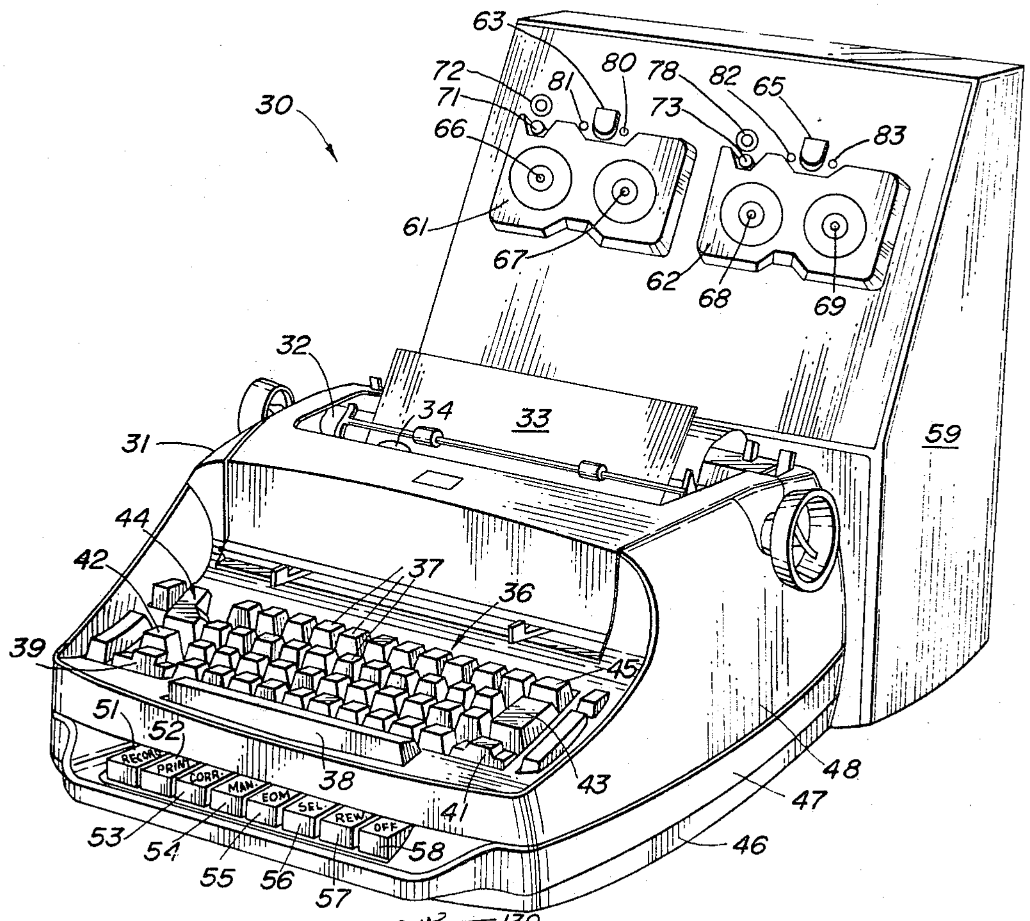
FIG. 1 is a perspective elevation view of an automated typewriter system constructed in accordance with one embodiment of the present invention.

FIG. 1 illustrates an automated taping typewriter system 30, utilizing a conventional typewriter 31, which accurately reproduces any material initially typed on the typewriter 31 in accordance with ordinary typing techniques. Typewriter 31 includes a roller platen 32 that receives the usual recording paper 33. The typewriter is of the kind described in Patent No. 2,919,002 to L. E. Palmer, in which each type impression is made by striking the paper 33 on the platen 32 with a particular limited portion of a multiple-character type matrix or type head 34. In this particular kind of typewriter there is no movement of the platen 32 in the course of typing of a given line. Rather, the type head 34 is moved stepwise from left to right, axially of platen 32, to the various character positions on the line. Type selection is effected by tilting and rotating the type matrix 34, prior to its impingment upon the recording sheet 33, for each character.

The keyboard 3 of typewriter 31 is essentially conventional. It includes the usual centralized array of character keys 37 with a space bar 38 located at the base of the keyboard. There are two shift keys 39 and 41 located at the opposite sides of the keyboard, at the front thereof; a shift lock key 42 is provided in association with shift key 39. A return key 43 is provided at the right-hand side of the keyboard; this return key controls the return movement of the type matrix 34. At the left-hand side of the machine, there is a tabulator key 44. At the right-hand side of the keyboard, the typewriter is provided with a back-space key 45. In addition, the keyboard includes the usual complement of margin set, margin release, tabulator set, tabulator clear, and other functional keys that do not affect the operation of the present system.

The only modification in the electric typewriter 31, in incorporating the typewriter into the system 30, is made at the base of the typewriter. Thus, an adapter 47 is interposed between the upper frame 48 of the typewriter and the base 46. The adapter 47 affords mounting space for a number of different sensing switches and operating devices, together with other components, as described in substantial detail hereinafter. For the purpose of a general description of the machine, it is sufficient to note that the adapter 47 encompasses sensing switches for sensing all of the typing functions occurring in normal operation of the typewriter and suitable operating mechanisms, usually solenoid operated, for causing the machine to perform these same functions.

In addition, the adapter 47 carries, at the front thereof, a plurality of control switches 51–58. The control switches are individually designated as Record switch 51, Print switch 52, Correct switch 53, Manual switch 54, End-of-mesage (EOM) switch 55, Select switch 56, Rewind switch 57, and Off switch 58.

The control switches 51 through 58, the sensing switches, and the operating solenoids are all electrically connected to a recording and control unit 59 that is positioned behind the typewriter 30. It should be noted that the adapted 47 and its operating components may be coupled to the recording and control unit 59 through a flexible cable of any desired length (not shown) so that the unit 59 may be positioned below the desk on which the typewriter 31 rests or in any other desired position, depending upon available space.

The recording and control unit 59 contains a number of different control circuits and operating mechanisms as described in detail hereinafter. At the front of the recording and control unit, there are two tape cartridges 61 and 62. Each of the two cartridges contains a conventional quarter-inch magnetic tape. The recording and control unit 59 is provided with a recording and reading head 63 arranged to cooperate with the tape in cartridge 61, referred to hereinafter as the first or main cartridge. Head 63 includes two record-read windings and a full width erase winding, as described more fully hereinafter. The recording and control unit 59 further includes a reading head 65 that cooperates with the tape within cartridge 62.

The main cartridge 61 is mounted upon a pair of operating spindles 66 and 67, each of which may be driven to provide rapid, gross movements of the tape within the cartridge. A similar pair of spindels 68 and 69 are provided for the tape within cartridge 62. A capstan 71 engages one end of the tape within the cartridge 61; the capstan 71 rotates continuously but does not move the tape unless the tape is engaged by an idler 72. Similarly, a continuously rotatable capstan 73 is positioned to cooperate with the tape within cartridge 62, driving the tape in cartridge 62 when that tape is engaged by an idler 78. Suitable means (not shown) are provided within the recording and control unit 59 for moving the idlers 72 and 78 into and out of engagement with the tapes of cartridges 61 and 62, respectively, to afford controlled movement of the tapes when required, as described more fully hereinafter. Guide posts 80–83 guide the tapes past their respective heads 63 and 65. The tape cartridges are described and claimed in the co-pending application of Colin D. Murdoch, Ser. No. 349,810, filed concurrently herewith, now Patent No. 3,282,523.

As in any magnetic tape system, it is usually desirable to afford some means for detecting the end of the tape. In control unit 59, the two guide posts 80 and 81 are of conducting, material. The tape in cartridge 61 is provided with a conductive backing, at its end, long enough to bridge the two guide posts and complete an electrical circuit. Thus, the two posts and the tape backing afford an effective end-of-tape sensing switch.

In the use of the typewriter system 30, conventional typing may be accomplished on typewriter 31 without using the automation system. Thus, if none of the control switches 51–58 are actuated, letters and like material can be typed on the typewriter 31 without recording any information in the magnetic tapes of the recording and control unit 59. The control unit and the adapter 47 do not interfere in any way with the ordinary functioning of the typewriter.

When it is desired to record material for future use, the typist depresses the Record switch 51 at the beginning of the recording operation. The Record switch and all of the remaining switches in the series are momentary-contact devices. Preferably, each is provided with a signal light to indicate the operating condition of the automatic typewriter system. Once the indicator light associated with Record switch 51 is on, showing that the system is ready to record, the typist types the material to be recorded on typewriter 31, including the usual spacing, punctuation, tabulator operations, and other functions, with no change from ordinary typing procedure. Each operation of the typewriter is sensed by the sensing switches incorporated in the adapter 47 and described in detail hereinafter. The information thus sensed is encoded and is recorded upon the magnetic tape in cartridge 61 in accordance with a serial code as described hereinafter.

In the course of the typing of a given letter or other document, the typist may reach a point at which it will subsequently be desirable to insert a specific date, name, or other information. At this point, the Manual switch 54 is depressed by the typist. This momentarily halts the recording operation and records a special manual code on the magnetic tape. The typist can insert desired data, at this time, without recording. Recording can then be continued merely by depressing the recording switch 51.

While the typist is preparing the recorded material, an error may, of course, occur. When this happens, the typist depresses the Correct switch 53. This causes the magnetic tape within cartridge 61 to return to the beginning of the line being type, and also returns type head 34 to the beginning of the line. The typist then retypes that line completely, erasing the previously recorded data for the line and recording the correct data. It is not necessary for the typist to actuate the Record switch 51 again in order to resume recording; the recording operation may be continued without interruption. The signal lamp associated with the Correct switch 53 gives a positive indication to the typist when the type head 34 has reached the beginning of the line and the re-typing operation for that line can be started. There is no necessity for recording any special "correct" symbol on the magnetic tape, since all of the erroneous material is completely erased in the course of the correction operation.

When the end of a letter or other document or message is reached, the typist depresses the End-of-Message (EOM) switch 55. Actuation of switch 55 automatically records a special end-of-message code on the magnetic tape. In addition, in the system as described hereinafter, actuation of this control switch automatically advances the magnetic tape in the cartridge 61 by a predetermined length to condition the system for recording of a subsequent letter or other message. Actuation of the EOM switch also shuts off all recording control circuits and leaves the typewriter in condition for ordinary non-automated operation, for a subsequent print-out, or for a record operation.

In some instances, it may be desirable to use the recorded data on the tape in cartridge 61 immediatedly. In other cases, it may be some time before it is necessary or desirable to utilize a letter or letters that have been recored on the tape. In the latter instance, the tape should be re-wound in the cartridge. If this has not been accomplished automatically, by actuation of the EOM switch 55, then the typist depresses switch 57, which rewinds the tape cartridge 61 to the beginning of the tape. The tape cartridge 61 can then be removed from the control unit 59 and stored until needed.

When it is desired to reproduce previously recorded material, the tape cartridge 61 containing the recorded data is placed in operative position on the control unit 59, as shown in FIG. 1. Assuming that it is desired to reproduce the first message on the tape, and that this message is complete in and of itself, it is only necessary for the typist to load the recording sheet 33 into the typewriter and then depress the Print switch 52. This causes the typewriter to reproduce the entire recorded message, without change or exception, including all tabulator movements, spacing movements, advance of the platen, and other operations effected by the typewriter 31 in making the original recording. When the magnetic tape reaches the EOM symbol, the system automatically interrupts the typing operation and rewinds the tape in the cartridge 61 to the beginning of the message. The typist can then remove the typed material from the typewriter, re-load with additional paper, and cause the system to type the same message or any other previously recorded message.

In the course of the printing operation, the occurrence of a manual code symbol on the magnetic tape interrupts the print-out procedure but does not rewind the tape. When this occurs, the typist can insert a date, name, or other specialized material into the message. The printing operation remains halted until the typist again depresses the Print key, following which typing of that portion of the message subsequent to the manual code is resumed.

A plurality of individual letters or other messages may be recorded on a single tape in the cartridge 61. The typist keeps a tally of the contents of the tape and the order in which various letters or other messages are recorded thereon. If it is desired to print out the second letter on the tape, the typist depresses the Select key 56 before starting the print-out operation. The control and recording unit 59 then searches the tape for the end of the first letter and stops the search as soon as it reaches the beginning of the second message. A similar technique is employed to reach any letter or other message on the tape for print-out purposes.

The second or auxiliary tape cartridge 62 is not required for the basic operation of the system but represents an advantageous modification, described in detail hereinafter, for multiple mailings of a single letter. Thus, where a letter is to be sent to each person on an address list, the mailing addresses are recorded individually on the magnetic tape in cartridge 62, ending each address with a Manual code rather than an EOM code. This recording operation is effected with the cartridge 62 mounted in the position shown for cartridge 61.The resulting auxiliary or address tape in cartridge 62 is then mounted in the control unit 59 in the position shown in FIG. 1. For printing, the control unit is arranged automatically to reproduce one address from tape 62 at the beginning of each reproduced message, the address being taken in sequence. This modification of the invention is discussed in detail hereinafter in connection with FIG. 13.

The remaining control switch 58 of the adapter unit 47 is provided only for emergency use. Switch 58 is effective to stop any cycle of operation of the equipment when desired by the typist.

*The typewriter character selection mechanism*

Figure 2:
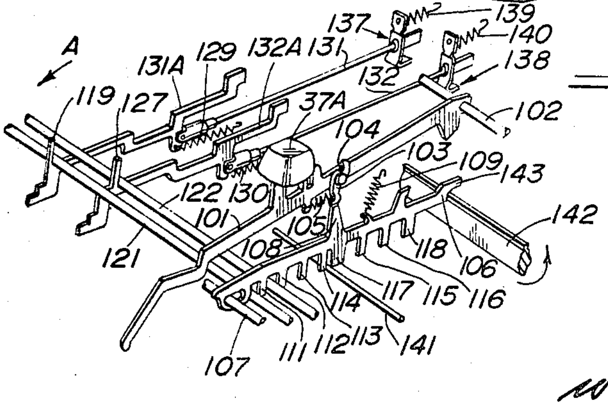
FIG. 2 is an exploded perspective view of the character key mechanism employed in the typewriter illustrated in FIG. 1.

Before considering the sensing, control and operating mechanisms that constitute the automation system of the present invention, it will be useful to review briefly the character selection mechanism of typewriter 31. As shown in the exploded perspective view of FIG. 2, each of the character keys of the typewriter, such as key 37A, is mounted upon a keylever 101 that is pivotally mounted upon a fulcrum rod 102 extending transversely of the rear portion of the typewriter. The typewriter is provided with suitable means for limiting vertical movements of the keylevers and with a guide comb to maintain the keylevers in alignment in the typewriter. As shown in FIG. 2, each of the keylevers 101 carries keylever pawl 103, the pawl being pivotally mounted upon its keylever by suitable means such as a shoulder rivet 104. The pawl 103 extends downwardly from the keylever 101 and normally is maintained in the position shown in FIG. 2 by means of a small spring 105.

Each keylever, such as the keylever 101 of FIG. 2, has a selector member or interposer 106 mounted below the keylever and in alignment with the keylever pawl. Each of the interposers 106 is provided with an elongated aperture at the forward end of the interposer, the left-hand end as seen in FIG. 2; a fulcrum rod 107 passes through these apertures in the interposers to afford a support upon which the interposers can pivot. The elongated apertures in the interposers also permit sliding movement of the interposers with respect to the fulcrum rod 107. As in the case of the keylevers, a suitable guide comb (not shown) is provided in the typewriter for the interposers.

The interposers 106 are the basic selector elements that control the rotational and tilting movement of the type head 34 (FIG. 1) and thus control the selection of characters in a typing operation. Each interposer is provided with an upwardly extending lug 108 that is engaged by the depending keylever pawl 103 on the associated keylever. A spring 109 holds the interposer in its normal position.

On the bottom of each interposer, there may be as many as eight individual lugs, 111, 112, 113, 114, 115, 116, 117 and 118. The lugs 111–116 are employed for character selection and the presence or absence of these lugs on an individual interposer afford a distinctive combination that identifies a given character location on the type head. Each of the interposers is provided with a lug at position 117 to control a machine cycle in the typewriter as described hereinafter. The final lug position, as shown by lug 118, is employed only for special applications of the typewriter and has no direct bearing upon the present invention.

The individual character selection lugs 111–116 are positioned to engage a corresponding series of six selector bails or rods, of which only two rods 121 and 122 are shown in FIG. 2. The selector rods are movable, in the direction indicated by the arrow A, in response to corresponding movements of those interposers bearing lugs positioned to engage the rods. Each of the selector rods is engaged by a lug on a latch interposer. Thus, selector rod 121 is engaged by an upwardly extending lug 119 on a latch interposer 131A; similarly, the lug 127 on a latch interposer 132A engages the selector bail 122. The latch interposers 131A and 132A are normally maintained in the positions illustrated in FIG. 2 by suitable springs 129 and 130, respectively, but are slidable forwardly and rearwardly of the keyboard mechanism in response to corresponding movements of the associated selector bails.

The latch interposer 131A is connected by a connecting rod 131 to a selector latch mechanism 137. Similarly, a connecting rod 132 connects the second interposer 132A to a suitable selector latch 138. By reference to FIGS. 3 and 4, it will be seen that there are additional interposers 133A, 134A, 135A and 136A, and additional connector rods 133, 134, 135 and 136, one corresponding to each of the selector bails 121–126.

In the keyboard mechanism of the typewriter, there is a cycle bail or rod 141 that extends transversely of the keyboard and that is aligned with the cycle lugs 117 on each of the character selection interposers 106. The cycle bail is connected to a half-cycle clutch that drives a two-bladed filter shaft 142. The clutch and drive arrangement are not illustrated in FIG. 2, but are shown in detail in the aforementioned Patent No. 2,919,002 to L. E. Palmer. The filter shaft is positioned to engage the rearward end 143 of each of the selection interposers 106.

When a character key such as the key 37A in FIG. 2 is depressed, the resulting downward movement of its keylever 101 depresses the associated selector interposer 106 by virtue of the engagement of the interposer lug 108 with the keylever pawl 103. The downward movement of the interposer 106 moves the cycle bail 141 downwardly; it will be recalled that each of the interposers is provided with a lug 117 for engaging the cycle bail. This movement of the cycle bail actuates the half-cycle clutch and rotates filter shaft 142 through 180°. As the filter shaft rotates, in a counterclockwise direction, it drives the interposer 106 forwardly in the direction of the arrow A. If the interposer is provided with a lug at each of the positions 111–116, then each of the character selection bails 121–126 is moved in the direction of arrow A. Of course, wherever any of the selector lugs are missing on the interposer, the corresponding selector bails remain unactuated.

The forward movement of the selector bails 121–126 effects a corresponding movement of the connecting rods 131–136 by virtue of the connections to the rods afforded by the latch interposers such as interposers 131A and 132A. The selector latches, such as latches 137 and 138, are thus actuated in accordance with a code established by the lugs 111–116 on the particular character key selector itnerposer that has been actuated. In order to assure completion of the selection operation, each of the selector interposers such as interposer 106 is provided with a releasable latch (not shown) that holds the interposer in its depressed condition until the completion of the operating cycle for the filter shaft, at which time the interposer is released to return to its original position.

From the foregoing, it may be seen that the selection of any given character is dependent upon the actuation, in given combination, of the selector bails 121–126 and their associated connecting rods 131–136. A typical combinational code for the typewriter, in a given commercial machine is as follows:

TABLE I.—NORMAL TYPEWRITER CODE

| Character | Code | Character | Code |
|---|---|---|---|
| Aa | 234 | ± 1 | 123456 |
| Bb | 1 | @ 2 | 12345 |
| Cc | 134 | # 3 | 1245 |
| Dd | 1346 | $ 4 | 1236 |
| Ee | 146 | % 5 | 1246 |
| Ff | 345 | ¢ 6 | 124 |
| Gg | 3456 | & 7 | 12346 |
| Hh | 16 | * 8 | 1234 |
| Ii | 24 | ( 9 | 12 |
| Jj | 456 | ) 0 | 126 |
| Kk | 14 | | |
| Ll | 136 | | |
| Mm | 23456 | ∓ = | 45 |
| Nn | 145 | . . | 245 |
| Oo | 236 | : ; | 346 |
| Pp | 46 | " ' | 246 |
| Qq | 4 | ' , | 34 |
| Rr | 2346 | ® ! | 2456 |
| Ss | 26 | ? / | 36 |
| Tt | 1456 | | |
| Uu | 1345 | | |
| Vv | 2345 | | |
| Ww | 2 | | |
| Xx | 13456 | | |
| Yy | 6 | | |
| Zz | 12456 | | |

From the foregoing table, it will be seen that there are no character code combinations that use the fifth code level, other than those that also employ the fourth level. Consequently, code combinations using the fifth code level, and omitting the fourth level, are available for special use in connection with the automation system, as described more fully hereinafter.

*Sensing and operating devices added to the typewriter*

As pointed out in the description of FIG. 1, the base 46 of the typewriter 31 is spaced from the upper frame 48 by an adapter 47 that is interposed between the members 46 and 48. The adapter 47 serves as a mounting support for the control switches 51–58. It also affords a usable space, below the operating mechanism of the typewriter, in which a number of different sensing devices and operating mechanisms are incorporated. In the preferred construction shown in FIGS. 3 through 8, suitable sensing switches and operating solenoids are shown, mounted on the frame of the typewriter within the space afforded by the adapter 47.

Figure 3:
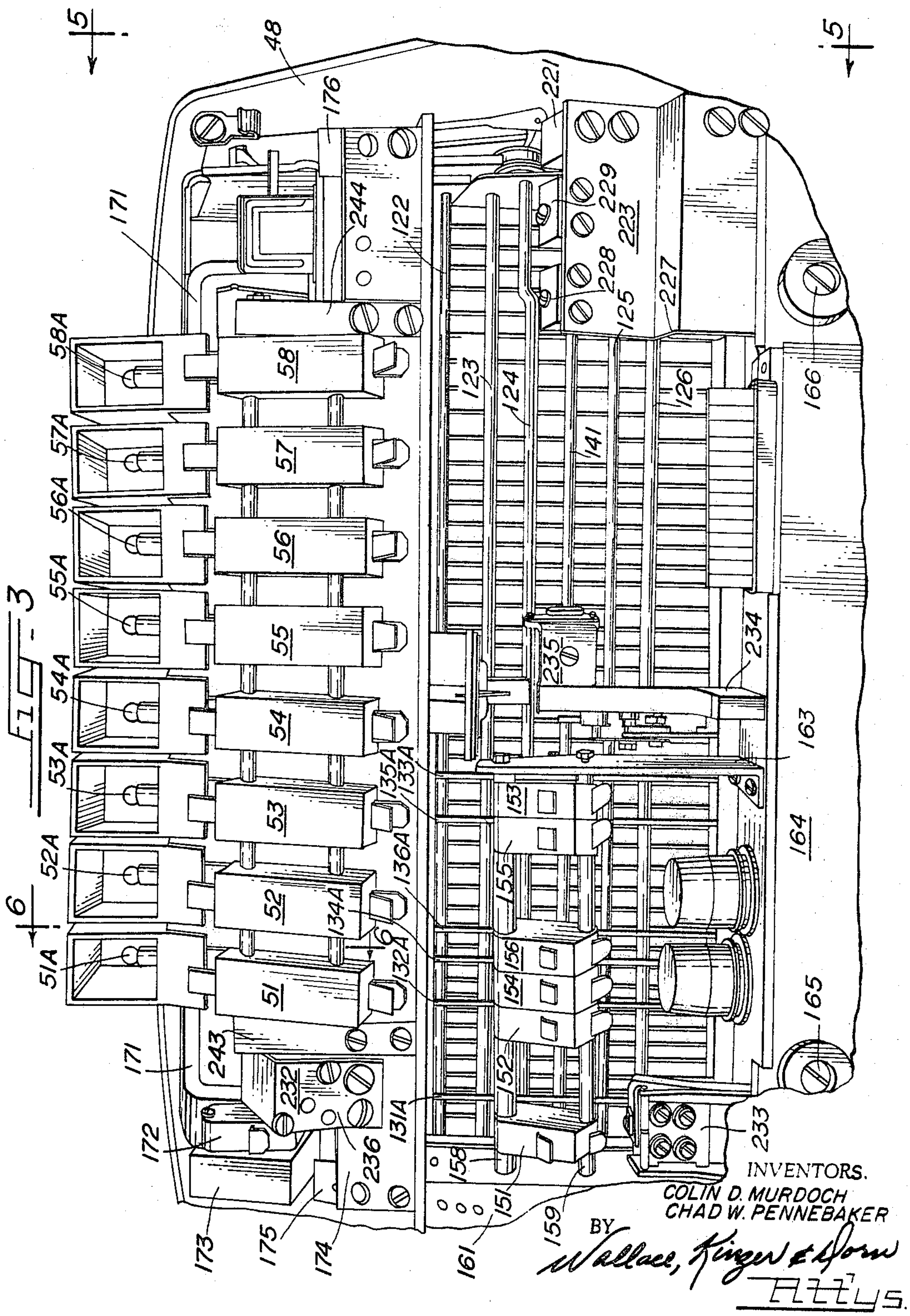
FIG. 3 is a bottom view of the forward portion of the typewriter of FIG. 1 with the base of the typewriter removed to show the internal operating mechanisms.

In order to determine which character has been selected in each typing stroke of the typewriter, it is most convenient to sense the movement of the latch interposers 131A–136A; bails 121–126 could be sensed. To this end, a series of sensing switches 151–156 are incorporated in the typewriter as shown in FIG. 3. Sensing switches 151–156 are mounted upon a pair of short transverse rods 158 and 159. The left-hand end of each of the rods 158, 159 is mounted in a mounting block or frame member 161 that is clamped to the left-hand frame of the machine, as by means of a plurality of set screws. The right-hand end of each of rods 158 and 159 is affixed to a bracket 163 that is mounted upon an angular transverse frame member 164 that extends across the central portion of the machine below the operating mechanism. Frame member 164 is secured to the upper frame of the typewriter by means of a pair of relatively large studs 165 and 166 that replace the normal feet of the typewriter. Members 165 and 166 are similar in construction to the feet used in the commercial typewriter but are long enough to extend through the additional space required by the incorporation of adapter 47 (FIG. 1) in the machine.

In addition to the sensing of and identification of individual characters, it is necessary to determine when an actual typing operation is taking place. It is also necessary to sense the actuation of other typewriter functions, such as space, back space, type head return (sometimes called carriage return), shift for capitals, release of shift, and tabulation.

Figure 4:
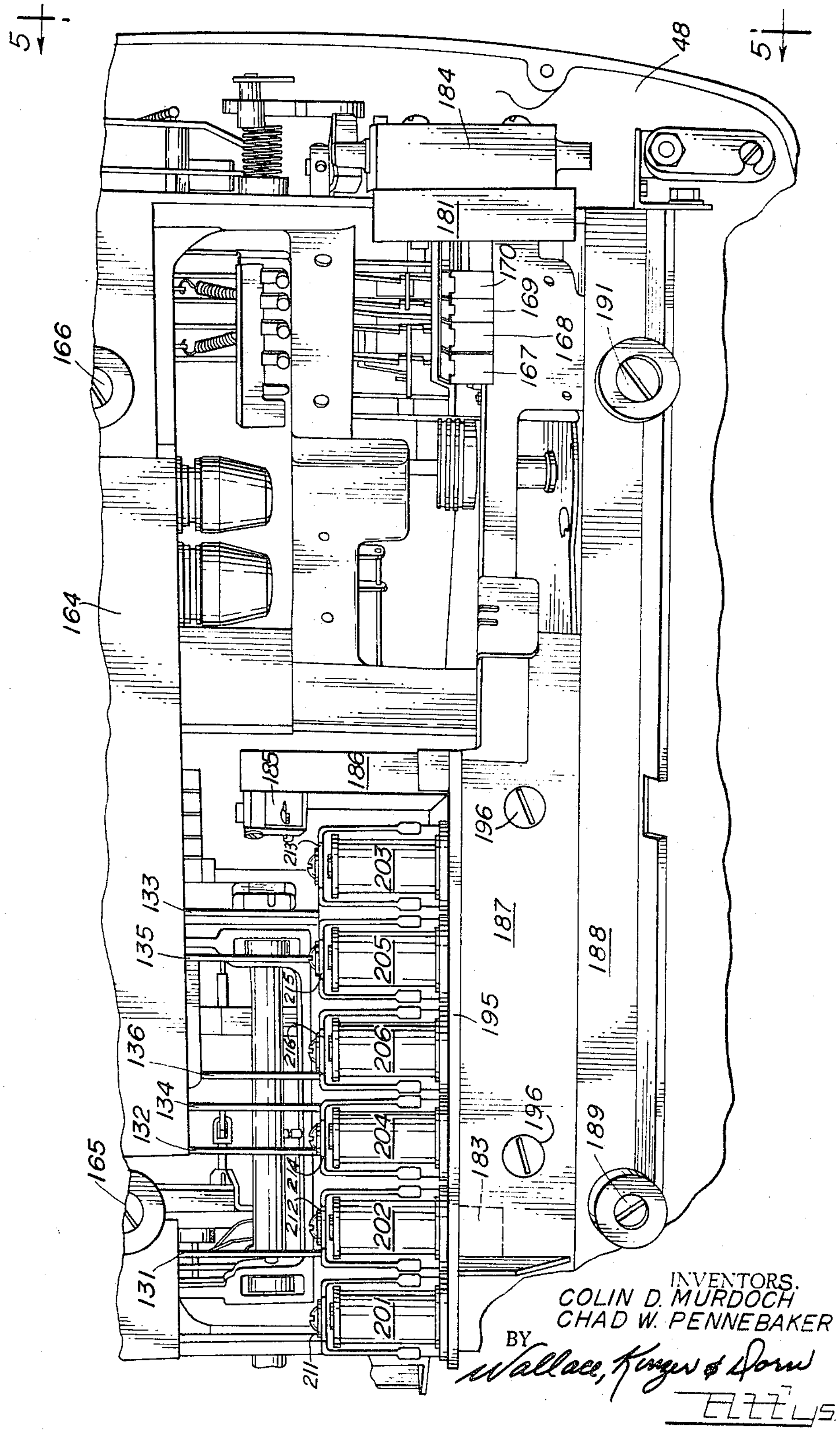
FIG. 4 is a bottom view, similar to FIG. 3, of the rear portion of the typewriter.

Sensing of the space operation is accomplished by a sensing switch 167 that is positioned to sense the movement of the keylever that actuates the space mechanism of the typewriter, as shown in the lower right-hand corner of FIG. 4. A similar sensing switch 168 is employed to detect the back space operation in the typewriter, and an additional sensing switch 169 senses the initiation of a type head return operation. Some typewriters are provided with an index function key that advances the platen through one line space without a carriage return operation; this function of the typewriter can be detected by a sensing switch 170 if desired.

The shift mechanism for the typewriter includes a shift crank 171 that extends across the forward end of the typewriter for actuation by either of the two shift keys 39 and 41 (see FIG. 3). A sensing switch 172 is located in position to sense movements of the shift bail. Switch 172 is mounted on a mounting block 173 clamped to the typewriter frame. It should be noted that all of the auxiliary frame elements and devices required for sensing typewriter operations and for initiating typewriter operations are mounted on the typewriter by clamp devices of one kind or another that do not require any drilling or other modification of the typewriter frame or of the operating components of the typewriter mechanism. Consequently, it is always possible to remove this equipment from the typewriter and restore the typewriter to its original operating condition.

Another sensing switch 184 is located in the lower right-hand corner of FIG. 4, and in FIG. 5. Switch 184 is mounted upon a suitable mounting block 181 secured to the frame of the typewriter. Sensing switch 184 is operatively connected to the clutch mechanism that drives the type head on its return movement and is employed to sense the time interval required for the return movement for a special purpose described more fully hereinafter.

In each character typing operation, as noted above, the half-cycle clutch of the typewriter is engaged and actuates the filter shaft 142 (FIG. 2). In order to assure detection of each actual character typing operation, an additional sensing switch 185 is incorporated in the typewriter, this switch appearing near the center of FIG. 4. Switch 185 is mounted upon a suitable mounting block or bracket 186 that is secured to an auxiliary frame member 187. Frame member 187, in turn, is mounted upon a transverse frame member 188 that extends across the rear portion of the typewriter. Frame member 188 is mounted on the typewriter frame in the same manner as member 164, a pair of elongated mounting studs 189 and 191 being employed for this purpose. The mounting members 189 and 191 also function as feet for the typewriter, replacing the shorter feet on the original machine.

One further sensing switch 183 is mounted on frame member 187, projecting inwardly of the keyboard mechanism (FIG. 4). Switch 183 detects actuation of the tabulator mechanism of the typewriter.

For each function of the typewriter that is sensed by the switches described hereinabove, with the single exception of the carriage return duration switch 184, an operating device is provided to cause the typewriter to perform that same function when the typewriter is actuated automatically from recorded data. In the preferred form of the present system, individual operating solenoids are incorporated in the typewriter to simulate the operations originally detected by the sensing switches.

As shown in FIG. 4, a series of six character selection solenoids 201–206 are mounted upon a bracket member 195 that constitutes an integral part of the frame member 187. Solenoids 201–206 are too large to be aligned directly with the corresponding character selection latches within the typewriter. Consequently, a series of offset armature extension elements 211–216 are employed, as shown in FIG. 8. The character selection solenoids may actually constitute relay mechanisms, with the armature extension members mounted on the relays in place of the usual contact-operating elements, as shown in FIGS. 8A and 8B.

As shown in FIG. 8A, solenoid 201 cooperates with latch 137. In normal operation of the typewriter, latch 137 is driven downwardly by a latch bail 200 in each character selection cycle, unless the latch is pulled forwardly by connecting rod 131, against the bias of the spring 140. In FIG. 8A, solenoid 201 is shown in deenergized condition. Extension member 211 does not interfere with the vertical movement of either latch 137 or bail 200 in the course of normal operation of the typewriter.

FIG. 8B illustrates the operation of the solenoid in the course of a recording operation controlled by the system of the present invention. As shown in this figure, energization of the solenoid pivots extension member 211 in a clockwise direction. A small angular projection 211A on extension member 211 disengages latch 137 from the latch bail 200. Consequently, when bail 200 is driven downwardly to its position 200A, latch member 137 is not pulled along with the bail. The only action that is required of the extension member 211 is to disengage latch 137 from bail 200; it is not essential that the armature extension member hold the latch away from the bail for any extended period. The bail slides downwardly between members 137 and 211, thereby duplicating the action that would be effected by movement of connecting rod 131 in the direction of the arrow A.

The operative connection between solenoid 201 and latch 137 is effected without any permanent connection to the latch member. Actuation of the solenoid does not entail movement of connecting rod 131 and hence does not entail moving any of the keylevers or other associated members in the keyboard. Nevertheless, the solenoid effectively duplicates operation of the connecting rod in selection of characters in the course of a playback operation.

On the right-hand side of the machine, as shown in FIGS. 3 and 5, a mounting block 221 is affixed to the interior frame of the typewriter by suitable means such as the set screws 222 shown in FIG. 5. A Z-shaped bracket 223 is affixed to the mounting block 221. On this bracket there are mounted three solenoids 227, 228 and 229. Solenoid 227 is connected to the space mechanism of the typewriter and actuates that mechanism to afford spacing between adjacent characters when required. Solenoid 228 is operatively connected to the backspace mechanism of the typewriter. Solenoid 229 connects to the carriage return mechanism of the typewriter. Thus, these particular solenoids are utilized to actuate the typewriter to perform the same functions that are sensed by switches 167, 168 and 169 respectively. A fourth solenoid can be mounted on the typewriter to perform the indexing function if this is desired and thus afford a means for repeating the indexing operation sensed by switch 170.

A shift solenoid 232 is mounted in the upper left-hand corner of the typewriter base as shown in FIG. 3. This solenoid is connected to the shift key at the left-hand side of the machine, this being the shift key 39 (FIG. 1). Solenoid 232 is mounted on a bracket 236 which in turn is supported on a transverse frame member 174. Frame member 174 is affixed to a pair of mounting blocks 175 and 176 located at the opposite sides of the typewriter and secured to the typewriter frame by suitable set screws or other clamp means.

The mounting for shift solenoid 232 is shown in greater detail in FIG. 7. As illustrated therein, the armature 238 of the solenoid is provided with a clamp extension 239 that extends around an operating lever 240 that is actuated by the shift key. When the solenoid is energized, it pulls the lever 240 downwardly, simulating the movement of the lever that would be affected by depression of the shift key 39 (FIG. 1). This arrangement is typical of the clamp and similar connections used for the operating solenoids of the system; the connections vary in detailed construction but are all effected without modification of the basic typewriter structure.

For tabulation operations responsive to recorded data, a tabulator solenoid 233 is mounted within the typewriter. This solenoid is supported upon the auxiliary frame member 164 and is located in the lower left-hand corner of FIG. 3. The armature of the solenoid is connected, by a connection similar to that for latch 137 (FIGS. 8A, 8B), to the tabulator mechanism of the typewriter in order to actuate the tabulator.

Finally, there is an additional solenoid 235 mounted in the machine, this solenoid appearing in the central portion of FIG. 3. Solenoid 235 is mounted upon a mounting bracket 234 that is in turn secured to auxiliary frame member 164. The armature of this solenoid is coupled to the cycle bail 141 of the typewriter to actuate the cycle mechanism.

The sensing switches and operating solenoids described hereinabove afford the only necessary connections to the operating mechanism of the typewriter. Any ordinary typing function of the machine is detected by one of the sensing switches and is utilized to record appropriate control data on the magnetic tape of the system as described hereinafter. By the same token, the same functions are performed, on a print-out operation, by one of the corresponding operating solenoids connected to the typewriter mechanism. Preferably, all connections for the operating solenoids are made to intermediate or terminal portions of the typewriter mechanism so that the print out operation is effected without requiring actual movement of the character and function keys of the typewriter. By way of example, the character solenoids 201–206 are connected to the character selection latches of the typewriter (e.g., 137, 138) rather than to any part of the mechanism that would actually move the keys of the keyboard. This eliminates any necessity for moving the keylevers and their directly associated operating elements and avoids imposing any limitation on speed of print-out, due to inertia of the keylevers.

FIG. 6 illustrates the mounting of the control switches 51–58. As shown therein, the switches such as switch 51 are all mounted on a pair of transverse support rods 241 and 242 extending between two mounting blocks 243 and 244 (see FIG. 3) affixed to the transverse frame member 174. The switch arm 245 projects outwardly of the typewriter, above a lip on the adapter 47, and supports a transluscent switch actuator button 51B that encompasses a signal lamp 51A. Switch 51 is a conventional small control switch; some of the switches 51–58 are single-pole, single-throw devices and others are single-pole double-throw switches as explained more fully hereinafter.

*The recording circuits*

Figure 9:
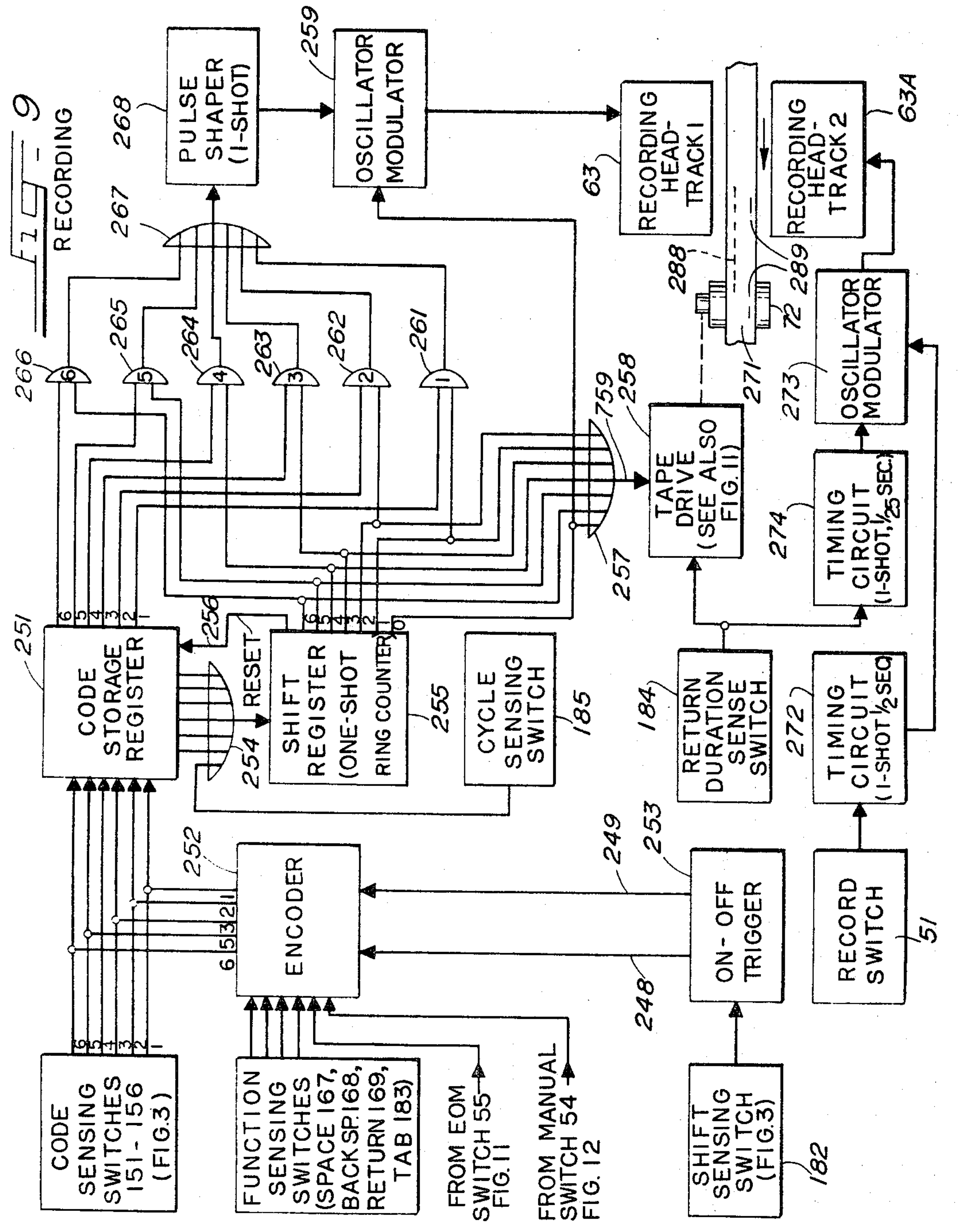
FIG. 9 is a functional block diagram of the principal recording circuits of the automation system of the present invention as incorporated in the automated typewriter of FIG. 1.

The basic recording system for the typewriter is illustrated in the functional block diagram of FIG. 9. As shown therein, each of the code sensing switches 151–156 (FIG. 3) is individually connected to one-word code storage register 251. The code storage register 251 may be of conventional construction and can utilize any of a wide variety of bistable storage devices, one such device for each of the code sensing switches. In the preferred embodiment of the present invention, individual relays are employed for each stage of code storage register 251. On the other hand, magnetic core circuits, transistor trigger circuits, or other suitable bistable devices may be conveniently employed for the code storage register without departing in any way from the concept of the invention.

It is also necessary to connect the function sensing switches 167, 168, 169 and 183 to the code storage register 251. This connection cannot be made directly, however, because there is no established code, in the typewriter, for the functions sensed by these switches. This is also true with respect to the shift sensing switch 172 (FIG. 3).

The function sensing switches 167, 168, 169 and 183 are connected to an encoder 252 having five output circuits. These five output circuits are individually connected to the first, second, third, fifth and sixth inputs of the code storage register. There is no connection from encoder 252 to the fourth input to code register 251 because, as noted above, the special functions of the typewriter are according code combinations that omit the fourth code position. Encoder 252 may comprise a diode matrix, a magnetic core matrix, or a relay matrix, as desired; in one specific embodiment of the invention, a diode matrix has been employed.

The connection from shift sensing switch 172 to encoder 252 is not made directly because it is necessary to determine not only the depression of one of the shift keys but also the release thereof, inasmuch as the shift key may be locked down for an indeterminate period. Consequently, shift sensing switch 182 is connected through an on-off trigger circuit 253 to the encoder, there being two output connections 248 and 249 from the trigger circuit to the encoder.

It is also necessary to afford connections from the EOM switch 55 and from the manual switch 54 to encoder 252, these connections being indicated in FIG. 9.

The coded output of encoder 252, responsive to the various inputs from the switches shown in FIG. 9, is as follows:

*Table II.—Special function codes*

| | |
|---|---|
| Space | 1235 |
| Back space | 12356 |
| Tabulate | 125 |
| Return | 1256 |
| Shift | 135 |
| Shift release | 1356 |
| EOM | 15 |
| Manual | 156 |

In comparison with the normal character codes of Table I, it will be noted that Table II includes only code words that contain the first and fifth levels of the code but omit the fourth level. This makes it easier to identify and segregate these special codes in the playback circuits of the automation system as described more fully hereinafter.

Each stage of the code storage register 251 is connected through an OR circuit 254 to a shift register 255. Shift register 255 is preferably constructed much like a ring counter of eight stages, each stage comprising a monostable trigger circuit, the time constants for the trigger circuits all being equal, but with no actuating connection from the last stage to the first. Shift register 255 is employed as a clock pulse source; other suitable clock pulse circuits may be substituted if desired. However, the one-shot ring counter construction is highly effective in the operation of the system because it gives a precisely controlled number of output pulses in each operating cycle and still can be timed to provide the clock pulses at regular intervals. The final stage of the shift register 255 is connected back to code storage register 251 through a reset line 256 to afford a means for clearing the code storage register.

From Table I, it is seen that there is one character code for which all code positions are blank, this being the code word for the character key that includes the hyphen and the underline of the typewriter. To enable reproduction of this code character, the cycle sensing switch 185 is connected through the OR circuit 254 to the shift register 255. For this particular code only, it is necessary to actuate the shift register even though no code data has previously been recorded in the storage register 251.

All stages of shift register 255 are connected through an OR circuit 257 to a tape drive circuit 258, the connection being such that the tape drive is energized continuously during countdown of the shift register. This "zero" output from the shift register is coupled to an oscillator modulator 259. Circuit 259 may constitute a conventional oscillator circuit provided with suitable means for interrupting or otherwise modifying the signal output. One arrangement that can be employed for modulation in circuit 259 is simply an appropriate gating circuit in the output of the modulator. Another circuit arrangement, illustrated in detail in FIG. 17, constitutes a conventional oscillator circuit in which the power supply is switched to interrupt, and hence to modulate, oscillator operation.

The succeeding six output stages of the one-shot ring counter constituting shift register 255 are individually connected to six AND circuits 261, 262, 263, 264, 265 and 266, respectively. Each of these AND circuits is provided with a second input. The second input to AND circuit 261 is taken from the first stage of code storage register 261. Similarly, the second stage of the code storage register is connected to AND circuit 262, and this arrangement is continued with the final or sixth stage of the code storage register being connected to the second input to AND circuit 266.

The outputs of the AND circuits 261–266 are all connected through an OR circuit 267 to a pulse shaping circuit 268. The pulse shaping circuit 268, which preferably constitutes a conventional monostable trigger circuit, is coupled to the oscillator modulator 259 and is used to modulate the output of the oscillator in exactly the same manner as the signal supplied thereto from the "zero" stage of shift register 255. The output of oscillator modulator circuit 259 is coupled to the recording head 63 to record data on a first track on the main tape 271 of the system, this being the tape contained in the tape cartridge 61 of the recording and control unit 59 (see FIG. 1).

FIG. 9 also illustrates the control arrangement used for actuating a second input winding for the recording head 63, indicating as a second track recording head 63A. This operating circuit begins with the Record switch 51, which is coupled to a timing circuit 272. Circuit 272 is a conventional one-shot trigger circuit that remains actuated for a relatively extended time in response to a short pulse input signal. The operating interval for timing circuit 272 may be of the order of one-half second, or even longer. The output of timing circuit 272 is connected to a second oscillator modulator 273 that may be essentially similar in construction to circuit 259. Thus, a conventional modulator circuit may be employed, or the oscillator may simply be provided with means for switching either output or its power supply.

The return duration sensing switch 184 is also shown in FIG. 9. This switch is connected to the tape drive circuits 258 and to a second timing circuit 274. Timing circuit 274 is again a monostable trigger circuit, but is constructed to afford a substantially shorter output signal than timing circuit 272. By way of example, the time interval for operation of the timing circuit 274 may be of the order of forty milliseconds. The output from timing circuit 274 is also connected to oscillator modulator 273 to control duration of the output signals from the oscillator.

Before considering operation of the recording circuits illustrated in FIG. 9, it is important to note that the principal circuits shown in that figure are energized only after the Record switch 51 has been depressed to place the typewriter system 30 (FIG. 1) in condition for a recording operation. At other times, when the system is carrying out other operations, the recording circuits remain unenergized so that there is no undesired recording of transient signals or other signals on the magnetic tape 271. The control circuits connected to the Record switch 51 and utilized to control energization of the recording circuits of FIG. 9 are described and discussed in detail hereinafter in connection with FIG. 11. For the present, it may be assumed that the Record switch has been depressed by the typist and that the system is thus conditioned for a recording operation.

The operation of the recording circuits of FIG. 9 may best be explained by means of a specific example. Thus, it may be assumed that the typist, after actuating Record switch 51, begins recording a message, the initial portion of which reads as follows:

"1. Drive along . . ."

To begin the recording of this message, of course, the typist starts by striking the key for the numeral one. By reference to Table I, it is seen that this action actuates all of the code sensing switches 151 through 156, since the code for this character is 123456. Consequently, an operating circuit is completed to each of the six storage relays included in the code storage register 251, energizing each of those relays. Each relay is provided with a holding circuit to keep the relay in actuated condition. The closing of the relay contacts completes a series of electrical circuits that apply individual operating signals to each of the outputs of the code storage register and, accordingly, to one input of each of the AND circuits 261 through 266. Initially, however, there are no output signals from the AND circuits, since, as yet they each receive only one input signal.

Upon actuation of any of the storage relays of register 251, closing of the relay contacts completes an electrical circuit that supplies an actuating signal through the OR circuit 254 to the first stage of the ring counter 255. In the present instance, with all of the storage register relays actuated, this signal is highly redundant; a total of six circuits are completed, in parallel, through the OR circuit 254 to the initial stage of the ring counter. Actuation of the initial stage of the ring counter produces an output signal on the "zero" line of the counter. This signal is supplied to oscillator modulator 259 and momentarily energizes the oscillator. The same signal is supplied through the OR circuit 257 to the tape drive circuit 258. The tape drive circuit actuates the capstan idler 72 to advance the magnetic tape 271.

While the tap is advancing, a recording signal is supplied to the recording head 63 from the oscillator modulator 259. The oscillator preferably is constructed to operate at a frequency sufficient to supply several signal cycles during the time interval in which an output signal is available from the ring counter 255. Typically, the oscillator frequency may be of the order of one thousand to two thousand cycles, affording several cycles of operation during the time interval in which the tape is advanced, but keeping the oscillator frequency within the operating frequency range of telephone lines and similar communication media. It is not essential to maintain the oscillator within this frequency range unless it is desired to employ the typewriter, on occasion, for recording at a distant location.

After a short interval, determined by the construction of the monostable trigger circuits in the shift register 255, the register advances by one count. In the specific circuit arrangement disclosed hereinafter, there are a total of sixteen trigger circuits in the ring counter, with output signals being taken only from the first trigger circuit in each stage to the AND circuits 261–266. Thus, the first two trigger circuits constitute the first stage of the counter. During the interval in which the second trigger circuit in each stage of the counter is energized, there is no output signal from the register but tape advance continues, thereby affording a blank space and segregating adjacent pulses in the recording operation.

When the initial trigger circuit in the second stage of ring counter 255 is energized, it produces an output signal that is supplied to the second input of AND circuit 261. As noted above, AND circuit 261 receives an actuating signal on its first input from the initial stage of code storage register 251. Consequently, AND circuit 261 produces an output signal that is supplied, through OR circuit 267, to the pulse shaping trigger circuit 268. Circuit 268 produces a substantially rectangular-wave output signal of predetermined duration that is supplied to the oscillator modulator circuit 259 and energizes the oscillator for a given period of quite short duration. During this same time interval, the signal from the second stage of the ring counter is also supplied to the tape drive 258 through OR circuit 257. Consequently, the tape 271 continues to advance and a short burst of the oscillating signal is recorded thereon on the main track 288.

When the initial trigger circuit in the second stage of ring counter 255 drops out, there is no further output signal supplied to AND circuit 261, but tape drive circuit 258 is maintained energized. Hence, during the time interval in which the second trigger circuit in this stage of the ring counter is operative, a blank interval is established on the tape, in track 288, separating the oscillatory signal that has just been recorded from the next signal on the tape.

The foregoing process is repeated in sequence with respect to the individual output circuits of the ring counter 255 that are connected to AND circuits 262 through 266. Thus, there is ultimately recorded, upon the main track 288 of tape 271, a series of pulse signals totalling seven in number, the first of which may be considered as a "zero" or initiating pulse and the following six constituting code signal pulses. Each pulse is actually a short burst of the high frequency signal produced by the oscillator modulator 259. Accordingly, it is seen that the parallel data sensed by switches 151–156 has been serially encoded on the tape.

Ultimately, the ring counter reaches its final stage and produces an output signal on the reset line 256. The reset line 256 is connected into a gate arrangement in the holding circuits for each of the individual relays in the code storage register 251. The reset signal produced by the ring counter 255, when it has counted out, actuates the gate and causes all of the relays in the code storage register to drop out. Thus, the code storage register is reset and is ready to receive the next character for recording.

The foregoing operation takes place in a very short time interval. This time interval should be made less than the time required for typing a single character at the maximum typing speed of the machine; thus, it may be of the order of sixty to seventy milliseconds.

The next character that the typist strikes, in reproducing the message, is the key for reproducing the period. With reference to Table I, it is seen that the code for this character is 245. Consequently, only code sensing switches 152, 154 and 155 are actuated for this character, with the result that only the second, fourth and fifth stage relays in code storage register 251 are energized. This effectively records the code symbol 245 in the code register.

As before, closing of any one of the code storage register relays produces an actuating signal that is supplied through the OR circuit 254 to the initial stage of the ring counter 255. Again, the actuation of the initial stage of the ring counter produces an output signal on the zero output line that momentarily actuates the tape drive 258 and also momentarily energizes oscillator modulator 259. Again, therefore, an initial or "zero" pulse is recorded on the main track 288 of tape 271 to commence the recording of a new charactor designation.

In this instance, when the ring counter 255 counts to its second stage, an output signal is again reproduced on the "one" code level line that is connected to AND circuit 261. But there is no corresponding signal from the initial stage of the code storage register 251, because the storage relay in that stage has not been actuated. Accordingly, there is no output signal from AND circuit 261, the pulse shaper 268 is not actuated, and no output signal is produced by oscillator modulator 259. The output signal from the ring counter 255, however, is still applied to tape drive circuit 258. Consequently, the tape is advanced through the same increment as if a pulse signal were being recorded. This produces a blank space in the code data recorded in the tape 271.

When the shift register reaches its next or "two" stage, it again applies an output signal to AND circuit 262 and to tape drive circuit 258. This time, since the second stage relay in code storage register 251 has been actuated, there are two signals available at AND circuit 262, one from the storage register and one from the ring counter. Consequently, an output signal is supplied by AND circuit 262, through OR circuit 267, to the pulse shaping trigger circuit 268. As in the previous example, the pulse shaper produces an output signal of predetermined duration that energizes the oscillator modulator 259. The high frequency signal from the oscillator is supplied to the recording head and is recorded on the first track of tape 271, the tape simultaneously being advanced by the tape drive 258 since the tape drive is energized continuously during countdown of the ring counter.

The foregoing procedure is carried forward through the remaining stages of the ring counter and the code storage register 251, with short bursts of high frequency signal being recorded only at positions corresponding to code positions two, four and five on the tape. When the recording operation is completed, the final stage of the ring counter 255 again produces an output signal that is effective to reset the code storage register 251 and condition the system for the next character or other code.

The third operation by the typist is to strike the space bar 38 on the typewriter (FIG. 1). This closes the space sensing switch 167 and completes an operating circuit within the encoder 252. The encoder is arranged to then supply output signals on its output lines at positions one, two, three and five, corresponding to the code 1235 that has been selected for the space function (See Table II). Accordingly, the first, second, third and fifth level storage relays in code storage register 251 are energized.

The succeeding operations for recording the space function code proceed exactly as described above with respect to the recording of character code data.

Figure 14:
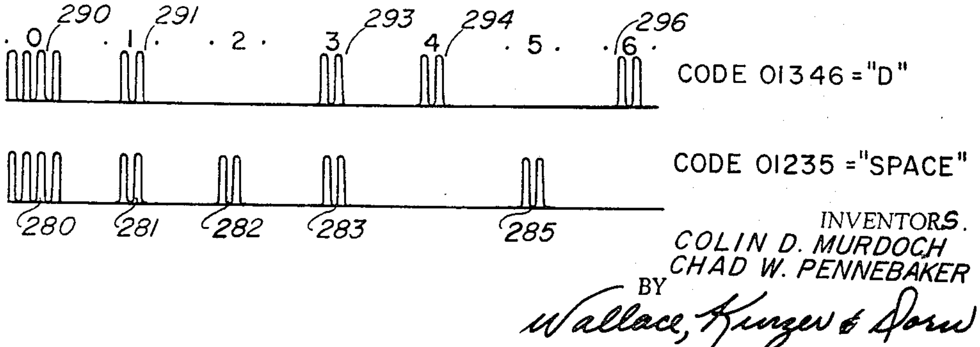
FIG. 14 is an exemplary diagram illustrating the form of recording employed.

The result of the recording operation for the space function, with respect to the code bits recorded on the main track 288 of magnetic tape 271, is illustrated in FIG. 14. For the space function, code 1235, an initial short burst 280 of high frequency signal is recorded at the initial or "zero" position. This is spaced from a succeeding similar, but much shorter, burst 281 representing the first level of the code for the space function. There are further short burst signals recorded at the second, third and fifth positions, as indicated in FIG. 14 by reference numerals 282, 283 and 285. There is no signal recorded at either the fourth or the sixth positions, although the tape is advanced through these positions to afford the requisite blank spaces in the code.

The next operation by the typist, in recording the prescribed message, is to depress the shift key in order to achieve capitalization of the succeeding letter. Ordinarily, since the letter D is to be typed, the typist would depress the shift key 41 at the right-hand side of the typewriter (FIG. 1). Regardless of which shift key is used, the shift sensing switch 172 is actuated, completing an energizing circuit for the on-off trigger 253 (FIG. 9). When trigger circuit 253 is actuated, it produces an output signal on its initial output line 248; this signal is thus supplied to the encoder 252. This completes operating circuits within encoder 252 that are effective to produce output signals on the first, third and fifth output lines of the encoder, corresponding to the code 135 that has been selected for the shift function (see Table II). These output signals are supplied to code storage register 251 and result in the recording, on tape 271, of a code signal 0135 comprising the initial or "zero" code burst and further code bursts at the positions for code levels one, three and five.

The typist, while holding shift key 41 depressed, next strikes the keylever pertaining to the character D. As a result, the magnetic tape 271 has recorded on it the code corresponding to this character, in this instance the code 1346. This recording is graphically illustrated in FIG. 14, with the code pulses or bursts 290, 291, 293, 294, and 296 representing the positions on the tape at which the signal is actually recorded. As before, the recorded code data includes the initial or "zero" code burst 290 as well as the character-determining code bits.

When the letter D has been typed, the typist releases shift key 41, interrupting the operating circuit from shift sensing switch 182 to on-off trigger circuit 253 (FIG. 9). When this occurs, trigger circuit 253 reverts to its initial operating state and produce a short pulse signal on the second output line 249 connected to encoder 252. In this manner, encoder 252 is actuated to produce output signals at its first, third, fifth and sixth outputs, corresponding to the code selected for the shift release function, code 1356. The signals from encoder 252 energize the corresponding relays in code storage register 251 and cause the system to record, on track 288 of magnetic tape 271, the complete code designation 01356 comprising the code pulses and the initiating or "zero" pulse.

From this point on, it may assumed that the typist continues typing of the required message. Thus, the next key to be actuated would be the key for the letter *r*, code 2346, followed by the letter *i* and the remainder of the message.

In typing and recording the letter or other message, the typist ultimately reaches the end of the first line. When this occurs, the return key 43 is actuated by the typist (see FIG. 1), and this operation is sensed by the type head return sensing switch 169. Actuation of sensing switch 169 causes the encoding and recording system to record the code character 01256 on tape 271. The type head (or carriage) return operation also closes return duration sensing switch 184 and maintains that switch in closed condition as long as the type head continues its movement back to the initial typing position at the left-hand side of the typewriter.

Closing of the duration sensing switch 184 completes an operating circuit for the tape drive 258 and maintains the tape drive in operating condition to advance the tape 271. That is, the tape 271 is advanced all during the time that the type head is returning to its initial typing position, regardless of the fact that the type head return code is recorded in a much shorter time interval. The resulting blank space on the tape 271 is of substantial advantage in playback of the recording, and reproduction of the recorded message, as described more fully hereinafter.

At the same time the initial closing of return duration sensing switch 184 energizes timing circuit 274, which produces an output signal for a predetermined time interval, in this instance of the order of forty milliseconds. The output signal from timing circuit 274 is effective to energize oscillator modulator 273 and thus supply a high frequency output signal to the second winding of the recording head, or to a separate recording head 63A as illustrated. Consequently, at the beginning of the return movement of the type head, a short-duration high frequency pulse signal is recorded on a second track 289 on tape 271. This short signal on the second track is utilized in connection with specialized control functions of the system, as described more fully hereinafter in connection with the selection circuits of the system.

When the type head has returned to its initial position, the typist continues recording the message as described above. At some point in the message, it may be desirable to leave a blank space for subsequent recording of variable data or of data not yet ascertained. It is also desirable to have the reproduction action of the typewriter stopped, on playback, at the proper point for insertion of such variable data.

At this point, in recording the message, the typist depresses the Manual switch 54 (FIG. 1). As shown in FIG. 9, closing of the Manual switch completes an operating circuit for encoder 252; this operating circuit is effective to produce output signals on the first, fifth and sixth outputs from the encoder. Accordingly, the Manual code (see Table II) of 156, preceded as usual by a "zero" or initiating pulse, is recorded on the tape.

At the same time, the recording control circuits of the system are effectively de-energized, as described more fully hereinafter in connection with FIGS. 11 and 12. Accordingly, it is now necessary for the operator to again depress the Record switch 51 in order to be able to continue with recording of the predetermined message. This makes it possible for the typist to type variable data into the original copy without recording that data; thus, the original copy is always usable.

Actuation of the Record switch 51 again energizes the recording circuits of FIG. 9, as described in detail hereinafter in connection with the control circuits illustrated in FIG. 11. With reference to FIG. 9, however, closing of the Record switch 51 has an additional function. The Record switch, upon closing, actuates the timing circuit 272, which produces an output signal of substantial duration, in this instance approximately one-half second to one second. This long-duration signal is supplied to oscillator modulator 273 and energizes the modulator for a corresponding time interval. As a result, a long-duration signal is recorded on the second or auxiliary track 289 of tape 271. This same action is effected each time the Record switch 51 is depressed, providing a long-duration record signal on the auxiliary track of the magnetic tape to identify the beginning of each recorded message.

When the typist finally reaches the end of the message to be recorded, the EOM switch 55 is depressed. As a consequence, an output signal is produced by encoder 252 to record the EOM code 15 (see Table II) on the main track of the tape. Closing of this same switch also is effective to drop out the control cricuits that maintain the recording devices of FIG. 9 in operation and to advance the tape through a given length to prepare the system for recording another letter or other message on tape 271. These latter functions are described in detail hereinafter in connection with FIG. 11. The message is now completely recorded.

*The playback circuits*

Figure 10:
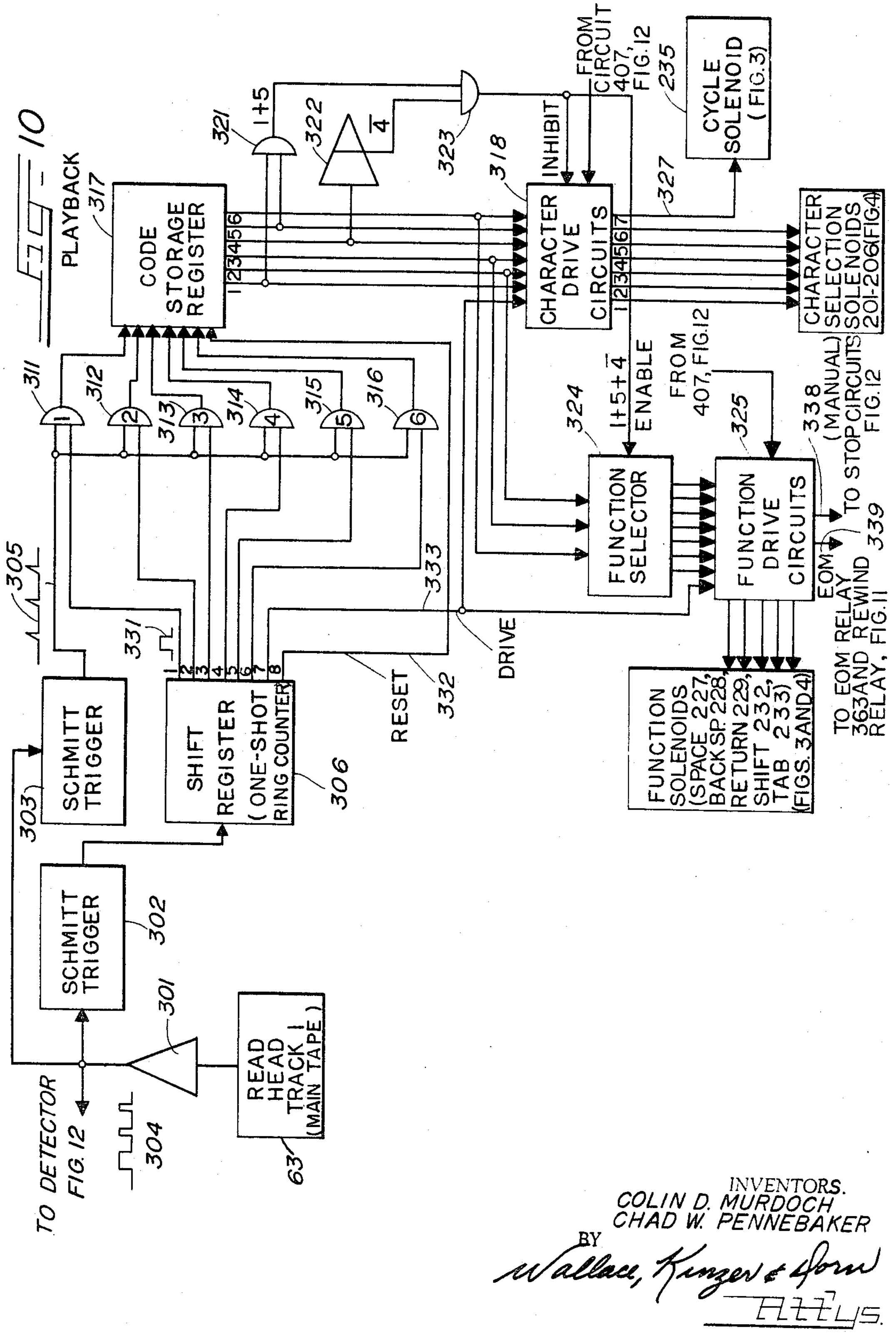
FIG. 10 is a functional block diagram of the principal playback or print-out circuits.

The basic playback circuits for the automatic typewriter system are illustrated in the functional block diagram of FIG. 10. As shown therein, the main winding of read-record head 63 is connected to an amplifier circuit 301 which in turn is connected to two Schmitt trigger circuits 302 and 303. It should be understood that reading head 63, although shown separately in FIG. 10, is actually physically integrated with the recording head in a structure that affords recording, erasing, and reading windings for each of the two tracks on the magnetic tape. The various elements of the record-read heads have been shown separately in the block diagrams only for the sake of convenience and to clarify their relationship to the operating circuits of the system.

The Schmitt trigger 303 is employed to convert the relatively broad pulse signal 304 available at the output of amplifier 301 to a spike-like signal 305, in which each signal pulse is of much shorter duration than the pulses or bursts of signal available from the original recording. The pulse shaping function afforded by trigger circuit 303 is of substantial importance in permitting accurate reproduction of the recorded information without undue difficulty in regard to synchronization of the playback operation with the time relationships established in the initial recording. Schmitt trigger 302 is utilized for a similar purpose, producing a sharply peaked output signal that is supplied to a shift register 306. Trigger 302 should be a slow-response circuit, sensitive to the long "zero" pulse at the beginning of each code word but insensitive to the shorter code pulses and to transients.

Shift register 306 may be essentially similar in construction to the shift register 255 employed in the recording circuits (FIG. 9). In this instance, however, although the shift register is preferably constructed as a one-shot ring counter, it includes eight individual stages rather than the seven stages incorporated in the ring counter used for recording. Furthermore, shift register 306 is provided with suitable feedback circuits to the initial stage of the counter, from the succeeding stages, to prevent premature re-actuation of the ring counter, once it has started in operation, in response to succeeding pulses supplied thereto from the Schmitt trigger 302. Stated differently, the shift register or ring counter 306 is constructed to prevent triggering of its initial stage, once it has started a countdown, until after the final stage has counted out.

The first six stages of shift register 306 are individually connected to six AND circuits 311, 312, 313, 314, 315 and 316, respectively. Each of the AND circuits is provided with two inputs, the second input coming, in each instance, from Schmitt trigger 303. The outputs of AND circuits 311–316 are individually connected to suitable storage devices on a one-word code storage register 317.

Storage register 317 can employ relays to store the individual code bits, as in register 251 of FIG. 9. However, the available response and reset time for storage register 317 in the playback circuits of FIG. 10 is substantially less than that for the code storage register in the recording circuit. Consequently, and although rapid-response relays could be utilized, it is preferable to employ other forms of storage circuits in register 317. In the specific storage register illustrated hereinafter, transistor trigger circuits are utilized in code storage register 317 because it is possible to obtain more rapid reset with these devices, at a relatively low cost, than with relays.

Storage register 317 is provided with six output circuits, one for each stage, and these are individually connected to a series of character drive circuits in the circuit unit 318. The character drive circuits 318, which are basically amplifiers, are individually connected to the character selection solenoids 201 through 206 (see FIG. 4). That is, there is an individual drive amplifier, in circuit unit 318, that is connected to and may be employed to energize each of the character selection solenoids.

It will be recalled that various functions of the typewriter other than character selection are encoded on the tape in the same basic code as the character data. It is necessary to identify the function codes and to treat these codes differently from the character codes. This identification is readily accomplished, principally because all of the function codes include code bits at the first and fifth levels with no code bit at the fourth level, whereas there are no character codes that include this combination.

The function code identification circuits, as shown in FIG. 10, include an AND circuit 321 that is connected to the first and fifth stage outputs from code storage register 317. An inverter or NOT circuit 322 is connected to the fourth stage output of the code storage register. The outputs of AND circuit 321 and NOT circuit 322 are connected to a further AND circuit 323 which, in turn, is coupled to the character drive circuits 318 and to a function selector circuit 324. The connection from AND circuit 323 to the character drive circuits 318 is such as to de-energize or otherwise inhibit operation of the character drive amplifiers. Thus, whenever there is an output from AND circuit 323, the character drive circuits are prevented from energizing the character selection solenoids.

The connection from AND circuit 323 to selector 324 provides the function selector with information as to the operating condition of the first, fourth and fifth levels of the code storage register 323. The function selector also must be supplied with information pertaining to the remaining stages, stages 2, 3 and 6, since the function code data may include code bits occurring at these code levels. Accordingly, each of the outputs from the second, third and sixth stages of the code storage register is coupled to an individual input circuit to function selector 324.

Function selector 324 is provided with a series of output circuits, one for each of the functions that must be controlled in the typewriter. These output circuits are connected to suitable amplifiers, shown as the function drive circuit unit 325. The individual amplifiers in function drive circuit unit 325 are suitably coupled to the function solenoids 227, 228, 229, 232 and 233 in the typewriter. In addition, output circuit connections are provided from the function drive circuit unit 325 to the EOM relay and rewind relay (FIG. 11) and to the stop circuits 365A, FIG. 12.

As noted above, there are two additional stages in shift register 306, which are actuated sequentially after the first six code stages. The seventh stage of the ring counter 306 is connected by a conductor 333 to the amplifiers in character drive circuits 318 and in function drive circuits 325. This connection is made to afford a timing control for actuation of the character selection solenoids and the function solenoids. The eighth and final stage of the shift register 306 is connected directly to storage register 317. This is a reset connection, utilized to clear the storage register, upon completion of a code interpretation operation, and thereby condition the storage register for the next code word.

It is also essential to actuate the cycle solenoid 235 to carry out each character typing operation. Cycle solenoid 235 is coupled, by a conductor 327, to a separate drive amplifier in character drive circuit unit 318. Thus, the cycle solenoid 235 is energized in response to the drive signal output from the seventh level of ring counter 306, assuring a complete typing operation.

As shown in Table I, and as discussed hereinabove, there is one character for which the code is a complete blank, this being the code for the key that types the hyphen and underline on the typewriter. When this character is being reproduced, none of the character selection solenoids 201–206 are energized. Nevertheless, the additional amplifier incorporated in the character drive circuits 318, and actuated in response to the drive impulse derived from the seventh output of the shift register 306, makes it possible to energize the cycle solenoid for the typing of the hyphen and the underline. This additional drive amplifier is also made subject to the inhibit signal from AND circuit 323 to preclude actuation of the cycle solenoid in response to a function code.

Before considering the operation of the playback circuits illustrated in FIG. 10, it should be noted that the basic operational circuits shown in this figure are de-energized except during a print cycle of the system. That is, the various operating circuits of FIG. 10 are held in an unactuated or un-energized condition until the Print switch 52 has been actuated by the machine operator. For the present, it may be assumed that this has been done and that the initial message to be re-typed is the same as described hereinabove in the recording operation:

"1. Drive along . . ."

In the course of the playback operations, the main tape 271 (FIG. 9) is driven continuously at the same rate of speed as employed in the course of the recording operation. Since there is no interruption in the tape drive, except in response to special machine functions, the tape drive unit is not shown in FIG. 10. Assuming that tape feed has been initiated, the first code "word" encountered by the read head 64 on the main track of the type is the initially recorded code for the numeral one, 0123456.

Reading of the initial code word from the tape, by reading head 64, produces seven sequential pulses, equally spaced in time, that are supplied to the amplifier 301 and, from the amplifier to Schmitt triggers 302 and 303. The initial long "zero" pulse signal actuates trigger 302, producing an output signal that is supplied to register 306 to start the ring counter in operation. The ring counter is constructed to have the same timing, for each stage, as the shift register 255 employed for recording (FIG. 9). Subsequent short code pulses are not ordinarily supplied to shift register 306 (FIG. 10) because they are too short to actuate trigger 302 and hence do not restart the ring counter. Moreover, as noted above, the counter is constructed to preclude re-cycling as long as a count-down continues.

The first pulse signal output from Schmitt trigger 303 is in time coincidence with the initial or "zero" pulse supplied to shift register 306. Because there is no zero-level output circiut from shift register 306, this first pulse in the output from Schmitt trigger 303 produces no operation in the succeeding circuits.

The second output pulse from Schmitt trigger 303 occurs in approximate time coincidence of the output signal from the initial stage of shift register 306. The reference to approximate time coincidence pertains to the fact that the output signal from the "one" level of shift register 306 is of substantial time duration, as indicated by the wave form 331 in the drawing. As long as the initial pulse signal 305 from Schmitt trigger 303 occurs somewhere within the relatively longer time interval covered by pulse 301, there is sufficient time coincidence for AND circuit 311. Accordingly, AND circuit 311 produces an output signal that is supplied to the first stage of code storage register 317.

Succeeding output pulses from Schmitt trigger 303 recur in time coincidence with output signals from the second through the sixth stages of the ring counter or shift register 306. Thus, each succeeding output pulse from trigger circuit 303, conjointly with an output signal from shift register 306, actuates one of the AND circuits 312 through 316. When this operation is completed, the shift register 306 having counted through its sixth stage, each of the storage circuits in code storage register 317 has had a single bit of information recorded in it.

As soon as the individual stages of code storage register 317 are actuated, they produce output signals that are supplied to the character drive amplifiers in circuit unit 318. The character drive circuits are not yet actuated, however. Each stage of the code storage register 317 is provided with a holding circuit to maintain recorded data therein until the register is subsequently cleared.

When the countdown in ring counter 306 reaches the seventh stage, an output signal is produced by that stage and is applied to character drive circuits 318 through conductor 333. This completes the energizing circuits for tht amplifiers in circuit unit 318, or otherwise conditions the amplifiers for conduction; and enables those amplifiers to supply suitable energizing signals to the character selection solenoids 201 through 206. Inasmuch as the code of the first character requires actuation of all of the character selection solenoids, they are all actuated in this first playback cycle.

The cycle solenoid 235 is also actuated, by means of the signal supplied thereto through conductor 327. The character selection solenoids simulate the selection operation that would be effected by the keylever for the numeral one, actuating each of the character selection latches through the extension members 211–216 (FIGS. 8, 8A, 8B). Inasmuch as the cycle solenoid 235 simultaneously pulls down the cycle bail 141 of the typewriter (see FIG. 3), the selected character is typed by the typewriter.

The countdown is completed, in shift register 306, producing an output signal on the reset line 332. This signal is supplied to code register 317, clearing the register for the recording of data for the next character. Of course, when the drive signal supplied to the character drive circuits 318 through conductor 333 is interrupted, upon the final operation in the countdown of the shift register, the character drive circuits are de-energized. This permits the character selection solenoids 201 through 206 to return to their initial positions and de-energizes the cycle solenoid 235, thereby releasing the cycle bail and conditioning the typewriter for the next typing function.

The next code encountered by reading head 64 is that pertaining to the period, the code being 0245. Again, the recorded high-frequency signals constituting the recorded code bits are sensed and detected and amplified in amplifier 30, being supplied to Schmitt triggers 302 and 303. The initial pulse from Schmitt trigger 302, the zero pulse of the code word, actuates shift register 306 and begins the countdown operation.

In this instance, there is no output pulse from Schmitt trigger 303 occurring in time coincidence with the first output signal from shift register 306. Consequently, in this cycle of operation AND circuit 311 never receives two coincident input signals and the first stage of code storage register 317 remains in its normal state with no code bit recorded therein.

There is an output pulse from Schmitt trigger 303 occurring in time coincidence with each of the second, fourth, and fifth output signals from ring counter 306. Accordingly, AND circuits 312, 314 and 315 are each actuated by coincident input signals and are effective to record individual code bits in the second, fourth and fifth levels of register 317. Like the first AND circuit 311, AND circuits 313 and 316 receive only one input signal, that from shift register 306, there being no corresponding pulse signals in the recorded data and hence no coincident pulse signals from Schmitt trigger 303. Accordingly, the fourth and fifth levels of the code storage register 317 remain unactuated.

When ring counter 306 reaches the seventh level in its countdown, a drive signal is supplied to character drive circuits 318 from conductor 333. This signal conditions each of the amplifiers in unit 318 for operation; however, only the amplifiers connected to the second, fourth and fifth levels of the code storage register receive input signals from that register. Consequently, output signals are produced only at the second, fourth and fifth outputs of the character drive circuit unit 318 actuating character selection solenoids 202, 204 and 205. Again, cycle solenoid 235 is actuated, through circuit 327, by the drive signal supplied to the separate drive amplifier in drive circuits 318. Consequently, the desired character, the period, is typed by the typewriter.

In the continuing countdown in shift register 306, the final or eighth stage is reached. Consequently, a reset signal is supplied, through line 332, to the one-word code storage register 317, clearing the storage register in preparation for the next operation.

The next code word sensed by reading head 64 is the function code for the space. This function code is 01235, as graphically illustrated in FIG. 14. The initial operations of the playback system of FIG. 10 proceed as in the case of the character codes. Thus, the detected and amplified control signal is supplied to Schmitt trigger 302 and 303. The "zero" pulse that begins the code word initiates operation of the ring counter 306. As before, the zero pulse output from Schmitt trigger 303 does not coincide with any of the output signals from ring counter 306 and hence does not affect operation of the succeeding circuits. The code bits for the function code are recorded in the first, second, third and fifth stages of storage register 317.

In this instance, the code combination includes code bits in the first and fifth levels and lacks a code bit in the fourth level. The actuation of the first and fifth stages of code storage register 317 produces output signals that are supplied to the two inputs of AND circuit 321, so that the AND circuit develops a signal that is supplied to AND circuit 323. The NOT circuit 322 also develops an output signal, there being no code bit registered in the fourth level of the code store, thus affording a second input to AND circuit 323. As a consequence, AND circuit 323 develops an output signal that is supplied to the character drive amplifiers in circuit 318, inhibiting operation of those amplifiers and preventing the amplifiers from supplying energizing signals to the character selection solenoids 201–206 and the cycle solenoid 235.

The output signal from AND circuit 323 is also supplied to function selector 324. The function selector receives additional input signals from code storage register 317 and specifically from the second and third stages of the code storage register. In the function selector, the input signals are decoded, identifying the received code signals as pertaining to the space function. Consequently, the amplifier in the function drive circuit 325 pertaining to the space function is actuated and serves to energize space solenoid 227. As in the case of the character drive circuit unit 318, the amplifier in function drive circuit 325 is energized conjointly by the drive signal from the seventh stage of ring counter 306, supplied along line 333. When the ring counter 306 counts out, a reset signal is again afforded on the output line 332, restoring the code register 317 to its initial operating condition ready for the next playback operation.

The next code word sensed by reading head 64 is that pertaining to the shift function, since the capital letter D is the next character to be typed. The signal is amplified and applied to Schmitt triggers 302 and 303, as described above, and the shift code 135 is in due course recorded in code storage register 317. Again, this is a code combination that includes code levels one and five and excludes the fourth code level. Consequently, circuits 321, 322 and 323 are all actuated and produce an output signal, from AND circuit 323, that inhibits operation of character drive circuits 318.

This same signal is also supplied to function selector 324, together with an output signal from the third stage of code storage register 317. The function selector 324 identifies the shift code and produces an appropriate output signal, supplied to a shift function amplifier in function drive circuit 325. This amplifier, upon receiving an enabling signal from drive circuit 333, from the seventh level of ring counter 306, energizes the shift solenoid 232 and causes the typewriter to shift to its upper case operating condition. In this instance, and unlike other functions of the typewriter, the particular amplifier in drive circuit 325 that actuates the shift solenoid is provided with a holding circuit that maintains the amplifier in operation and holds the shift solenoid in actuated condition even though the input signals thereto are interrupted when ring counter 306 subsequently completes its countdown operation. Thus, the reset operation by the ring counter clears code storage register 317 but leaves the shift solenoid 232 energized with the typewriter remaining in shift condition prepared to type an upper case character.

The next code word encountered by reading head 64 is the code word 01346 identifying the letter D. This character code is interpreted by the system, as described above, recording individual code bits in the first, third, fourth and sixth stages of code register 317. When shift register 306 reaches the seventh level in its countdown, the drive signal on conductor 333 is effective to energize the character drive circuits 318, since there is no inhibiting signal from the function code identification circuts 321–323. Accordingly, character solenoids 201, 203, 204 and 206 are actuated and cycle solenoid 235 is also energized. The typewriter thereupon proceeds to type the required letter D, using the upper case portion of the type head because the shift solenoid 232 remains in energized condition.

The next subsequent code word sensed by reading head 64 is the shift release code 01356. This function code is recorded, as described above, in code storage register 317, with code bits being recorded in the first, third, fifth and sixth levels of the code storage register.

Inasmuch as this is a function code, with code bits in the first and fifth levels and no code bit in the fourth level, AND circuit 323 is supplied with input signals from circuits 321 and 322 and produces an output signal that effectively inhibits operation of the character drive circuits 318. A corresponding signal is supplied to function selector 324, which also receives input signals from the third and sixth output stages of code storage register 317. The function selector identifies the shift release code and actuates function drive circuits 325 to release the holding circuit for the shift solenoid 232. As a consequence, the shift solenoid is de-energized and the typewriter is restored to lower case operation.

With respect to the remaining characters and the functions controlled by solenoids 228, 229 and 233, operation proceeds, for each code word, as described above. When a line return code is detected, there is no necessity for a terminal signal to indicate that the type head has actually reached its return position. It will be recalled that the recording tape continued to run throughout the period in which the type head was moved back to its initial position. Consequently, the time interval required to permit this action to be completed before sensing the next character code, or function code, is implicitly recorded in the tape in the blank space established in the tape in the recording operation.

When the playback system of FIG. 10 encounters the manual code on the magnetic tape, the basic operation of the system proceeds as above. Thus, the manual code 156 is recorded in code storage register 317. It is identified as a function code, with appropriate signals being supplied to inhibit the character drive circuits 318 and actuate the function selector 324. In this instance, however, an output signal is supplied from function drive output circuit 338. This signal is coupled to a stop circuit 365A (FIG. 12) to interrupt the playback operation. At this point, the operator of the system can type in whatever variable data is required without any automatic playback operation occurring and without recording the typed information on the storage tape. To continue the playback and print out operation thereafter, the operator again depresses the Print switch 52 and the playback procedure continues as described above.

Ultimately, the reading head 64 encounters the end-of-message code, this being the code 15 (see Table II). This function code is detected and interpreted in the same manner as any other character code or function code. It produces an output signal on the conductor 339, this signal being supplied to an EOM control relay 363 and a rewind operating relay 351, FIG. 11. As a consequence, the system is stopped in its printing operation and the storage tape is automatically re-wound in accordance with the control procedure described in detail hereinafter. The typing of the message is complete.

*Record, Rewind, EOM and OFF Controls*

Figure 11:
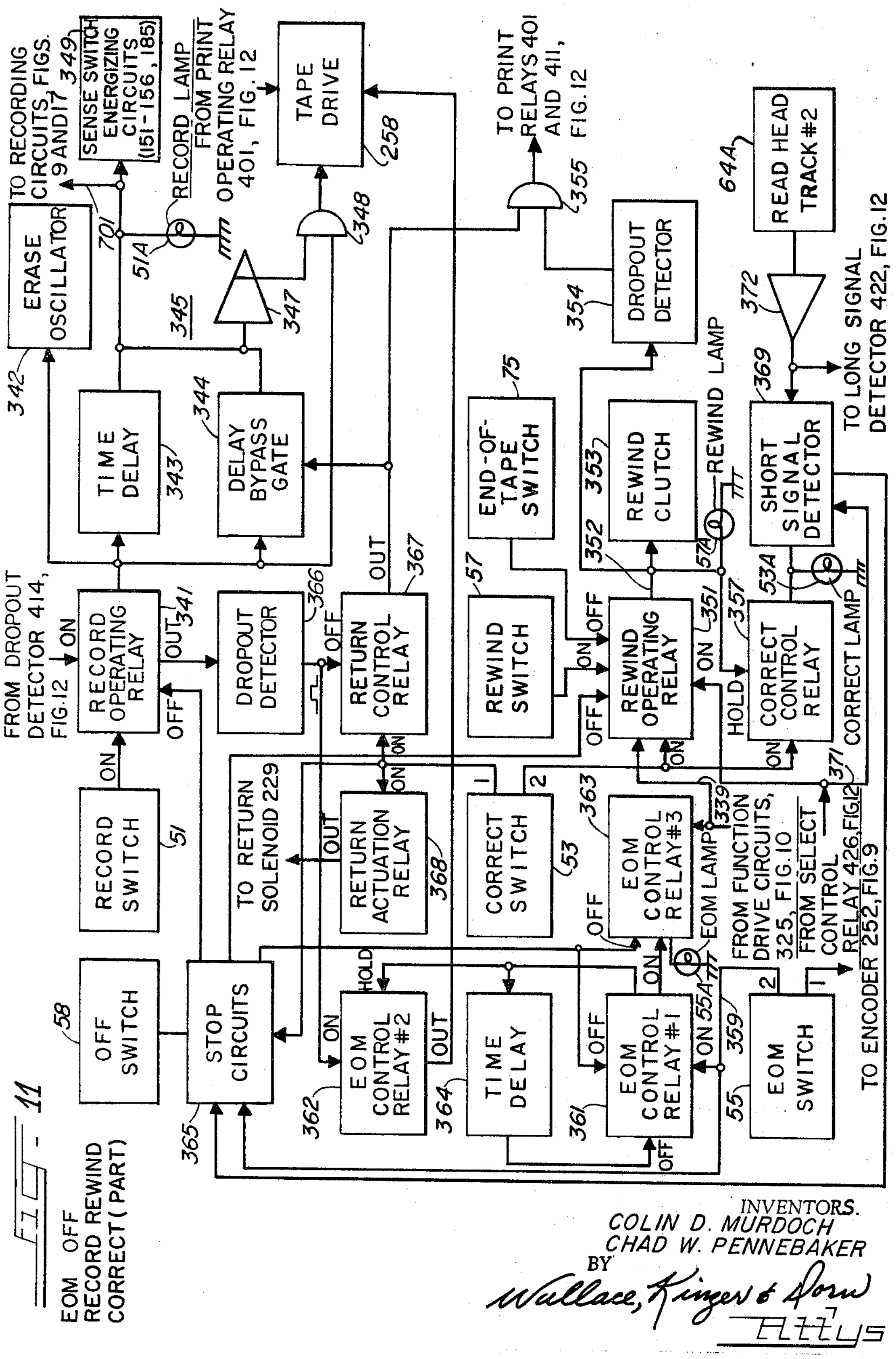
FIG. 11 is a functional block diagram of a part of the control circuits for the system.

The basic control circuits actuated by Record switch 51, Rewind switch 57, EOM switch 55, and Off switch 58 are illustrated in FIG. 11. This figure also includes the Correct switch 53 and a portion of the control circuits actuated by that switch, but the operations performed by the Correct control circuits are described separately hereinafter.

As shown in the upper part of FIG. 11, Record switch 51 is connected in an energizing circuit for a record operating relay 341. Record operating relay 341 is also provided with a separate and independent energizing circuit from a dropout detector 414, FIG. 12, described more fully hereinafter. Relay 341 may include a plurality of operating contacts. One set of contacts in the relay is electrically connected to an erase oscillator 342 that is coupled to suitable erase windings in the recording heads of the magnetic tape storage apparatus in accordance with conventional practice. Relay 341 is provided with an additional set of contacts connected to a time delay circuit 343 and to a delay by-pass gate 344.

Delay by-pass gate 344 and time delay circuit 343 are provided with a common output circuit 345 coupled to suitable energizing circuits for the character code sensing switches 151–156, as indicated by the circuit unit 346. Output circuit 345 is also connected to the indicator lamp 51A that is associated with the Record switch at the front of the typewriter (see FIG. 6). In addition, as shown in FIG. 11, output circuit 345 is coupled to an inverter or NOT circuit 347 that is in turn connected to an AND circuit 348. The second input for AND circuit 348 is taken from record operating relay 341; the AND gate continuously receives an actuating signal on this second input during time intervals in which the record operating relay is energized. The output of AND circuit 348 is connected to the tape drive circuit 258, this being the circuit that controls the capstan idler 72 as shown in FIG. 9. Tape drive circuit 258 is also provided with a second input from a print operating relay 401, FIG. 12, as described more fully hereinafter.

Rewind switch 57, shown near the center of FIG. 11, is connected to an energizing circuit for a rewind operating relay 351. There are three additional and independent energizing circuits for this relay. Thus, the rewind operating relay can be actuated by an energizing signal from the EOM output circuit 339 of function drive circuits 325 of FIG. 10. In additon, rewind operating relay 351 can be energized, independently of actuation of the rewind switch, by an actuating signal from a select control relay 426, FIG. 12. Finally, the rewind operating relay is subject to actuation by an energizing signal supplied thereto from Correct switch 53 and specifically from the second of two sets of contacts of the Correct switch. Sensing contacts 80 and 81, the tape deck guide posts (FIG. 1) are connected in a release circuit for rewind relay 351 to provide means for de-energizing the relay upon completion of a rewind operation.

Rewind operating relay 351 may include a plurality of operating contacts, all of which are actuated simultaneously; for the sake of simplicity in the drawing, only a single output circuit 352 is shown for the relay. Output circuit 352 of relay 351 is connected to a rewind clutch 353 to drive the spindle 66 (FIG. 1) and rewind the magnetic tape in main cartridge 61 to its beginning position. In accordance with customary practice in magnetic tape devices, the rewind tape movement is carried out at a tape speed substantially greater than the tape speed employed for recording and playback operations.

The output 352 of rewind operating relay 351 is also connected to a dropout detector 354. Detector 354 is a simple detector circuit employed to produce a momentary output signal when the relay is de-energized. The output of detector 354 is connected to one of two input circuits to an AND circuit 355.

Output circuit 352 of rewind operating relay 351 is also used to energize the rewind lamp 57A that is associated with Rewind switch 57 (see FIG. 3). Lamp 57A affords a positive indication of the occurrence of any rewind operation, whether initiated by the typist, or by function codes recorded on the magnetic tape of the system.

Finally, there is a connection from the output circuit 352 of rewind operating relay 351 to a Correct control relay 357. This circuit connection affords a holding circuit for the Correct control relay, the function of which is described hereinafter.

EOM switch 55, shown in the lower left-hand corner of FIG. 11, is a single-pole double-throw device. The first pair of contacts of this switch, which are closed when the switch is depressed by the typist, are connected to encoder 252 (FIG. 9) to supply an actuating signal to the encoder and thereby provide for recording of an EOM function code on the magnetic tape as described hereinabove. The second set of contacts of EOM switch 55 are normally closed; these switch contacts are initially opened when the typist depresses the switch and are then re-closed when the switch is released. A suitable detector circuit is connected to the second set of output contacts for the EOM switch; this detector (not shown) produces a momentary pulse signal on the output conductor 359 when the switch returns to its normal unactuated condition. This pulse signal is supplied to a first EOM control relay 361 and to a stop circuit unit 365. Stop circuits 365 are described in greater detail hereinafter. The connection from conductor 359 to control relay 361 provides for actuation of the relay in response to the aforementioned pulse signal, the relay being provided with a holding circuit to maintain the relay in actuated condition.

The first EOM control relay 361 may include a plurality of operating contacts. One set of contacts is connected in a holding circuit for a second EOM control relay 362. Another set of contacts is connected in an energizing circuit for a third EOM control relay 363. Relay 363, which has a second energizing circuit from EOM output line 339 (FIG. 10), is employed to energize the end-of-message indicator lamp 55A associated with the EOM switch 55 (see FIG. 3). A further set of the contacts in relay 361 is coupled to a time delay circuit 364 which in turn is coupled back into the energizing circuit for relay 361 to de-energize the relay.

Relay 362 is provided with a suitable set of contacts connected in an energizing circuit for tape drive 258. The energizing circuit for relay 362 is taken from a dropout detector circuit 366. Dropout detector 366, like circuit 354, is a simple detector circuit that produces an output signal of limited duration. In this instance, the dropout detector is coupled to a set of operating contacts in record operating relay 341. Detector 366 is also coupled to a return control relay 367 in a circuit arrangement that is effective to de-energize relay 367.

Return control relay 367 is incorporated in a series of circuits that are coupled to Correct switch 53. The Correct switch, like EOM switch 55, is provided with two sets of contacts. When the switch is depressed by the typist, an output signal is produced from the first set of contacts and this signal is supplied to return control relay 367, to a return actuation relay 368, and to stop circuits 365. Return action relay is connected to the type head return solenoid 229.

The second set of contacts of Correct switch 53 is closed when the Correct switch is released and returns to its normal position. As in the case of EOM switch 55, a detector circuit (not shown) is connected to this second set of contacts to produce a pulse output signal and it is this signal that is supplied to rewind operating relay 351 to actuate that relay. The same signal is applied to the correction control relay 357 to actuate the latter relay.

The contacts of correction control relay 357 complete an energizing circuit to Correct lamp 53A, associated with Correct switch 53, when the relay is actuated. Another set of contacts in the correct control relay complete an energizing circuit for a short signal detector 369. An alternative energizing circuit for detector 369 is provided from the select control relay 426, FIG. 12, along a conductor 371.

The signal input to short signal detector 369 is taken from the read-record head 63A, which, as noted above, constitutes the auxiliary winding on head 63 for the main tape (FIG. 1). Thus, winding 63A reads the recorded data on the second or auxiliary track 289 of the tape (see FIG. 9). The output signal from the winding 63A is coupled to short signal detector 369 through an appropriate amplifier 372. Amplifier 372 is also connected to a long signal detector 422 (FIG. 12). The output signal from short signal detector 369 is applied to stop circuits 365.

One further portion of the correction control circuits in FIG. 11 is afforded by the contacts of return control relay 367. The contacts of this relay are connected in an actuating circuit that is effective to actuate the delay bypass gate 344 in the recording control circuits. In addition, the contacts of return control relay 367 are connected in an output circuit that is coupled to the second input of AND circuit 355. The output of AND circuit 355, in turn, is connected to print relays 401 and 411 (FIG. 12).

As shown in FIG. 11, Off switch 58 is connected to stop circuits 365. Stop circuits 365, conjointly with the related stop circuits 365A of FIG. 12, is utilized to interrupt control operations in response to a variety of different operating conditions. In particular, the stop circuit unit 365 is provided with outputs connected to record operating relay 341, and to EOM control relays 361 and 363. The construction of stop circuits 365 and 365A is such that all major control functions in the system are interrupted by actuation of the stop circuits except when the initiating signal to the stop circuits originates simultaneously with actuation of one of the operating relays or EOM relay 361. In the latter case, the operating relay (or EOM relay 361) actuated simultaneously with the stop circuits remains energized. Thus, actuation of the stop circuits is always effective to de-energize EOM control relay 363. It is also effective to de-energize operating relays 341 and 351 and EOM relay 361 provided none of these relays has been energized simultaneously with the actuating signal supplied to the stop circuits.

The first operation to be considered in connection with FIG. 11 is initiated by actuation of record switch 51. When the typist depresses the record switch, an energizing circuit is completed to record operating relay 341. This relay is provided with a holding circuit that maintains the relay in its actuated condition unless and until the holding circuit is interrupted by actuation of stop circuits 365.

Actuation of record operating relay 341 completes an energizing circuit for erase oscillator 342. Actuation of the relay also energizes time delay circuit 343, producing an energizing signal in output circuit 345 atfer a predetermined time delay established by the construction of circuit 343. In a typical installation, this time delay may be of the order of two seconds. When the time delay interval is completed and an output signal is available in circuit 345, the Record lamp 51A is energized, signalling the typist that the system is ready for a recording operation. At the same time, output circuit 345 completes suitable power supply circuits for all of the recording circuits of FIG. 9 and for the sensing switches 151–156, the latter being completed through the sensing switch energizing circuits 346.

During the time interval following actuation of record operating relay 341, and before expiration of the time delay established by circuit 343, there are two input signals to AND circuit 348. The first signal comes directly from record operating relay 341 and the second signal is derived from NOT circuit 347, there being no output during this period from circuit 345. Consequently, tape drive 258 receives an actuating signal from AND circuit 348 during the time interval established by time delay circuit 343 and drives the tape forward at normal recording speed during the time delay interval. This establishes a blank section of substantial length on the tape immediately ahead of the message to be recorded, and avoids any possibility of overlap with respect to any previously recorded message. Upon expiration of the time delay interval, the signal through NOT circuit 347 is interrupted, so that no actuating signal is available to tape drive 258 from AND circuit 348. Thereafter, actuation of the tape drive occurs in response to the recording circuits (FIG. 9) as described above.

As noted above, the record operating relay 341 is provided with a holding circuit. Consequently, the system remains in the "record" condition until some other control function is initiated or the system is shut down by the typist, as by actuation of Off switch 58, EOM switch 55, or manual switch 54. Thus, the typist can continue to record for an indefinite period determined by the length of the message to be recorded and the capacity of the tape in cartridge 61.

The second operation controlled by the control circuits of FIG. 11 is the rewinding of the tape in cartridge 61. This is initiated by closing rewind switch 57, which completes an energizing circuit to rewind operating relay 351. As soon as the rewind operating relay 351 is actuated, it completes an energizing circuit to the signal lamp 57A, showing the typist that the rewind control system is operative. At the same time, a holding circuit is not material to the rewind operation because Correct switch 53 has not been actuated.

Energizing of rewind operating relay 351 also completes an operating circuit to rewind clutch 353. Clutch 353, which is preferably a simple electromagnetic clutch of the kind described and claimed in the co-pending application of Colin D. Murdoch, Ser. No. 344,907, filed concurrently herewith, now Patent No. 3,268,043, but which may be any other form of inexpensive electrically actuated clutch, completes a drive connection to the spindle 66 (FIG. 1). As a consequence, the magnetic tape in cartridge 61 is rewound at high speed. When the end of the tape is reached, the end-of-tape sensing circuit comprising posts 80, 81 and the conductive film on the tape is actuated. This circuit operates to cause the rewind operating relay 351 to drop out. The tape is now rewound completely to its initial position and is ready for subsequent operations.

The function of the Off switch 58 is the simplest of all. Closing this switch produces an actuating signal that is supplied to stop circuits 365 and also to the corresponding stop circuits 365A of FIG. 12. Actuation of the stop circuits interrupts any recording, printing or other operating cycle in which the system may be engaged and leaves the system shut down exactly as it was. No rewinding of the tape or other positive function is effected by the Off switch.

A further control function performed by the circuits illustrated in FIG. 11 is that occurring upon actuation of EOM switch 55. When switch 55 is initially depressed, an output signal is produced by the closing of one set of contacts within the switch and this signal is supplied to encoder 252 of FIG. 9 to record an EOM code on the magnetic tape, assuming that the system has previously been in its "record" operating condition. Of course, if EOM switch 55 is depressed while the system is not recording, the recording circuits of FIG. 9 are already effectively de-energized and the EOM code is not recorded on the tape. Ordinarily, the typist will not depress EOM switch 55 except upon completion of a recording operation.

When EOM switch 55 is released by the typist, a pulse signal of relatively short duration is produced on the output line 359 for the second set of contacts for the switch, as described above. This signal is supplied to stop circuits 365 to actuate the stop circuits and interrupt the recording cycle previously in progress, or any other operation in which the system has been engaged. That is, the stop circuits are effective to drop out all operating relays. However, EOM control relay 361 does not drop out because it is simultaneously energized by the same signal from line 359. Accordingly, relay 361 is energized and is maintained energized by its own holding circuit.

Actuation of control relay 361 completes an operating circuit for EOM control relay 363. This relay, when actuated, completes an operating circuit to lamp 55A, positively indicating that the EOM control circuits are functioning.

Actuation of the first EOM control relay 361 also completes operating circuits for the second EOM control relay 362 and for time delay circuit 364. The connection to control relay 362 is in a holding circuit for that relay, which has been actuated by the signal from dropout detector 366 on dropout of relay 341, assuming the system was in recording condition as would ordinarily be the case. Accordingly, the relay 362 maintains tape drive 258 energized. The signal to time delay circuit 364, after a predetermined time interval, causes the time delay circuit to produce an output signal that is effective to open the holding circuit for control relay 361 and cause the control relay to drop out. In effect, the first EOM control relay 361 automatically de-energizes itself after a predetermined time interval, preferably of relatively short duration, determined by time delay circuit 364. When relay 361 drops out, relay 362 is also de-energized, stopping the tape drive; the tape advance effected during the delay interval of circuit 364 affords a blank space on the tape and leaves the system ready for recording the next message.

An input signal to rewind operating relay 351 and to EOM control relay 363 from the function drive circuits 325 (FIG. 10) along EOM output line 339 (FIG. 11) actuates the rewind relay to initiate a rewind cycle, as described above. The EOM lamp 55A is energized by actuation of relay 363 to inform the typist that the end of a message being printed has been reached.

*Print, Select, and Manual controls*

Figure 12:
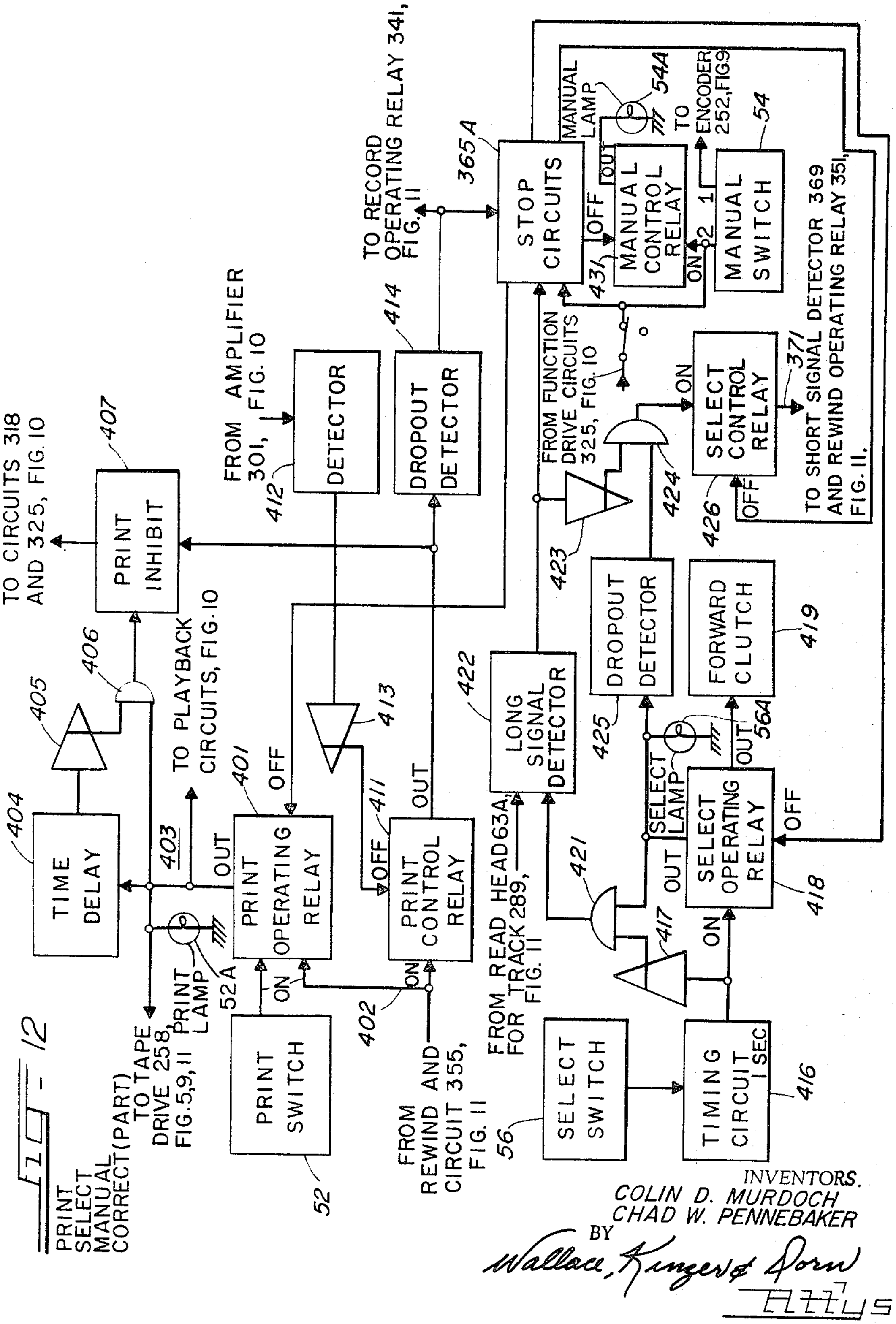
FIG. 12 is a functional block diagram of the remaining principal control circuits.

The basic control circuits actuated by Print switch 52, Select switch 56, and Manual switch 54 are all shown in FIG. 12. FIG. 12 also includes a part of the control circuits for a correction operation, the functions of which are described hereinafter.

Print switch 52 is a single-pole single-throw device that is connected in an energizing circuit for a print operating relay 401. Print operating relay 401 is also provided with an alternative energizing circuit through conductor 402 which is connected back to the AND circuit 355 in the rewind control system of FIG. 11. Print operating relay 401 (FIG. 12) includes a suitable holding circuit to maintain the relay actuated once an energizing signal has been received from print switch 52 or from conductor 402.

Print operating relay 401 may be provided with a plurality of operating contacts, although only one output circuit 403 has been shown for the sake of simplicity in the drawings. Thus, one set of the relay contacts is connected to the print lamp 52A associated with Print switch 52. Another set of contacts is connected in the power supply for all of the playback circuits of FIG. 10, energizing those circuits whenever relay 401 has been actuated. The contacts of print operating relay 401 also complete an energizing circuit for the tape drive unit 258 (FIGS. 9 and 11). In addition, the contacts of this relay are utilized to complete an operating circuit to a time delay device 404.

Time delay circuit 404 has an output that is coupled through an inverter or NOT circuit 405 to one input of an AND circuit 406. The second input of AND circuit 406 is taken directly from print operating relay 401. The output of the AND circuit is coupled to a print inhibit circuit 407, which may comprise a relay or other suitable gating device. Print inhibit circuit 407, in turn, is connected to character drive circuits 318 and function drive circuits 325 (FIG. 10).

In addition to the energizing connection to print operating relay 401, the input circuit 402 from rewind circuits 355 of FIG. 11 is connected in an energizing circuit for a print control relay 411, FIG. 12. Print control relay 411 includes a suitable holding circuit for maintaining the relay in actuated condition, once it has been energized. This holding circuit is coupled to a detector 412 that receives an input signal from the amplifier 301 in the output of the main reading head 64 (FIG. 1). An inverter or NOT circuit 413 is interposed between detector 412 and print control relay 411.

Print control relay 411 may include two or more sets of contacts, only one output circuit being shown to reduce complexity in the drawings. An output connection is provided from one set of contacts in the print control relay to print inhibit circuit 407 to actuate that circuit. Another circuit connection is provided from the contacts of print control relay 411 to a dropout detector 414. Dropout detector 414, like the similar circuits used elsewhere in the control system, produces a pulse signal of relatively short duration whenever print control relay 411 is de-energized. The output from dropout detector 414 is coupled to stop circuits 365A, which are integrated with and constitute a part of stop circuits 365 (FIG. 11). The dropout detector is also connected to an input circuit for record operating relay 341 of FIG. 11.

Select switch 56, shown in the lower left-hand corner of FIG. 12 is a single-pole single-throw switch that is connected to a timing circuit 416. Timing circuit 416, which may comprise a monostable trigger circuit, functions with a relatively long time delay, producing an output signal over a substantial time interval. For example, the timing circuit 416 may be constructed to produce an output signal over a time interval of the order of one second.

The output from timing circuit 416 is connected to an inverter 417 and to a select operating relay 418. The connection to relay 418 is in the energizing circuit of the relay. Relay 418 is provided with a suitable holding circuit for maintaining the relay in operation after the connection to timing circuit 416 is broken by timing out of that circuit.

Select operating relay 418, like the other operating relays, may include a plurality of contact pairs. One set of contacts of the relay is incorporated in an energizing circuit for a forward drive clutch 419. Clutch 419 is mechanically connected to spindle 67 on the tape deck (see FIG. 1) and is utilized to complete a drive connection for that spindle. Another set of contacts in select operating relay 418 is incorporated in an energizing circuit for the select lamp 56A that is associated with Select switch 56. Thus, lamp 56A is lit whenever select operating relay 418 is in its actuated condition, affording a positive indication that a selection operation is in progress.

The contacts of select operating relay 418 are also connected to one input of an AND circuit 421. AND circuit 421 receives a second input from inverter 417. The output of the AND circuit is connected in the power supply for a long signal detector 422 to energize the detector.

Long signal detector 422 is provided with a signal input from the reading head 63A that senses the recorded data on the second or auxiliary track 289 of the main tape. The output of long signal detector 422 is coupled to stop circuits 365A. In addition, the output from long signal detector 422 is supplied to an inverter or NOT circuit 423.

The output of NOT circuit 423 is connected in one input to an AND circuit 424. A second input for AND circuit 424 is derived from a dropout detector 425. Dropout detector 425 is connected to one set of contacts in select operating relay 418 to produce a momentary output signal whenever that relay is de-energized. The output of AND circuit 424 is connected in the energizing circuit of a select control relay 426.

Select control relay 426 is provided with a holding circuit for maintaining the relay in operation, once it has received an energizing signal from AND circuit 424. The contacts of the select control relay are connected in the power supply circuit for short signal detector 369, FIG. 11, as indicated by conductor 371. The contacts of the select control relay are also connected in an energizing circuit for rewind operating relay 351 of FIG. 11.

As shown in the lower right-hand corner of FIG. 12, Manual switch 54 is provided with two outputs. This switch, like EOM switch 55 and Correct switch 53, is a single-pole double-throw device. When the switch is depressed by the typist, a first set of contacts are closed to complete an operating circuit to the encoder 252 (FIG. 9) and thereby provide for recording of the manual code on the storage tape as described hereinabove. When the switch is released, the first set of contacts is opened and the second set is closed. As with the similarly constructed switches described above, a detector circuit (not shown) is connected to the second set of switch contacts to produce a momentary output signal upon closing of the contacts.

The short-duration output signal produced by the release of Manual switch 54 is applied to a manual control relay 43, to energize the relay. The same signal is supplied to stop circuits 365A. Relay 431 requires only a single set of contacts and is utilized to energize the manual lamp 54A that is associated with switch 54 and thus give a positive indication that the manual recording operation is being carried out by the system.

Stop circuits 365A, which are an integral part of stop circuits 365 of FIG. 11, are provided with a plurality of output connections of various relays in the system. Thus, stop circuits 365A are connected to print operating relay 401, to select operating relay 418, and to select control relay 426 and manual control relay 431. The connections to the operating relays 401 and 418 are such as to de-energize those relays and cause those relays to drop out unless the relays are energized simultaneously with actuation of the stop circuits. The connections to most of the control relays, on the other hand, are such as to cause those relays to drop out even though they might be energized simultaneously with actuation of the stop circuits.

In addition to the input circuits described above, stop circuits 365A are provided with an input circuit from function drive circuits 325 (FIG. 10) through the conductor 338. The connection from conductor 338 is also completed into the energizing circuit for manual control relay 431.

The first major function that is controlled by the circuits of FIG. 12 is the playback or print operation. This is initiated by the typist depressing Print switch 52, completing an energizing circuit to print operating relay 401. As soon as this is accomplished, the closing of contacts in the relay completes an operating circuit for print lamp 52A and affords the typist a positive indication that a print cycle is in progress. At the same time, closing of the relay contacts completes power supply circuits to all of the main playback operating circuits (FIG. 10).

Actuation of print operating relay 401 also actuates time delay circuit 404. Circuit 404 does not immediately produce an output signal, due to its delay characteristics. Consequently, the signal supplied from print operating relay 401 to AND circuit 406, upon actuation of the relay, is coincident with an output signal from inverter or NOT circuit 405, indicating the absence of an output signal from time delay circuit 404. In response to these two input signals, AND circuit 406 supplies an actuating signal to print inhibit circuit 407 which in turn produces an output signal that is applied to an inhibit input to character drive circuits 318 and function drive circuits 325 (FIG. 10).

The purpose of print inhibit circuit 407 is to avoid any erroneous printout that might result from transient signals recorded in the main track of the tape or occurring in the control circuits as the result of switching operations in the control system or other factors. The time delay interval for circuit 404 should be made shorter than the record time delay of circuit 343 (FIG. 11) so that no pertinent recorded information is omitted in the print out cycle.

The only other function necessary, on the part of the circuits of FIG. 12, in initiating a printing playback operation, is actuation of tape drive 258. This is accomplished by the connection to the print operating relay 401 of FIG. 12, which maintains tape drive 258 energized to drive the tape continuously during print out. This condition is maintained until the print out operation is interrupted by occurrence of an EOM signal or a manual signal on the tape, or until some control operation is initiated by the operator. The tape drive moves the tape at the same speed, during print out, as during actual recording operations, but does not interrupt tape movement to correspond to the many interruptions that occur during the recording operation. In practical effect, this causes the typewriter 31 to function near its maximum speed during the entire print out operation.

A further control function initiated by the circuits of FIG. 12 is the manual control function. When Manual switch 54 is depressed, it first closes the contacts connected to encoder 252 (FIG. 9) to record a manual code on the tape as described hereinabove. When the switch is released, it closes its alternate contacts and produces an energizing signal of short duration that is supplied to relay 431 and to supply circuits 365A.

Actuation of manual control relay 431 serves only to light lamp 54A and thus indicate to the typist that the manual function of the system has been effected. The signal to stop circuits 365A causes the stop circuits, conjointly with the corresponding stop circuits 365 of FIG. 11, to drop out all operating relays of the system and to interrupt any system cycle that may be in progress. Of course, if the typist depresses Manual switch 54 in the course of a print out operation, the recording circuits of FIG. 9 are not energized and no manual code is recorded on the tape. Thus, if the manual switch is erroneously actuated, it merely stops whatever operation was in progress. As a precautionary measure, the power supply to switches 54 and 55 may be provided through record operating relay 341, since the EOM and manual switches should be used only during a recording operation.

The third major control function performed by the circuits of FIG. 12 is actuated by depressing Select switch 56. Switch 56, as noted in the preliminary description, is used to select messages subsequent to the first message on a tape containing a plurality of individual letters or like messages.

The closing of switch 56 completes an energizing circuit for timing circuit 416. As noted above, circuit 416 is preferably a one-shot trigger circuit that produces an output signal for a predetermined time interval, in this instance an interval of the order of one second. This signal is supplied to inverter 417 and is also applied to select operating relay 418 to energize that relay. As soon as relay 418 is actuated, it completes an operating circuit for select lamp 56A, giving a positive indication that the select cycle is going forward within the system. At the same time, closing of relay 418 energizes forward drive clutch 419, completing a driving connection to spindle 67. Spindle 67 drives the tape in a forward direction at a high speed as long as clutch 419 is energized.

When the output signal from timing circuit 416 stops, NOT circuit 417 produces an output signal that is supplied to AND circuit 421. Since select operating relay 418 has already been actuated, circuit 421 receives a second input from the relay. Consequently, AND circuit 421 produces an output signal that completes an energizing circuit for long signal detector 422. Long signal detector 422 receives its input signal from the reading head 63A that scans the second or auxiliary track 289 on the magnetic tape. Detector 422 is constructed with a time delay characteristic such that it is not sensitive to the short signal pulses recorded on the auxiliary track of the tape as the result of type head return operations. Instead, detector 422 produces a significant output signal only when its input includes a long signal burst of the kind that identifies the beginning of a letter or other message on the tape, as recorded on the tape by the circuit comprising Record switch 51, timing circuit 272, oscillator modulator 273 and recording head 63A (FIG. 9).

When long signal detector 422, FIG. 12, receives a long start-of-message signal from reading head 63A, it produces an output signal that is supplied to stop circuits 365A. As a result, stop circuits 365A operate to drop out select operating relay 418. This opens the energizing circuit for forward clutch 419 and stops the movement of the tape. Accordingly, the initial portion of the search procedure, identification of the beginning of the next message on the tape, is complete. But the high speed of the tape effected by the forward drive, through clutch 419, almost inevitably causes some over-shoot in the search operation. Consequently, it is necessary to locate the beginning of the message more accurately to assure a complete print out operation after selection has been accomplished.

When select operating relay 418 drops out, this action is detected by dropout detector 425, which produces an output signal that is applied to one of the inputs to AND circuit 242. Drop out of relay 418 also breaks the energizing connection for long signal detector 422, through AND circuit 421. Consequently, a second input to AND circuit 424 is now available through the NOT circuit 423. Accordingly, AND circuit 424 produces an output signal that is applied to select control relay 426, actuating that relay.

Actuation of select control relay 426 completes the energizing circuits for short signal detector 369 and for rewind operating relay 351, both of which are shown in FIG. 11. Energization of rewind operating relay 351 starts a rewind operation, which proceeds as described above when the same relay was energized in response to actuation of rewind switch 57.

As the tape starts to rewind, the second or auxiliary track of the tape is effectively searched by short signal detector 369, which has been energized from select control relay 426. Short signal detector 369 is sensitive to both the short-duration signals indicative of a type head return operation, and the long-duration signals representative of the beginning of a recorded message. Since the forward movement of the tape was stopped almost immediately after encountering a long-duration signal for the begining of the message, the first signal detected by short signal detector 369 should be that same start-of-message signal. Upon encountering this portion of the recording, read head 63A produces an output signal that is detected by detector 369 to produce an output signal that is supplied to stop circuits 365. Stop circuits supply a de-energizing signal to rewind operating relay 351 and the tape stops in the relatively long interval between messages. Thus, the tape position is such that initiation of a print out operation will cause the second message on the tape to be printed.

The selection operation described above is accomplished within a very short time interval, a matter of seconds, due to the rapid speed at which the tape is driven in the course of the forward and rewind movements required. To pick up the third message on the tape, it is a simple matter to repeat the select operation, which causes the system to search for the beginning of the next message on the tape. This can be repeated a number of times to pick out any recorded message on the tape without substantial loss of time.

*Correct controls*

As noted hereinabove in the general description of the system, a correction is effected, in the course of the recording, by pressing the Correct switch 53. This causes the typewriter to return to the beginning of the line on which it has been typing, after which the operator re-types the complete line with the correct information. The control functions required for this operation are carried out by circuits in FIGS. 11 and 12, starting with Correct switch 53 in FIG. 11.

When Correct switch 53 is depressed by the typist, the first set of switch contacts are closed, applying operating signals to stop circuit 365, return control relay 367, and return actuation relay 368. The signal to stop circuits 365 causes the stop circuits, conjointly with the associated stop circuits 365A of FIG. 12, to interrupt any system operation previously in progress, usually a recording operation. Energization of return actuation relay 368 completes an operating circuit for return solenoid 229, causing the type head of the typewriter to return to the beginning of the line. The signal supplied to return control relay 367 actuates that relay, which is provided with a holding circuit that holds the relay in energized condition in preparation for subsequent operations as described hereinafter.

When Correct switch 53 is released, its second set of contacts are closed to produce, as noted above, a short-duration actuating signal. This signal is supplied to rewind operating relay 351 and to correct control relay 357, energizing both relays. The correct control relay 357 is held in actuated condition by a holding circuit that includes the contacts of rewind operating relay 351, as indicated by the hold circuit connection between the two relays in FIG. 11. The rewind operating relay is held actuated by its own holding circuit.

Actuation of rewind operating relay 351 again begins a rewind operation with respect to the tape, as described hereinabove. Energization of correct control relay 357 completes an energizing circuit to correct lamp 53A, giving the typist a positive indication that the correction cycle is proceeding. Actuation of this relay also completes an energizing circuit to short signal detector 369.

Short signal detector 369 searches the second or auxiliary track on the magnetic tape to find a recorded signal thereon. Ordinarily, it will first encounter a short-duration carriage return signal. However, it may happen that the detector will first detect a long-duration start-of-message signal, as would happen if the error made by the typist occurred in the first line of a message. As soon as detector 369 identifies a recorded signal of either kind, it produces an output signal that is supplied to stop circuit 365, dropping out rewind operating relay 351 and correct control relay 357. The magnetic tape has now been returned to the beginning of the line and is stopped approximately in that position. However, due to the rapid rewind movement, some over-shoot almost inevitably occurs.

When rewind operating relay 351 drops out, this action is detected by drop out detector 354, which supplies a short-duration input signal to AND circuit 355. AND circuit 355 receives a second input signal from the return control relay 367, which is still held energized as described above. Accordingly, the AND circuit produces an output signal that is supplied to print operating relay 401 and to print control relay 411 in FIG. 12.

Referring to FIG. 12, it may be seen that actuation of print control relay 411 produces an output signal that is applied to print inhibit circuit 407. Print inhibit circuit 407 produces an output signal that prevents actual printing in the course of the playback cycle that is now initiated by the actuation of print operating relay 401, simultaneously with actuation of print control relay 411. That is, the system now operates as in a print out cycle, but without actually typing any material on the paper in the typewriter.

During the resulting non-printing playback cycle, the reading head for the main track 288 on the tape, reading head 64 of FIG. 10, monitors the first track on the tape. The resulting output signals from the main track reading head 64 are supplied to the playback circuits of FIG. 10, but there is no print out operation because of the inhibit signal from circuit 407 of FIG. 12. The same output signals from the reading head and associated amplifier 301 are applied to detector 412, FIG. 12. As long as there are code signals on the tape, there is an appreciable output signal from detector 412 and this output signal is supplied to inverter 413. Inverter 413, functioning as a NOT circuit, does not produce an output signal as long as detector 412 continues to find code signals on the tape. The circuit comprising detector 412 and NOT circuit 413 should have a sufficient delay characteristic to preclude premature development of an output signal, by the inverter, in the short time intervals between adjacent code bits.

When the reading head encounters a relatively long blank interval on the tape, indicative of a typehead return operation, the output from detector 412 is effectively interrupted for an appreciable time interval, longer than the delay characteristic of circuits 412, 413. As a consequence, NOT circuit 413 produces an output signal that is applied to the operating circuit of print control relay 411 and causes the print control relay to drop out.

When print control relay 411 drops out, this action is detected by dropout detector 414. Detector 414 produces an output signal that is applied to stop circuits 365A. Accordingly, the stop circuits cause the print operating relay 401 to drop out, thereby stopping the non-printing playback cycle that has been in progress. The same output signal from detector 414 is supplied to record operating relay 341 of FIG. 11 to actuate that relay. Even though stop circuits 365A and the corresponding stop circuits 365 of FIG. 11 apply a dropout signal to record operating relay 341, that relay is actuated because it has been energized simultaneously with the application of the actuation signal to the stop circuits.

Actuation of record operating relay 341 re-initiates a recording cycle as described above. That is, actuation of relay 341 restores the system to its recording condition, as it was at the time Correct switch 53 was actuated to initiate the correct cycle. There is one difference, however. In this instance, there is no delay occasioned by time delay circuit 343, since bypass gate 344 has been energized by return control relay 367, which was actuated at the beginning of the Correct cycle. This precludes the establishment of a long time blank space at the beginning of the new material recorded after the correct operation; a long blank section would be undesirable, being indicative of a new message, inasmuch as the correction may occur in the middle of a message.

The recording cycle continues with no change, as compared with the recording cycle noted above, except that return control relay 367 remains energized and delay bypass gate 344 remains actuated as described above. When the typist completes the message, and initiates an EOM cycle, record operating relay 341 drops out. This action is detected by dropout detector 366 and produces a momentary output signal that is applied to return control relay 367 to cause that relay to drop out. The signal from dropout detector 366 should be made shorter in time than the energizing signal from the initial contacts of correct switch 53 in order that the return control relay 367 may be effectively actuated at the beginning of the correct cycle.

*Addressing system*

Figure 13:
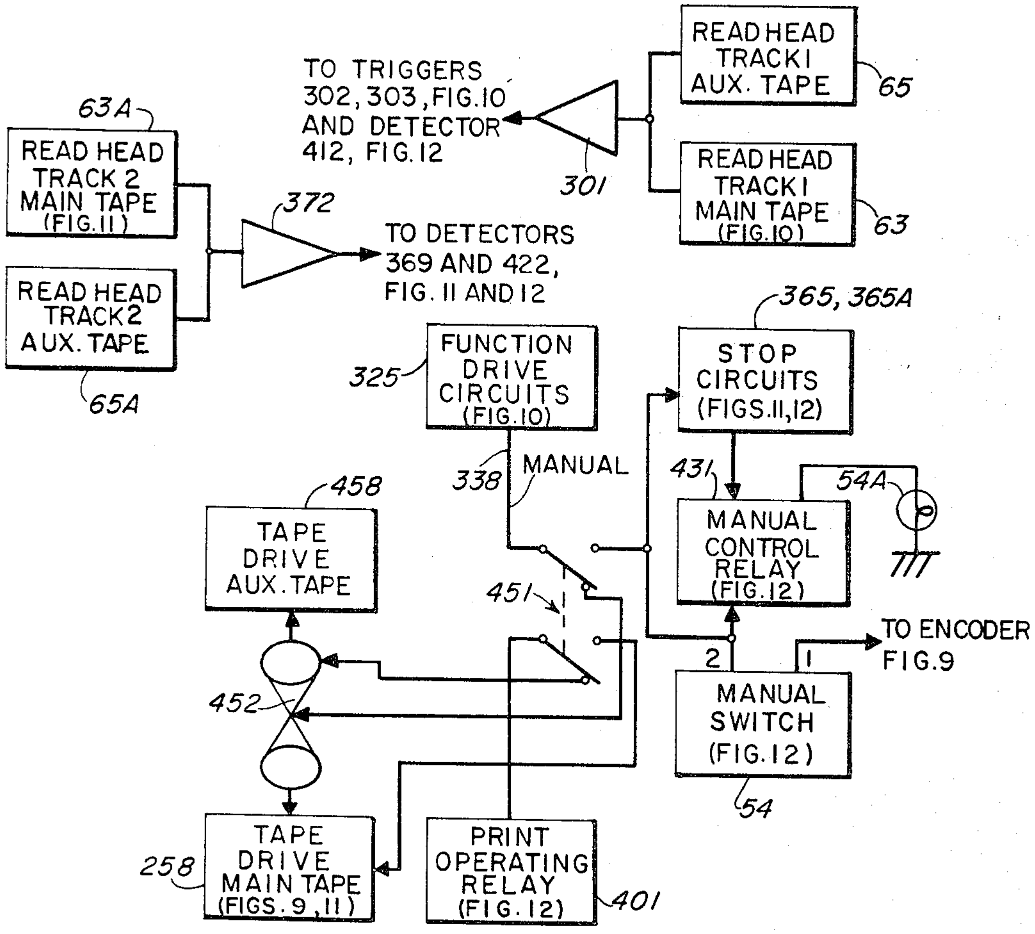
FIG. 13 is a functional block diagram of a modification of the invention utilized in addressing letters and like applications.

FIG. 13 illustrates, in a schematic block diagram, a relatively simple modification of the basic system of FIGS. 1–12 that may be effected for semi-automatic addressing of a substantial number of letters or other messages. In this modification of the invention, the second tape cartridge 62 is utilized as the storage medium for an address list. A series of addresses are recorded on the tape, with cartridge 62 mounted in the position shown for cartridge 61, each individual address ending with a "manual" code rather than an EOM code. When the address list is completely recorded, cartridge 62 is re-mounted in the system in the position shown in FIG. 1.

As shown in FIG. 13, the system may include the second reading head 65 for reading the main track on the auxiliary tape in cartridge 62. Reading head 65 is connected directly to the amplifier 301 that also serves to amplify the output of the main reading head 64 for the main tape. The two reading heads can be connected in parallel with each other in the input to amplifier 301 with no necessity for gating and no requirement for additional amplifiers, because the two reading heads are not used simultaneously.

The reading head for the second tape may also be provided with a reading winding for use with the auxiliary track on the second tape, as indicated by reading head 65A in FIG. 13. Head 65A need not be a separate physical unit but may simply constitute a second reading element mounted in a dual head with device 65. The second reading head 65A is connected to the input for amplifier 372, in parallel with the reading head 64A that reads the auxiliary track on the main tape. Again, since the two reading heads 64A, 65A do not function at the same time, there is no necessity for any switching arrangement in the input to amplifier 372.

To provide for semi-automatic addressing operations, an Address switch 451 is added to the system. Preferably, this switch is incorporated in the group of switches 51–58 at the front of the typewriter (see FIG. 1) and is provided with a suitable signal light to indicate when the switch has been actuated. As shown in FIG. 13, the switch 451 is a double-pole double-throw device. One pole of switch 451 is interposed in conductor 338 between the manual output line from function drive circuit 325 (FIG. 10) and the manual control circuits (FIGS. 11 and 12). For complete correlation with preceding views, the entire manual control arrangement including manual switch 54, manual control relay 431, and stop circuits 365, 365A is shown in FIG. 13. In the drawing, switch 451 is shown in its actuated condition for addressing operations; ordinarily, if a semi-automatic addressing operation were not in progress, switch 451 would be closed to its alternate position to enable the system to operate entirely in the manner described above.

The second pole of switch 451 is interposed in the circuit between print operating relay 401 and tape drive 258. When switch 451 is actuated as shown in FIG. 13, the manual output 338 from function drive circuits 325 is connected to a bi-stable trigger circuit 452. With the switch in its illustrated position, trigger circuit 452 is also interposed in the normal connection between print relay 401 (FIG. 12) and tape drive 258 (FIGS. 9 and 11). The second output from trigger circuit 452 is connected to an auxiliary tape drive circuit 458 which is utilized to actuate the idler 72 (FIG. 1) to advance the tape in the second cartridge 62 rather than the tape in the main cartridge 61.

In considering the function of the addressing modification of the system illustrated in FIG. 13, it may be assumed that an address tape in cartridge 62, containing a series of addresses each terminated by a "manual" code rather than an EOM code, is mounted in operative position on the tape deck of the machine. A main tape cartridge 61, containing the message to be sent to each of the addresses in cartridge 62 is also mounted on the tape deck. The message on the main tape ends in the usual EOM code. The typist has actuated switch 451 to the position shown in FIG. 13 and starts the operation by actuation of Print switch 52 (FIGS. 1 and 12), thereby actuating print operating relay 401.

As shown in FIG. 13, print operating relay 401 is now connected to the two tape drives 258 and 458 through the second pole switch 451 and trigger circuit 452. Moreover, the connection is such as to actuate trigger 452, through a suitable steering circuit, to complete an energizing circuit for auxiliary tape drive 458 rather than main tape drive 258. Consequently, as the system starts its print-out operation, it is the auxiliary or address tape in cartridge 62 that is advanced and read, so that the first address from this tape is typed by the typewriter.

As typing proceeds, the reading head 65 for the main track of the address tape ultimately reaches and reads the manual code indicative of the end of the first address. This produces a "manual" output signal from function drive circuits 325, as described hereinabove, along conductor 338. This signal is supplied, through switch 451, to trigger 452, actuating the trigger circuit to its second stable state and completing the power supply circuit to main tape drive 258. At the same time, of course, the changeover in the trigger circuit effectively de-energizes the address tape drive circuit 458.

Since the system is now conditioned for actuation of the main tape drive 258, it is this tape that is advanced and sensed by reading heads 64 and 64A. Accordingly, the typewriter now proceeds to type the desired message from the main tape, on the same sheet and following the address that was previously typed from the address tape. When the typing of the letter or other message is complete, the EOM code at the end of that letter shuts down the system and rewinds the main tape in cartridge 61 as described above. It should be noted, however, that since the initial address message ended with a "manual" code rather than an EOM code, there was no rewinding of the address tape.

At this point, the first leter is complete. The typist now removes the letter from the typewriter, inserts a new sheet of paper, and again presses Print switch 51. The Print switch again triggers circuit 452 to that stable state in which auxiliary tape drive 458 is energized. Consequently, print-out is initiated on the basis of data from the address tape in the second cartridge. But the system does not repeat the first address on that tape. Rather, it continues and picks up the second address on htat tape. When the "manual" code at the end of that address is reached, the resulting signal supplied to trigger circuit 452 through switch 451 actuates the trigger to its second stable state and completes the energizing circuit for main tape drive 258. In this state, the trigger circuit again cuts off auxiliary tape drive 458, so that typing now proceeds with the reproduction of the letter from the main tape. This process is repeated through each address on the address tape in cartrdige 62, until each address on the list has been utilized in the preparation of a complete letter.

The addressing system does not prevent the insertion of variable data in the letters. However, such data must now be recorded on the address tape as a part of each address. For example, it may be that each address should be associated with a letter having a different name or date inserted in the letter at some point. When the address tape is prepared, each address is followed immediately by the insertion or insertions that tre to be used with that address, the insertion ending with a manual code just as in the case of the address itself. In the recorded data on the main tape, the usual "manual" codes are inserted in the letter at the points at which the variable data must be incorporated therein.

With this arrangement, typing of the first letter starts, as before, with the initial address on the address tape. When the manual code at the end of that address is reached, the system switches over to the main tape and begins typing the letter. When the manual code in the letter is reached, an output signal is again produced on line 338 and is supplied to trigger circuit 452, switching that circuit back to its initial stable state to energize the address tape drive circuit 458. The next recorded data on the address tape is an insertion for the first letter, and this is typed by the system. That insertion ends with a "manual" code, which automatically switches the system back to the main tape, as described above, and the letter is continued.

It can be seen from the foregoing that any number of insertions can be made from the address tape into the main tape. The "manual" codes on both tapes are utilized simply to switch the system back and forth between the two tapes. There is no stopping of the print-out operation and no rewinding of either tape except upon occurrence of an EOM code at the end of a message on the main tape, which rewinds the tape and stops print-out as described above.

*Specific playback circuits*

FIGS. 15 through 22 illustrate certain specific circuits that may be utilized in constructing an automated system pursuant to the invention. It should be understood that the detail circits shown in those figures and described more fully hereinafter are presented merely by way of example and that equivalent circuit arrangements may be employed without departing in any way from the invention.

Figure 16:
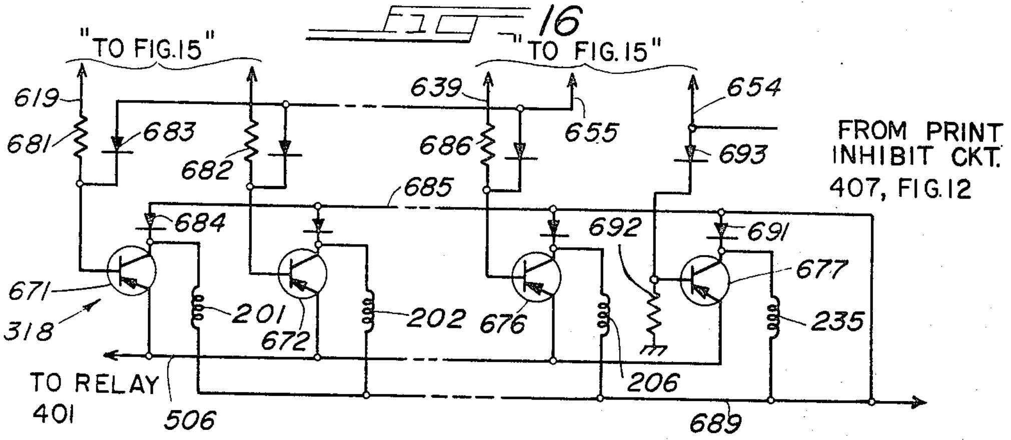
FIG. 16 is a detail schematic diagram of an additional portion of the playback circuits.

FIG. 15 shows exemplary circuits that may be employed for Schmitt triggers 302 and 303, shift register 306, AND circuits 311–316, and code storage register 317 (see FIG. 10). FIG. 16 illustrates a typical circuit ararngement that may be employed for character drive circiuts 318. Due to the close relationship between all of these circuits, FIGS. 15 and 16 are considered conjointly herein.

As shown in FIG. 15, Schmitt trigger 302 is of conventional construction and includes two NPN transistors 501 and 502. The base electrode of the first transistor 501 is connected through two series-connected resistors 503 and 504 to the amplifier 301 in the output of the reading head for the main track (see FIG. 10). The common terminal of resistors 503 and 504 is bypassed to system ground by a capacitor 505.

The collector of transistor 501 is connected to a power supply line 506 through a resistor 507. Line 506 is open-circuited except when print operating relay 401 has been actuated. When the print operating relay is actuated, however, it completes an energizing circuit to line 506, establishing that line at a predetermined operating potential.

The collector of transistor 501 is also connected, through a coupling resistor 508, to the base electrode of the second transistor 502 in the trigger circuit. The emitters of the two transistors 501 are returned to system ground through a resistor 509. The base electrode of transistor 502 is returned to system ground through a resistor 511. The Schmitt trigger circuit is completed by connection of the collector of the second transistor to the power supply line 506 through a resistor 512, the output from the trigger circuit also being taken from this collector through a coupling capacitor 513.

The second trigger circuit 303 of the playback system as shown in FIG. 15, is generally similar to circuit 302 but has been modified slightly to afford a narrower, more sharply peaked output pulse signal. Circuit 303 comprises a pair of NPN transistors 521 and 522. The base electrode of the first transistor 521 is connected to amplifier 301 through a coupling circuit comprising a resistor 524 in series with a capacitor 523. The common terminal of circuit elements 523 and 524 is returned to the supply line 506 through a resistor 525.

The collector of transistor 521 is connected to the supply line 506 through a resistor 527. This collector is also connected, through a resistor 528, to the base electrode of the second transistor 522. The emitters of both transistors are returned directly to system ground.

The collector of the second transistor 522 of Schmitt trigger 303 is coupled to the input to the circuit through a capacitor 529. This collector is also connected to the power line 506 through a resistor 532. A coupling capacitor 533 is connected to the collector of transistor 522 to afford an output circuit for the trigger. This output circuit further includes a parallel combination of a resistor 534 and a diode 535, connected from capacitor 533 to power line 506 to afford a shaping circuit in the output of the trigger.

FIG. 15 illustrates one circuit arrangement that may be used for the shift register or ring counter 306 in the playback circuits. Inasmuch as the various stages of the ring counter are substantial duplicates of each other, only four stages are illustrated. These include an initial or starting stage, and the first, seventh and eighth operating stages of this shift register. As shown in FIG. 10, the register is required to have a total of eight output circuits; no output is taken directly from the initial stage, which is utilized simply to initiate operation of the counter.

The initial or "zero" stage of ring counter 306 comprises a pair of NPN transistors 541 and 542. The base electrode of transistor 541 is connected to the coupling capacitor 513 in the output of Schmitt trigger 302. The base electrode of transistor 541 is also connected through a resistor 543 to the power supply line 506 and is coupled through a capacitor 544 to the collector of the second transistor 542 in this stage of the counter. The emitter of transistor 541 and the emitters of all other transistors in the counter are returned directly to system ground.

The collector of transistor 541 is connected through a resistor 545 to the power supply line 506. A coupling resistor 546 connects this emitter to the base electrode of the second transistor 542 in this stage of the counter. The collector of transistor 542 is connected to the supply line 506 through a resistor 547. This stage of the counter is completed by a coupling capacitor 548 that couples the collector of the first transistor 541 in the stage to the base electrode of the first transistor 551 in the succeeding stage of the counter.

Transistor 551 is incorporated, with a second transistor 552, in a circuit identical with that used for transistors 541 and 542, to afford the "one" stage of the counter, this being the first stage from which an output is taken. This stage of the counter terminates with a coupling capacitor 558 that is connected to the next succeeding stage of the counter, the latter having been omitted from the drawing because of space limitations.

The "seven" stage of shift register 306 includes two transistors 561 and 562 which are connected in a circuit essentially identical with the circuit described hereinabove for the initial or "zero" stage. The coupling capacitor 568 in the output of this stage is connected to the base electrode of the first transistor 571 in the eighth and final stage of the counter. This final stage includes a second transistor 572, and again utilizes a circuit arrangement essentially identical to the preceding stages. The only difference with respect to the eighth stage of the counter is that the output thereof is not coupled through a coupling capacitor, such as capacitors 548, 558 and 568, to a succeeding stage of the counter, there being no succeeding stage.

In addition to the individual stages described above, there is a steering circuit comprising a transistor 575 in the initial portion of the counter. The base electrode of transistor 575 is connected through a resistor 576 to an inhibit line 577. Inhibit line 577 is connected through a series of diodes 581, 582, 586, 587 and 588 to the individual stages of the counter following the "zero" stage. The connection shown for the "one" stage is typical; diode 581 is connected from the collector of the first transistor 551 in this stage of the counter to the inhibit line 577. This arrangement is carried out consistently through the circuit. Line 577 is connected to a capacitor 578 that is returned to system ground. The collector of transistor 575 is directly connected to the collector of the first transistor 541 in the preliminary stage of the ring counter.

Stages "one" through "six" of the ring counter constituting shift register 306, following the initial "zero" stage, are each individually connected to one of the AND circuits 311–316, as shown in FIG. 10. In FIG. 15, the AND circuit 311 is illustrated as comprising a transistor 591. AND circuits 312 and 316 are also shown in FIG. 15, and comprise transistors 592 and 596 respectively.

The emitters of the individual transistors constituting AND circuits 312–316 are each returned directly to a line 597 connected to the coupling capacitor 533 in the output of Schmitt trigger circuit 303. The base electrode of transistor 591 in AND circuit 311 is connected through a resistor 601 to the collector of the first transistor 551 in the "one" stage of ring counter 306. Similarly, the base electrode of transistor 592 is connected through a resistor 602 to the "two" stage of the ring counter. The last AND circuit 316 includes a circuit connection from the base of transistor 596 through a resistor 606 to the "six" stage of the shift register.

FIG. 15 also shows the first and sixth stages for one form of construction for storage register 317, together with a clearing or release circuit for the storage register. The initial stage of storage register 317, as illustrated in FIG. 15, comprises a PNP transistor 611 and an NPN transistor 612. The first transistor 611 in this stage of the storage register has a base electrode connected through a resistor 613 to the collector of transistor 591 in AND circuit 311. Another resistor 615 is connected from the collector of transistor 591 to the power supply line 506, affording a voltage divider circuit in the input to transistor 611. The base electrode of transistor 611 is also connected through a resistor 614 to the collector of the second transistor 612 in this stage of the storage register.

The emitter of transistor 611 is connected directly to the power supply line 506. The collector of transistor 612 is connected through a resistor 616 to a connecting line 617 that leads to a power supply circuit 618 described more fully hereinafter. In addition, the collector of transistor 612 is connected to an output line 619 that extends into the initial stage of the character drive circuits 318 illustrated in FIG. 16.

The base electrode of transistor 612 is connected to the collector of transistor 611 through a resistor 621. The collector of transistor 611 is also connected through a resistor 622 to a fixed voltage supply line 623.

The sixth stage of storage register 317, also shown in detail in FIG. 15, is essentially identical in construction to the first stage. It includes two transistors 631 and 632. The input to transistor 631 is connected back to AND circuit 316 through a voltage divider 633, 635. The output of the circuit is taken on the conductor 639, which extends into the sixth stage of the character drive circuits of FIG. 16. As before, a resistor 636 connects the collector of the second transistor 632 to the conductor 617.

Power supply circuit 618 is constructed as a DC amplifier controlled in part by the output of the seventh stage of shift register 306. The initial transistor 641 in power supply circuit 618 has its base electrode connected through a resistor 647 to the collector of the initial transistor 561 in the "seven" stage of the ring counter. The emitter of transistor 641 is returned to ground through a relatively small resistor 642. The collector of this transistor is connected directly to the base electrode of a second transistor 643 in the power supply circuit. The collector electrode of transistor 641 is also connected through a resistor 644 to a power supply line 645. In addition, the collector of transistor 641 is returned, through a resistor 646, to the main supply line 506 of the playback circuits.

The collector electrode of transistor 643 is connected through a resistor 648 to the supply line 645. The emitter of this transistor is directly connected to the base electrode of a third transistor 649 in the power supply circuit. The emitter of transistor 643 is also returned to system ground through two resistors, connected in series and identified by reference numerals 651 and 652 respectively. The common terminal of these two resistors is connected through a diode 653 to a conductor 654 in the character drive circuits 318 of FIG. 16.

The emitter of the third transistor 649 in the power supply circuit 618 (FIG. 15) is connected to a conductor 655 that is common to all of the character drive circuits of FIG. 16. Referring again to FIG. 15, the collector of transistor 649 is connected directly to the conductor 617 that affords a reference potential in each of the stages of storage register 317. Conductor 617 is also connected, through a Zener diode 656, to the voltage supply line 645.

The lower right-hand corner of FIG. 15 illustrates the reset or clearing circuit for storage register 317. This circuit comprises a relay 657 having an operating coil 658 and a pair of normally open contacts 659. One of the relay contacts is connected to the line 661 that is, in turn, connected to the emitters of each of the second transistors such as transistors 612, 632 in the individual stages of storage register 317. The other contact of pair 659 is returned directly to system ground.

One terminal of coil 658 in relay 657 is connected directly to the main playback power supply line 506 that is controlled by print operating relay 401. The other terminal of the coil is connected to the collector of a transistor 663. The emitter of transistor 663 is returned to ground. The base electrode of this transistor is connected to power supply line 506 through a voltage divider comprising, in series, two resistors 664 and 665. The common terminal of these two resistors is connected to the collector electrode of a transistor 666. The emitter of transistor 666 is grounded. The base electrode of this transistor is connected through a resistor 668 to the collector of the initial transistor 571 in the eighth stage of shift register 306.

FIG. 16 affords a detail schematic illustration of suitable operating circuits for character drive circuits 318 (FIG. 10). Four of the individual character drive circuits are shown in FIG. 16, these comprising individual PNP transistors 671, 672, 676 and 677. These individual transistors represent the first, second, sixth and seventh levels of the character drive circuits.

As shown in FIG. 16, the first-stage transistor 671 of character drive circuits 318 has its base electrode connected through a resistor 681 to the conductor 619 that is connected to the collector of transistor 612 in the first stage of storage register 317 (FIG. 15). The base electrode of transistor 671 is also connected, through a diode 683, to the line 655 that leads back to the emitter of the final transistor 649 in the power supply circuit 618 (FIG. 15). The collector electrode of transistor 671, FIG. 16, is connected through a diode 684 to a supply line 685. The collector electrode is also connected to one terminal of character selection solenoid 201, the other terminal of the character selection solenoid being returned to a permanent voltage supply 689.

The circuit connections for transistors 672 and 676 are essentially identical with those for transistor 671. The emitter of each transistor is connected to the principal playback circuit supply line 506 controlled by the print operating relay 401. The base electrode of the second-stage character drive circuit transistor 672 is connected through a resistor 682 to the corresponding stage of storage register 317. The emitter of this transistor is connected to character selection solenoid 202, which is returned to the power supply line 689. Similiarly, the base electrode of transistor 676 is connected through a resistor 686 to the conductor 639 that leads to the sixth stage of the storage register. The collector of this transistor is connected to the character selection solenoid 206, the solenoid being returned to power supply line 689. In each instance, a diode is used in parallel with the solenoid (201–206) to minimize the inductive reactance of the coil.

The seventh stage of character drive circuits 318, as ilustrated in FIG. 16, controls the cycle solenoid 235. Thus, the collector of transistor 677 is connected to one terminal of the cycle solenoid and the other terminal of the coil is returned to supply line 689. The collector electrode of transistor 677 is also connected to supply line 685 through a diode 691. The emitter electrode of the transistor is returned to supply line 506.

The base electrode of transistor 677 is returned to system ground through an input resistor 692 and is also connected through a diode 693 to a conductor 654 that is connected to the print inhibit circuit 407 of FIG. 12. Conductor 654 is also connected to the power supply circuit 618 of FIG. 15 as noted above.

In considering the operation of FIGS. 15 and 16, there is no necessity for reviewing in detail the functioning of Schmitt trigger circuits 302 and 303, since these circuits are of conventional construction and afford pulse output signals the configuration of which is determined in each instance by the circuit parameters. It is sufficient to note that the output signals through coupling capacitor 513 are of relatively long duration in comparison to the substantially sharper pulses produced at the output capacitor 533 of trigger circuit 303.

By the same token, there is no necessity for considering the internal operation of each stage of shift register 306, since each of the stages constitutes a one-shot trigger circuit of conventional construction. In each of these circuits, an input pulse actuates the first stage of the one-shot circuit to produce an output signal that subsequently actuates the second transistor in the circuit. Therefore, and after a predetermined time interval, the second transistor in each stage becomes non-conductive, affording an output signal that is supplied to the next succeeding stage to trigger that stage into operation. Again, the timing beween individual stages is controlled by the circuit parameters. Exemplary circuit parameters for the shift register are given hereinafter.

In considering operation of the circuits of FIGS. 15 and 16, it should be noted that the initial transistor in each stage of counter 306 is normally maintained in conductive condition. The initial pulse signal from Schmitt trigger 302, as applied to transistor 541 in circuit 306, is a negative-going pulse that drives the transistor to cutoff. In the ensuing interval, capacitor 544 is discharged, and as it approaches zero voltage, transistor 541 is again rendered conductive. Thus, the timing for the "zero" stage of the shift register or counter is determined primarily by the capacitance of capacitor 544 and by the resistance of element 543 through which the capacitor is charged. Similar considerations apply in the succeeding stages.

The output signals from the counter circuit 306 to the AND circuits 311–316 are derived from the collector electrodes of the initial transistors in the individual stages of the counter. Thus, when the initial transistor 551 in the "one" stage of shift register 306 switches from its conductive stage to its non-conductive state, reponsive to a negative-going signal applied to the base electrode of the transistor, a positive-going pulse is produced on the collector electrode. This signal is supplied, through resistor 601, to the base electrode of the transistor 591 that constitutes the first AND circuit 311 in the system.

The positive pulse signal supplied to the base of the transistor 591 tends to render that transistor conductive, but cannot cause conduction in the absence of a second input signal to the transistor. Transistor 591 is rendered conductive, in its emitter-collector path, only when the signal supplied to the base electrode coincides in time with a negative-going pulse signal on the emitter of the transistor. Thus, when a code pulse signal from the output of Schmitt trigger 303 coincides with a counter pulse from the "one" stage of counter 306, these two signals applied to transistor 591 switch the transistor from its normally non-conductive condition to a conductive condition. In a code combination in which no "one" pulse appears in the output of Schmitt trigger 303, the AND circuit remains non-conductive.

In the event that the code signal being processed in the playback circuits of FIGS. 15 and 16 includes a "one" pulse, and AND circuit transistor 591 is triggered to conduction, the transistor produces a negative-going pulse signal on its output circuit, connected to the collector of the transistor. That is, the normal positive voltage on the base electrode of the first transistor 611 in the initial stage of storage register 317 is markedly reduced, with the result that this transistor is driven from its normally non-conductive condition to conduction.

With transistor 611 conducting, the connection from its collector to the base electrode of transistor 612 drives that base electrode in a positive direction, as compared with the normal potential on the base electrode, and transistor 612 is also rendered conductive. In this connection, and as explained in greater detail hereinafter, it should be noted that the contacts 659 of the relay 657 in the emitter circuit of the second transistor 612 of the first stage of storage register 317 are ordinarily closed, because coil 658 of relay 657 is normally maintained energized. Stated differently, the normally open contacts 659 of relay 657 are held closed almost continuously by energization of the relay and are released only when it is desired to clear the storage register, as described hereinafter.

From the foregoing, it will be apparent that each stage of storage register 317 is normally maintained non-conductive with respect to both transistors in the stage. When the AND circuit associated with the particular stage of the storage register is actuated and becomes conductive, then the output signal from the AND circuit triggers both transistors of the storage register stage into conduction. Any stage of storage register 317 that has had a code bit recorded therein, by triggering the two transistors of the stage to conduction, retains the code bit in storage by maintaining both transistors conductive until the register is subsequently cleared.

When transistor 612 in the first stage of storage register 317 becomes conductive, as described above, the positive-polarity potential normally present on line 619 is materially reduced. In effect, therefore, and as long as transistor 612 remains conductive, a negative-going signal is supplied through conductor 619 to the base electrode of the transistor 671 in the first stage of driver circuits 318 (FIG. 16). But transistor 671 is not yet rendered conductive because its base electrode is still held at a relatively high positive potential through the circuit connection afforded by the diode 683 and line 655 which is coupled to the positive polarity supply line 645 through the transistor 649 and the Zener diode 656 in circuit 618 (FIG. 15). Thus, the mere recording of a code bit in the first stage of storage register 317 does not immediately trigger the first of the character drive circuits into operation. Instead, all of the drive circuits remain non-conductive during the interval in which the individual code bits are recorded in the several stages of the storage register.

Circuit 618, FIG. 15, is employed to actuate the character drive circuits when the counter has counted out to its seventh stage. Thus, when transistor 561 in the "seven" stage of shift register 306 is driven non-conductive, in the course of the shift register countdown, a positive-going pulse signal is supplied through resistor 647 to the base electrode of the first transistor 641 in circuit 618. Transistor 641, which is normally biased to cut-off, is now triggered to conduction.

Ordinarily, the remaining two transistors 643 and 649 in circuit 618 are held in conductive condition. When transistor 641 becomes conductive, however, the positive potential on the base electrode of transistor 643 is sharply reduced, in effect applying a negative-going signal to the base electrode of the transistor. Consequently, transistor 643 is driven to cut-off. When transistor 643 is switched off, the positive voltage on the base electrode of transistor 649 is also materially reduced and this transistor is also driven to cut-off. When transistor 649 becomes non-conductive, the positive operating voltage normally supplied to the base electrode of each stage of the character drive circuits of FIG. 16, through conductor 655, is interrupted. Accordingly, those stages of the character drive circuits connected to stages of code storage register 317 that have been driven conductive, and thus have a code bit recorded therein, are themselves rendered conductive.

With respect to the initial drive circuit transistor 671, assuming that a code bit has been recorded in the first stage of the storage register as described above, the interruption of the positive bias on the base electrode through the diode 683 permits the transistor to become conductive and thereby energizes the initial character selection solenoid 201. It can thus be seen that the individual character selection solenoids that correspond to the code combination supplied to the playback circuits are all energized simultaneously. In effect, the serial information supplied to the playback system from amplifier 301 (see FIG. 15) has been converted to parallel code data for the actuation of the character selection solenoids.

When the character selection solenoids 201–206 are energized, it is also necessary to energize cycle solenoid 235. The final transistor 677 in character drive circuits 318 (FIG. 16) is not triggered by any of the individual code storage stages in register 317. Ordinarily, transistor 677 is held non-conductive by the positive bias voltage applied to its base electrode through diode 693. But this bias is removed upon actuation of circuit 618 on the seventh count of the shift register 306, as described above. Accordingly, solenoid 235 is energized for each code combination, regardless of which code bits, if any, are stored in register 317, unless some other signal serves to inhibit this operation as described hereinafter.

After each character selection operation, it is of course essential to clear storage register 317 (FIG. 15) so that it will be ready for recording the next code word. As noted above, the code storage release or clearing relay 657 is normally maintained energized so that its contacts 659 will be closed to complete the emitter circuit for the second transistor (see transistor 612 and 632) in each stage of storage register 317. That is, transistor 663 in the operating circuit of the coil is normally maintained conductive. Transistor 666, on the other hand, is normally biased to cut-off.

When the count of eight is reached in the shift register counter 306, transistor 571 is cut off and a positive-going signal is supplied to the base electrode of transistor 666 through resistor 668. As a consequence, transistor 666 is rendered conductive. The resulting voltage drop across resistor 665 in the collector circuit of transistor 666 drops the positive potential on the base electrode of transistor 663 to a material extent. That is, a negative-going signal is effectively supplied to the base electrode of transistor 663 and drives that transistor to cut off. When this occurs, the operating coil 658 of relay 657 is effectively open circuited and the relay contacts 659 open.

When relay contact 659 opens, the storage register transistors 612, 632 can no longer remain in conductive condition because the emitter circuit of each of these transistors is opened. As soon as these transistors become non-conductive, the related transistors 611, 631 are driven to cut-off and storage register 317 is effectively cleared. Termination of the input signal to the operating circuit for relay 657 permits transistor 663 to return to conductive condition, re-establishing the operating circuit for relay coil 658 and again closing contact 659.

For those code combinations pertaining to special functions rather than to characters (see Table II), a positive-going signal is supplied direct to the base of the cycle solenoid drive circuit transistor 677, through diode 693, (FIG. 16) to keep the transistor cut off and prevent energization of cycle solenoid 235. The same signal is supplied, through diode 653 and resistor 651 (FIG. 15), to the base of transistor 649 in circuit 618. This signal prevents transistor 649 from being cut off by the signal from shift register 306. Consequently, the normal positive potential on line 655 is maintained and the individual drive circuit transistors are biased off, preventing actuation of the character selection solenoids.

*Specific recording circuits*

Figure 17:
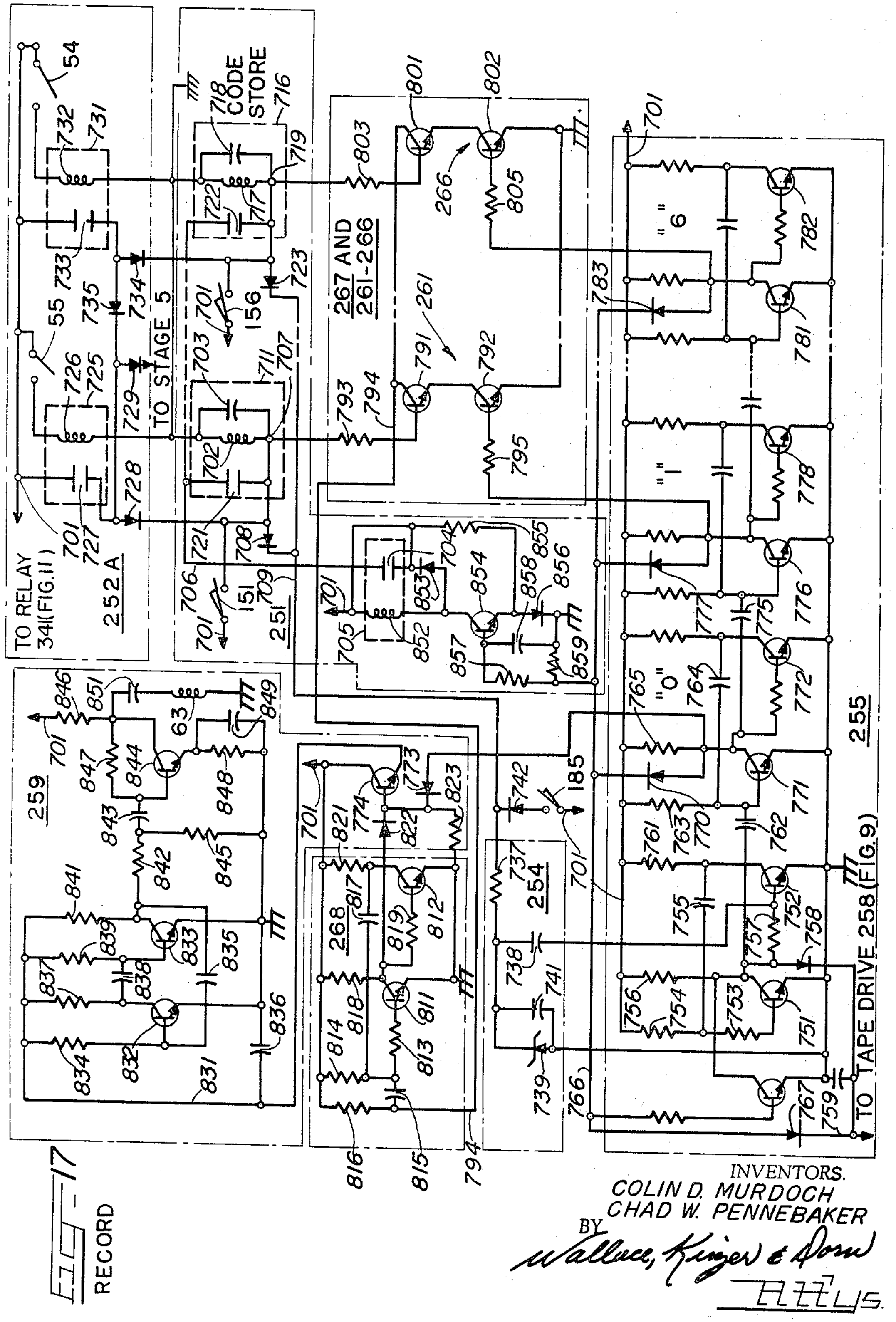
FIG. 17 is a detail schematic diagram of a major portion of the principal recording circuits.

FIG. 17 affords a detailed circuit diagram for typical circuits that may be incorporated in the recording system illustrated more generally in FIG. 9. Thus, FIG. 17 illustrates one form of circuit that may be employed for the recording code storage register 251, a section 252A of the encoder 252, the OR circuit 254, and a part of the ring counter comprising shift register 255. Further, FIG. 17 includes specific examples of circuits that may be utilized for the oscillator modulator 259, the AND circuits 261–266 and the associated OR circuit 267, and the pulse shaper 268.

In FIG. 17, two stages of an exemplary form of code storage register 251 are illustrated. As shown therein, the character sensing switch 151 is a single-pole single-throw device having one terminal connected to a DC supply line 701. Supply line 701 is connected to a positive-polarity power supply (not illustrated) through the record operating relay 341 (FIG. 11). The other terminal of switch 151 is connected to one end of the operating coil 702 of a first code storage relay 711. The other terminal of coil 702 is returned to system ground. Preferably a capacitor 703 is connected in parallel with coil 702.

Relay 711 is provided with a pair of normally open contacts 721. One contact of pair 721 is connected by a conductor 706 to the contacts 704 of a code storage release relay 705 that is a part of code storage register 251; the operating circuit for relay 705 is described hereinafter. The other contact of pair 721 is connected to the common terminal 707 of coil 702 and switch 151. In addition, this second contact of pair 721 is connected through a diode 708 to a conductor 709 that is connected to the OR circuit 254 in the input to the shift register or counter 255.

The circuit arrangement for the sixth-stage relay 716 of code storage register 251 is essentially similar to that for relay 711. Thus, relay 716 includes an operating coil 717, one terminal of the coil is grounded and the other terminal is connected through character sensing switch 156 to the supply line 701. As before, a capacitor 718 is preferably connected in parallel with the coil. The common terminal 719 of coil 717 and switch 156 is connected to one of a pair of normally open contacts 722 in the relay. The other contact of pair 722 is connected to the conductor 706 that leads to the release relay 705. The relay terminal 719 is also connected through a diode 723 to the conductor 709 that leads to circuit 254.

A section 252A of the input encoder 252 for the recording circuit is illustrated in the upper right-hand portion of FIG. 17. The illustrated portion of the encoder includes a first relay 725 having an operating coil 726 and a pair of normally open contacts 727. One terminal of coil 726 is returned to system ground. The other terminal of the relay coil is connected through EOM switch 55 to the supply line 701. The other contact of the relay is connected through a diode 728 to terminal 707 in the first stage of code storage register 251. A second diode 729 connects the lower contact of pair 727 to a similar terminal (not shown) in the fifth stage of the code storage register.

The illustrated portion 252A of the encoder farther comprises a second relay 731 having an operating coil 732 and a pair of normally open contacts 733. One terminal of coil 732 is connected through Manual switch 54 to supply line 701. The other terminal of the coil is returned to ground. One contact of pair 733 is connected to supply line 701. The other contact of this pair is connected through a diode 734 to terminal 719 in the sixth stage of code storage register 251. In addition, the lower contact of pair 733 is connected through a diode 735 to the two diodes 728 and 729 in the output of encoder relay 725.

The OR connection from code storage register 251 to counter 255 constitutes the common output line 709 for the individual code storage stages and circuit 254. As shown in FIG. 17, a coupling resistor 737 is connected in series in line 709 and is connected to a coupling capacitor 738 that leads to the base electrode of a transistor 752 in the initial stage of the counter. In addition, resistor 737 is connected through a Zener diode 739 to the base electrode of a transistor 751 in the same stage of the counter. Transistors 751 and 752 are connected together to afford a starting or steering stage for ring counter 255, as described more fully hereinafter. A capacitor 741 is connected in parallel with Zener diode 739.

As may be seen from FIG. 9, cycle sensing switch 185 is connected into the input of shift register 255. As shown in FIG. 17, one terminal of the cycle sensing switch is connected to the power supply line 701. The other terminal of this switch is connected through a diode 742 to the common line 709 that connects all stages of code storage register 251 to the input circuit 254 that leads to the counter.

Counter 255 is essentially similar in construction to the counter 306 described hereinabove in connection with FIG. 15. Counter 255 includes an initial or steering stage comprising transistors 751 and 752, and seven additional stages starting with a "zero" stage and ending with a "six" stage. Four of the intermediate stages of the register have been omitted from the drawing, since they are identical with those actually illustrated.

In the initial or steering stage of shift register 255, the base electrode of transistor 751 is connected to the supply line 701 through a pair of series connected resistors 753 and 754. The common terminal of these two resistors is coupled through a capacitor 755 to the collector electrode of the second transistor 752 in this stage of the counter. The emitter electrodes of transistors 751 and 752, and of all transistors in the counter, are returned to system ground.

The collector electrode of transistor 751 is connected to power supply line 701 through a resistor 756. This same collector electrode is also connected through a resistor 757 to the base electrode of the second transistor 752 in this stage of the counter. A diode 758 connects the collector electrode of transistor 751 to a line 759 that leads to tape drive circuit 258 (see FIG. 9). Thus, diode 758 may be considered to constitute a part of OR circuit 257 of FIG. 9.

The initial stage of counter 255 (FIG. 17) further includes a resistor 761 that connects the collector electrode of transistor 752 to supply line 701. The initial stage of the counter is coupled to the next succeeding stage by means of a capacitor 762 that couples the collector electrode of transistor 751 to the base electrode of the first transistor 771 in the "zero" stage of the counter.

The "zero" stage of the counter 255 is generally similar to the initial stage, with but minor modifications. Thus, the base electrode of transistor 771 is connected to supply line 701 through a load resistor 763. The base electrode is also coupled to the collector of a second transistor 772 in this stage of the counter by means of a capacitor 764. The collector electrode of transistor 771 is returned to the supply line 701 through a resistor 765. This collector electrode is also connected through a diode 770 to a conductor 766 that is in turn connected through an additional diode 767 to the conductor 759 that leads to tape drive circuit 258. Thus, diodes 770 and 767 and conductor 766 constitute an additional portion of OR circuit 257 (FIG. 9).

There is an additional output taken from the collector of transistor 771 in the "zero" stage of counter 255, FIG. 17. Thus, the collector electrode of transistor 771 is connected to a diode 773 incorporated in the oscillator modulator circuit 259. Diode 773 is connected to the base electrode of a gate transistor 774 in the power supply circuit of oscillator 259, as described more fully hereinafter.

The remaining circuit connections in the "zero" stage of ring counter 255 are essentially similar to the initial steering stage as described above. The output to the "one" stage of the shift register is taken through a coupling capacitor 775 that connects the collector of transistor 771 to the base electrode of the first transistor 776 in the "one" stage of the shift register. The collector electrode of transistor 776 is connected through a diode 777 to conductor 766 in the output circut leading to tape drive circuit 258. The "one" stage of the counter further includes a second transistor 778 that is connected in a one-shot trigger circuit essentially identical with the trigger circuits of the two preceding stages.

The final or "six" stage of ring counter 255, as shown in FIG. 17, includes a pair of transistors 781 and 782. These two transistors are connected in a one-shot circuit that is similar to the preceding stages except that there is no coupling capacitor connecting the trigger circuit to a succeeding stage, there being no succeeding stage. The output from this "six" stage to the tape drive is taken through a diode 783 that is connected from the collector of transistor 781 to the conductor 766.

FIG. 17 also illustrates the AND circuits 261–266. AND circuit 261 comprises a pair of transistors 791 and 792. The base electrode of transistor 791 is connected through a resistor 793 to terminal 707 in the initial stage of code storage register 251. The collector electrode of transistor 791 is connected to a conductor 794 that links all of the AND circuits and, in effect, constitutes the OR circuit 267. The emitter of transistor 791 is connected to the collector of transistor 792.

The base electrode of transistor 792 is connected through a resistor 795 to the collector electrode of the first transistor 776 in the "one" stage of ring counter 255. The emitter of transistor 792 is returned to system ground.

AND circuit 266 is essentially similar to circuit 261. It comprises a pair of transistors 801 and 802. The base electrode of transistor 801 is connected through a resistor 803 to terminal 719 in the sixth stage of code storage register 251. The collector electrode of transistor 801 is connected to OR circuit line 794. The emitter of transistor 801 is connected to the collector of transistor 802. The base electrode of transistor 802 is connected through a resistor 805 to the collector electrode of the first transistor 781 in the final or "six" stage of shift register 225. The emitter of transistor 802 is grounded.

In the form illustrated in FIG. 17, pulse shaper 268 comprises a conventional one-shot trigger circuit including a pair of transistors 811 and 812. The initial transistor 811 has its base electrode connected to the power supply line 701 through the series combination of two resistors 813 and 814. The common terminal of these two resistors is coupled through a capacitor 815 to the conductor 794 from AND circuits 261–266. Conductor 794 is also returned to supply line 701 through a relatively small resistor 816. The common terminal of resistors 813 and 814 is coupled through a capacitor 817 to the collector electrode of the second transistor 812 in the trigger circuit.

The collector electrode of the first transistor 811 in circuit 268 is returned to supply line 701 through a resistor 818. This collector electrode is also coupled through a resistor 819 to the base electrode of the second transistor 812 of the trigger. The emitter electrodes of transistors 811 and 812 are both returned to system ground, the collector electrode of transistor 812 being connected to supply line 701 through a resistor 821.

Circuit 259 in the form illustrated in FIG. 17, constitutes a conventional transistor oscillator that is actuated between an energized condition and a de-energized condition by a gate circuit comprising transistor 774. The on-off gating action of transistor 774 constitutes the modulation function of the circuit. The base electrode of transistor 774 is connected through a diode 822 to the collector electrode of the initial transistor 811 in the circuit 268. The base electrode is also returned to system ground through a resistor 823. The collector electrode of gate transistor 774 is connected to power supply conductor 701.

The emitter of transistor 774 is connected to a conductor 831 that constitutes the main supply line for the oscillator portion of circuit 259. The oscillator comprises a pair of transistors 832 and 833. The base electrode of transistor 832 is connected to supply line 831 through a resistor 834. The base electrode is also coupled through a capacitor 835 to the collector electrode of the second transistor 833. The emitters of both transistors are returned to system ground, and supply line 831 is bypassed to ground by a capacitor 836.

The collector electrode of transistor 832 is connected to supply line 831 through a resistor 837. It is also coupled to the base electrode of transistor 833 by a capacitor 834. The base electrode of transistor 833 is returned to supply line 831 by a load resistor 839. The collector of transistor 833 is also returned to supply line 831, in this instance through a resistor 841.

The output from the oscillator is taken from the collector of transistor 833 by means of a coupling circuit that includes, in series, a resistor 842 and a capacitor 843 coupled to the base electrode of a transistor 844. The common terminal of impedances 842 and 843 is returned to system ground through a resistor 845. Transistor 844 is connected in an amplifier circuit that drives the main recording winding of head 63. Thus, the collector electrode of transistor 844 is connected to supply line 701 through a load resistor 846. The collector is also connected back to the base electrode of transistor 844 by a feedback resistor 847. The emitter of transistor 844 is returned to ground through a bias circuit comprising the parallel combination of a resistor 848 and a capacitor 849. The output connection is taken from the collector of transistor 844 through a coupling capacitor 851 to recording winding 63, the other end of the winding being returned to system ground.

The release circuit for code storage relay 251 remains for consideration. One terminal of the operating coil 852 of this relay is connected to the power supply conductor 701. The other terminal of the coil is connected to the collector electrode of a gate transistor 854. A diode 853 is connected in parallel with coil 852.

The emitter electrode of transistor 854 is connected to the supply line 701 through a resistor 855. The emitter is also returned to system ground through a diode 856. The base electrode of the transistor is bypassed to system ground through a capacitor 858. An input connection to the base electrode is provided by a pair of resistors 857 and 859. Resistor 859 is connected from the base electrode to the conductor 766 in the output of counter 255, and resistor 857 returns conductor 766 to system ground.

In considering operation of the recording circuits illustrated in FIG. 17, it should be remembered that the power supply for these circuits is completed through record operating relay 341, FIG. 11. Thus, when the record operating relay is in its actuated condition, and time delay 343 has timed out, a power supply circuit is completed to conductor 701 in the various circuits of FIG. 17.

In a given recording cycle, sensing switch 151 may be closed by typing of a character that includes a code bit in the "one" position. This completes an energizing circuit for the initial relay 711 in code storage register 251, the circuit extending from conductor 701 through switch 151 to terminal 707 and from terminal 707 through coil 702 to system ground. When this occurs, relay 711 is actuated and its contacts 721 close. Upon closing of contacts 721, a holding circuit is established for relay 711 through release relay 705. Release relay 705 is held energized whenever a signal is being passed through the shift register 255, so that its contacts 704 are closed. Thus, the holding circuit for relay 711 is maintained continuously, during countdown of the shift register, and until release relay 705 drops out, as described hereinafter.

As long as code storage relay 711 remains in its actuated condition, a positive operating potential is supplied to the base electrode of transistor 791 in the first AND circuit 261, through a circuit extending from the base electrode through resistor 793 to terminal 707 and from terminal 707 through contacts 721 and through the release relay contacts to supply line 701. The positive potential supplied to the base electrode of transistor 791 tends to drive that transistor to conduction, but the transistor cannot conduct as yet because its emitter circuit is effectively open, the transistor 792 as yet remaining unconductive.

In the event that the typist actuates a key for a character having code bits in the first and sixth positions, sensing switch 156 will be actuated simultaneously with switch 151. Alternatively, sensing switch 156 may be actuated by a code combination that does not include a code bit at the first position. In either event, closing of switch 156 energizes the sixth stage relay 716 of code storage register 251 and closes contact 722. Closing of contact 722 establishes a holding circuit for relay 716, through the release relay 705. The closing of these contacts also applies a positive operating potential to the base electrode of the initial transistor 801 in the AND circuit 266. Under these circumstances, transistor 801 is biased toward conduction but cannot yet conduct because its emitter circuit is open at transistor 802.

Actuation of any one of the code storage relays in circuit 251 also applies a positive potential to the base electrode of the second transistor 752 in the initial or "steering" stage of ring counter 255. Thus, if switch 151 is closed, a positive-going pulse signal is supplied through diode 708 and conductor 709 and through circuit 254 to the base electrode of transistor 752. Similarly, closing of switch 156 applies a signal to conductor 709 through diode 723. In this manner, actuation of any one of the code storage relays initiates operation of ring counter 255. As insurance against the one character that has no code bits in its code combination, closing of cycle switch 185 is effective to pulse line 709 and initiate action of the ring counter.

In ring counter 255, as in the corresponding circuit 306 described above in connection with FIG. 15, the initial transistor in each stage is normally conductive. In response to the input signal from circuit 254, transistor 751 is cut off. When this occurs, the collector electrode of the transistor goes from a potential near ground to a positive potential approximating the potential supplied to supply line 701. Accordingly, a positive-going outpupt signal is applied to tape drive circuit 258 through diode 758 and conductor 759. This starts the tape drive before any recording operation is attempted and is done to make sure that the inertia of the tape system is overcome and that the tape is moving at the required recording speed during all subsequent recording operations.

When the initial or steering circuit comprising the first trigger in ring counter 255 reverts to its initial operational state, the second stage, identified as the "zero" stage of the counter, is in turn actuated. Transistor 771 is driven from conduction to cut-off, producing a positive-going signal in the collector circuit of the transistor that is supplied through diode 770 to conductor 766 and thence through diode 767 to the line 759 that leads to the tape drive. Thus, the tape drive is maintained in continuous operation.

The output signal from transistor 771 in the "zero" stage of the ring counter is also supplied, through diode 773, to the gate circuit that constitutes the modulator portion of oscillator modulator 259. The positive-going signal applied through diode 773 to the base electrode of transistor 774 drives the transistor from its cut-off condition to conduction. This completes a conductive path from supply line 701 through transistor 774 to the supply conductor 831 of the oscillator circuit and energizes the oscillator. Accordingly, the oscillator is energized and produces an output signal that is supplied, through the amplifier comprising transistor 844, to the recording winding 63. This records the initial relatively long "zero" pulse or signal burst identifying the beginning of a character code, or function code, as illustrated by the burst signals 280 and 290 (FIG. 14). In this manner, the initial or "zero" pulse is recorded for each code word.

In the next step in operation of shift register 255, transistor 776 is driven to cut-off, this being the initial transistor in the "one" stage of the register. When this occurs, a positive signal is supplied through diode 777 to the circuit that connects to tape drive 258, maintaining the tape drive in operation. At the same time, a positive-going signal is supplied from the collector of transistor 776, through resistor 795, to the base electrode of transistor 792 in AND circuit 261.

Under these circumstances, if relay 711 has previously been actuated, positive-going signals are supplied to the base electrodes of both of the transistors 791 and 792 in circuit 261. Both transistors are driven to conduct and neither is blocked by the other. Accordingly, a circuit is completed from ground through transistors 792 and 791 to conductor 794, producing a pulse signal at the input to the one-shot pulse shaping circuit 268. As a consequence, the one-shot circuit is triggered into operation and produces a positive-going signal that is supplied through diode 822 to the base electrode of the gate or modulator transistor 774 in the oscillator circuit. Accordingly, the oscillator is again actuated and a code bit is recorded at the "one" code position on the tape. The duration of the output signal from one-shot circuit 268 is substantially shorter than that from the "zero" stage of counter 255, so that the recorded code bit is only a few cycles of the oscillator signal (see FIG. 14).

In many instances the triggering signal supplied to transistor 792 in AND circuit 261 is not accompanied by an actuating signal supplied to transistor 791 because no code bit has been recorded in the first stage of register 251. Under these circumstances, transistor 791 remains cut off and there is no output to line 794. Hence, no code bit is recorded.

The code recording operation described above proceeds in sequence with respect to the output signals produced by the remaining stages of counter 255, from the "one" stage through the "six" stage. For each count of the shift register 255, a code bit is recorded by momentarily energizing oscillator 259, provided the corresponding code storage relay in circuit 251 has been actuated.

As soon as cycle switch 185 has been actuated, or any one of the several stages of code storage register 251 has been energized, the operation of ring counter 255 is initiated. Throughout the countdown period, a positive potential is maintained on line 766, through the diodes that connect each stage of the counter to this line. As long as this condition obtains, a positive operating potential is also supplied to the base electrode of transistor 854 in the release circuit for code storage register 251. When the counter has counted out, however, this condition no longer obtains. Accordingly, transistor 854 reverts from conductive condition to non-conductive condition, opening the operating circuit to relay coil 705. Under these circumstances, relay 705 drops out, opening the holding circuits for each of the individual storage relays in code storage register 251. This clears the code storage register and prepares it for registering the next code word.

It remains to be seen what occurs upon closing of one of the switches 54 and 55. When Manual switch 54 is closed, it completes an operating circuit to coil 732 of relay 731. This actuates the relay and closes contacts 733, supplying a positive-going signal, through the relay contacts and through diodes 728, 729 and 734, to each of the first, fifth and sixth stages of code storage register 251. As can be seen in FIG. 17, the positive potential supplied through diode 728 to terminal 707 in the code storage register is effective to energize the code storage relay 711 in the same manner as the closing of switch 151. Similarly, relay 716 is energized in essentially the same manner as if switch 156 had been closed, due to the signal supplied to terminal 719 through diode 734. A corresponding action takes place in the fifth stage (not shown) of code storage register 251. From that point, the recording of the Manual code 156 proceeds in the same manner as any character selection code.

Closing of EOM switch 55 is effective to energize the operating coil 726 of relay 725. This closes contacts 727 and supplies an operating potential to the first and fifth stages of code storage register 251, through diodes 728 and 729. In this instance, diode 735 blocks the circuit to the sixth stage of the code store and prevents actuation of relay 716. Thus, when the typist actuates switch 55, the recording of the EOM code 15 is accomplished, in the same manner as for a character selection code.

*Specific control circuits*

Figures 18, 19:
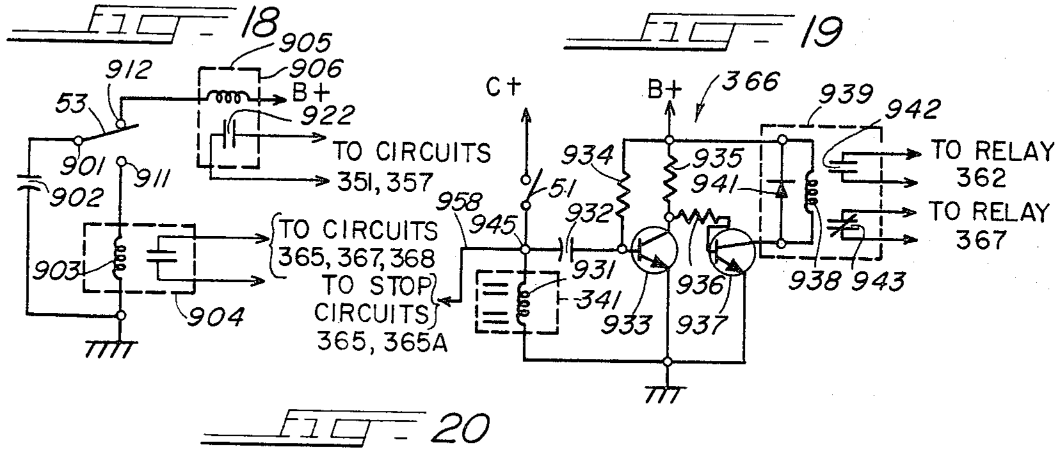
FIG. 18 illustrates a particular switching circuit that may be used in the system.
FIG. 19 is a schematic diagram of one form of detector circuit that may be used in the system.

FIG. 18 illustrates a typical operating circuit that may be utilized, in conjunction with the main control switches 51 through 58, to produce pulse output signals of given duration independent of the time the typist actually depresses a given control switch. Correct switch 53 is shown in FIG. 18, but it should be understood that an essentially similar circuit can be utilized for any of the switches required to produce output pulse signals of predetermined duration.

As shown in FIG. 18, the movable contact 901 of the single-pole double-throw switch 53 is coupled through a capacitor 902 to system ground. One fixed contact 911 is connected to one terminal of the operating coil 903 of a relay 904. This relay 904 is provided with one or more pairs of contacts 921 that are electrically connected to the operating circuits 365, 367 and 368 (see FIG. 11).

The second fixed contact 912 of switch 53, which contact is normally engaged by the switch when the switch is in unactuated condition, is connected to one terminal of the operating coil 905 of a second relay 906. The other terminal of coil 905 is connected to a suitable voltage supply, designated as B+. Relay 906 includes one or more pairs of contacts, illustrated generally by the contacts 922, connected to circuits 351 and 357 (FIG. 11).

In considering the operation of the circuit of FIG. 18, it is seen that the capacitor 902 is normally charged to the potential of the B+ supply. When the typist depresses switch 53, closing movable contact 901 into engagement with fixed contact 911, capacitor 902 is discharged through the operating coil 903 of relay 904. Accordingly, the relay is actuated, closing contact 921 and completing operating circuits for devices 365, 367 and 368.

As long as switch 53 is actuated for a minimum period of time by the operator, the time interval during which relay 904 is actuated is substantially independent of the interval during which the switch is closed. That is, relay 904 remains actuated only so long as is required to discharge capacitor 902. This makes it possible to supply a short pulse of predetermined duration to circuit 365, 367 and 368 without requiring that the operator exercise precise control over the time that the switch is closed. The desired signal to circuit 365, 367 and 368 is of quite short duration, actually substantially less than the shortest time the typist can hold the switch closed. When the typist releases switch 53, it returns to the position shown in FIG. 18, with movable contact 901 engaging the second contact 912. Inasmuch as capacitor 902 has previously been discharged, the operating oil 905 of relay 906 is now energized for the time interval required to charge the capacitor. As a consequence, relay contacts 922 are closed for a short time interval determined by capacitor 902 and by the resistance of the circuit. Accordingly, a short pulse signal is supplied to circuits 351 and 357, the duration of this signal being quite independent of the time during which switch 53 remains in the illustrated position. In fact, the switch remains in the position shown in FIG. 18 indefinitely, until the switch is again actuated for a subsequent correction operation. Utilization of the circuit of FIG. 18, or like pulse circuits, removes any necessity for special training of the operator with respect to the duration of actuation required for the individual control switches.

FIG. 19 illustrates a circuit that may be employed for the dropout detector 366 (FIG. 11) and for the similarly designated circuits of FIGS. 11 and 12. As shown in FIG. 19 the Record switch 51 has one terminal connected to a positive polarity supply designated as C+, the other terminal of the switch being connected to one terminal of the operating coil 931 of record operating relay 341. A further connection is provided from operating coil 931 to stop circuits 365, 365A, this circuit being described in further detail in connection with FIG. 20.

The common terminal of coil 931 and switch 51 is coupled through a capacitor 932 to the base electrode of a first transistor 933 in dropout detector circuit 366. The base electrode of transistor 933 is returned to the B+ supply through a bias resistor 934. The emitter of transistor 933, which is an NPN transistor, is grounded.

The output circuit from transistor 933 comprises a load resistor 935 that is connected from the collector electrode of the transistor to the B+ supply. The collector electrode of this transistor is also connected through a coupling resistor 936 to the base electrode of a second transistor 937. The emitter of transistor 937 is returned to system ground. The collector of transistor 937 is connected to one terminal of the operating coil 938 of a relay 939 that constitutes a part of the dropout detector circuit. The other terminal of coil 938 is returned to the B+ supply. A blocking diode 941 is connected across coil 938.

The contact arrangement for the dropout detector relay 939 depends upon the circuits that are to be controlled by the relay. In a typical arrangement, the relay may include a pair of normally open contacts 942 coupled to the second EOM control relay 362 and a pair of normally closed contacts 943 connected to return control relay 367 (see FIG. 11).

With the circuit arrangement shown in FIG. 19, the circuit parameters are selected such that transistor 933 is normally conductive and transistor 937 is normally nonconductive. Hence, relay 939 is normally maintained in an unactuated condition.

When Record switch 51 is closed, it produces no substantial change in the operating conditions in dropout detector 366. Thus, although closing of the switch produces a positive charge on capacitor 932, any resulting positive pulse signal supplied to the base of transistor 933 does not materially affect operation of the transistor, since that device is already conductive.

When Record operating relay 341 is dropped out by opening the holding circuit from stop circuits 365, 365A, the positive potential on the upper terminal 945 of coil 931 is removed. As a consequence, a negative pulse signal is supplied through capacitor 932 to the base electrode of transistor 933. Accordingly, transistor 933 is driven to cut-off for a short time interval determined by the length of the pulse, which in turn is primarily determined by the impedances of capacitor 932 and resistor 934.

When transistor 933 is driven to cut off, the normal voltage drop across resistor 935 is reduced to a negligible value, producing a positive-going pulse signal that is applied to the base electrode of transistor 937 through resistor 936. Accordingly, transistor 937 is driven conductive and energizes the operating coil 938 of the output relay 939 of the dropout detector. As a result, output signals are supplied to relay 362 and 367 as by the closing of contacts 942 and opening of contacts 943.

Transistor 933 remains cut off only so long as is required to discharge capacitor 932 through resistor 934. As the capacitor nears the B+ voltage, transistor 933 again becomes conductive. This drops the positive potential on the base electrode of transistor 937 and cuts off conduction through the second transistor. Accordingly, it is seen that dropout detector 366 produces only a momentary output signal in response to drop out of the record operating relay 341.

Figures 20, 21:
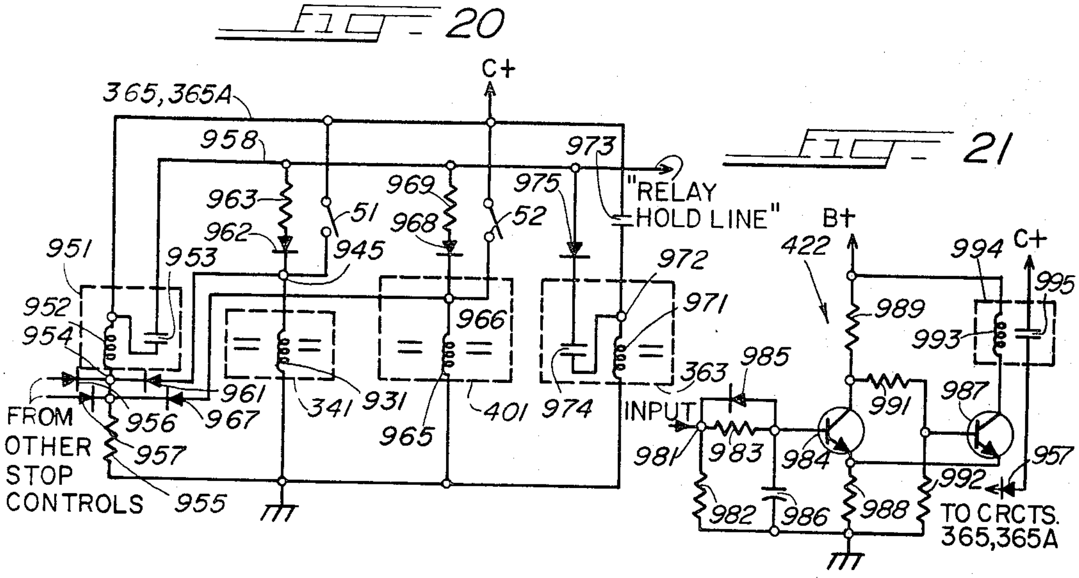
FIG. 20 illustrates a form of stop circuit employed in the system.
FIG. 21 is a schematic diagram of another detector circuit that may be used in the system.

FIG. 20 illustrates one circuit arrangement that may be utilized for the stop circuits 365 and 365A of FIGS. 11 and 12. In FIG. 20, only two operating relays 341 and 401 are shown, together with one of the control relays 363. Additional relays may be incorporated in this circuit as desired, however, as will be apparent from the ensuing description.

As shown in FIG. 20, stop circuits 365, 365A comprise a relay 951 having a coil 952 and a pair of normally open contacts 953. One terminal of coil 952 is connected to the positive-polarity DC supply, C+. The second terminal 954 of coil 952 is connected through a resistor 955 to system ground. A plurality of connections are provided to terminal 954 from external circuits, as through diodes 956 and 957.

One contact of contact pair 953 is connected to the C+ supply. The other contact of pair 953 is connected to a relay hold line 958. Referring to relay 341, it is seen that the upper terminal 945 of the relay coil 931 is connected to the C+ supply through record switch 51. This same terminal 945 of the record operating relay coil is connected to terminal 954 of stop circuit relay 951 through a diode 961. In addition, terminal 945 is connected, through the series combination of a diode 962 and a resistor 963, to the relay hold line 958.

Similar circuit arrangements are provided for the operating coil 965 of print operating relay 401. The lower terminal of coil 965 is connected to system ground. The upper terminal 966 of the relay coil is connected through Print switch 52 to the C+ supply. Terminal 966 is also connected to the lower terminal 954 of stop circuit relay 951 through a diode 967. Furthermore, terminal 966 of the print operating relay coil is connected to the relay hold line 958 through the series combination of a diode 968 and a resistor 969.

The connections for the EOM control relay 363 are substantially different from those for the operating relays. The lower terminal of the operating coil 971 for this relay is connected to system ground. The upper terminal 972 of the coil is connected to C+ through a pair of normally open contacts 973 that are actuated by relay 361 (see FIG. 11). Terminal 972 of the coil for relay 363 (FIG. 20) is also connected to one contact of a pair of normally open contacts 974 in the relay. The other contact of pair 974 is conected to the relay hold line 958 through a diode 975.

In considering the operation of the stop circuits, as illustrated in FIG. 20, it is seen that relay 951 is normally maintained in its actuated condition by means of the energizing circuit that begins at the C+ supply and extends through coil 952 and resistor 955 to system ground. Accordingly, contacts 953 are ordinarily held closed, maintaining the relay hold line 958 at the C+ voltage. Resistor 963 is selected such that, in combination with the resistance of coil 931, it passes a current sufficient to hold relay 341 actuated. However, resistor 963 limits the current through this circuit to an amplitude insufficient to actuate operating relay 341 if that relay has not previously been energized. A similar arrangement is used with respect to the limiting resistor 969 in the energizing circuit for coil 965 of print operating relay 401.

The signals supplied to stop circuit 365, 365A from external sources (such as short signal detector 369, FIG. 11), constitute positive-going signals supplied through the diodes 956, 957. When such a positive-polarity stop signal is supplied to terminal 954, the voltage across coil 952 is reduced to a level such that the current to the coil is no longer sufficient to hold relay 951 in actuated condition. When this happens, contacts 953 open and any relay that has previously been actuated and was held actuated through relay hold line 958 drops out.

The action occasioned by a stop signal that occurs simultaneously with energization of one of the operating relays, such as relays 341 and 401, occurs somewhat differently. When, for example, switch 51 is closed, record operating relay 341 has its coil 931 energized by the direct connection to the C+ supply afforded through the switch. At the same time, full C+ voltage is supplied to terminal 954 of the stop circuit relay 951 through diode 961. This reduces the voltage across coil 952 to approximately zero, so that relay 951 drops out. Accordingly, contacts 953 open and the voltage supply to relay hold line 958 is interrupted. This automatically releases any other relay, other than relay 341, that may previously have been actuated.

When switch 51 is released, the direct energizing circuit for relay 341 is of course opened. Relay 951 closes quickly, completing the power supply circuit to relay hold line 958 through contacts 953. This establishes a holding circuit through resistor 963 and diode 962 to hold relay 341 energized. This action is made possible only by utilizing, as the stop relay 951, a relay that has a much faster response time than the operating relays such as relays 341 and 401. That is, the holding circuit must be re-established through stop circuit relay 951 before the operating relay that has just been actuated has a chance to drop out. Of course, the control relays such as relays 363 should drop out before the holding circuit can be re-established and hence are selected to have a response time comparable to that of the stop circuit relay 951.

FIG. 21 illustrates a simple detector circuit that may be employed as the long signal detector 422 (FIG. 12). The same basic circuit can be employed for the short signal detector 369 (FIG. 11) and for the timing circuits such as timing circuit 416 (FIG. 12).

Detector 422, in the form shown in FIG. 21, includes an input terminal 981. Terminal 981 is connected to system ground through a resistor 982. Input terminal 981 is also connected to the base electrode of a transistor 984 by the parallel circuit combination of a connecting resistor 983 and a diode 985. The base electrode of transistor 984 is also coupled to ground through a capacitor 986.

Transistor 984 is incorporated, with a second transistor 987, in a conventional Schmitt trigger circuit. The emitter of transistor 984 is returned to system ground through a resistor 988, as is the emitter of the second transistor 987. The collector of transistor 984 is connected to the B+ supply through a resistor 989. This collector is also connected to the base electrode of transistor 987 through a coupling resistor 991.

The base electrode of transistor 987 is returned to system ground through a resistor 992. The collector of transistor 987 is connected through a coil 993 to the B+ supply. Coil 993 is the operating coil of a relay 994 that is provided with a pair of contacts 995. Relay 994 constitutes the output of detector circuit 422; in this instance, one contact 995 is connected to the C+ supply and the other contact is connected to diode 957 of stop circuits 365, 365A (see FIG. 20).

Circuit 422, as shown in FIG. 21, functions essentially as a conventional diode detector. The length of time which an input signal supplied to terminal 981 must persist in order to actuate the detector is determined by capacitor 986 and resistor 983. Thus, if the input signal does not persist long enough to charge the capacitor 986 to a potential high enough to trigger transistor 984 into conduction, then the detector circuit does not produce an effective output by actuation of output relay 994. Diode 985, of course, serves to quickly discharge the capacitor 986, through resistor 982, when the input signal is interrupted.

Figure 22:
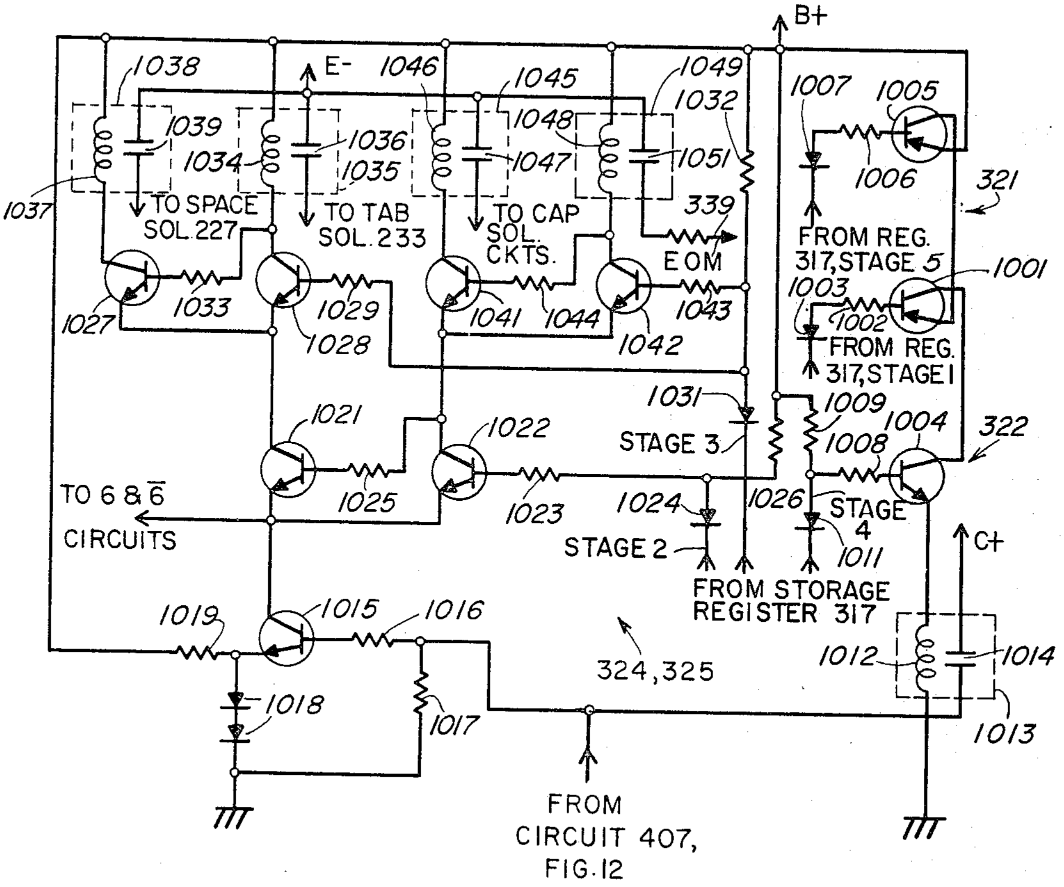
FIG. 22 is a detail schematic diagram of a function selection circuit that may be used in the system.

FIG. 22 illustrates a circuit arrangement that may be employed to perform the functions of circuits 321, 322 and 323 in FIG. 10; the circuit illustrated in FIG. 22 also includes a substantial portion of the function selector 324 and the function drive circuits 325 of FIG. 10.

The AND circuit 321 is shown in the upper right-hand corner of FIG. 22 and comprises a pair of PNP transistors 1001 and 1005. The base electrode of transistor 1001 is connected through a resistor 1002 and a diode 1003, in series, to the first stage of the code storage register 317. The emitter of transistor 1001 is connected to the collector of transistor 1005. The base electrode of transistor 1005 is connected through a resistor 1006 and a diode 1007, in series, to the fifth stage of storage register 317. The emitter of transistor 1005 is connected to a suitable DC supply herein designated as B+.

NOT circuit 322 comprises an NPN transistor 1004. The collector of this transistor is connected to the collector of transistor 1001 in AND circuit 321. The base electrode is returned to the B+ supply through two series-connected resistors 1008 and 1009. The common terminal of resistors 1008 and 1009 is connected to the fourth stage of storage register 317 through a diode 1011. The emitter of transistor 1004 is connected to one terminal of the operating coil 1012 of a relay 1013, the other terminal of coil 1012 being returned to system ground. Relay 1013 is provided with a pair of normally open contacts 1014 and is utilized to control operation of the function selector and drive circuits 324, 325 as described more fully hereinafter.

The function selector and drive circuits 324, 325 as shown in FIG. 22, are constructed in the form of a transistor tree. At the bottom of this circuit there is an NPN transistor 1015. The base electrode transistor 1015 is returned to ground through the series combination of a pair of resistors 1016 and 1017. The common terminal of the two resistors is connected to one contact of pair 1014, in relay 1013. The other contact is connected to a suitable DC supply, herein designated as C+. The common terminal of resistors 1016 and 1017 is also provided with a connection to circuit 407 (FIG. 12).

The emitter of transistor 1015 is returned to system ground through the series combination of a pair of diodes 1018. The emitter is also connected to the B+ supply through a resistor 1019. The output from transistor 1015 is taken from the collector electrode, which is connected to the emitters of two transistors 1021 and 1022. The base electrode of transistor 1022 is connected to the second stage of storage register 317 through the series combination of a resistor 1023 and a diode 1024. The common terminal of circuit elements 1023 and 1024 is returned to the B+ supply through a resistor 1026. The collector of transistor 1022 is connected through a resistor 1025 to the base electrode of transistor 1021.

The tree construction is continued by connection of the collector electrode of transistor 1021 to the emitter electrodes of two transistors 1027 and 1028. The base electrode of transistor 1028 is connected through the series combination of a resistor 1029 and a diode 1031 to the third stage of storage register 317. The common terminal of resistor 1029 and diode 1031 is returned to the B+ supply through a resistor 1032. The collector electrode of transistor 1028 is connected through a resistor 1033 to the base electrode of transistor 1027. The collector electrode of transistor 1028 is also connected to one terminal of the operating coil 1034 of a relay 1035. The other terminal of coil 1034 is connected to the B+ supply. Relay 1034 is provided with a pair of normally open contacts 1036. One contact is connected to the tabulator solenoid 233 in the typewriter and the other contact is connected to a suitable DC supply, herein designated as E−.

The output connection from transistor 1027 is similar to that of transistor 1028. Thus, the collector is connected to one terminal of the operating coil 1037 of a relay 1038. The other end of coil 1037 is returned to the B+ supply. The normally open contacts 1039 of relay 1038 are connected in an operating circuit from the E− supply to the space solenoid 227 in the typewriter.

The output circuit arrangement for transistor 1022 is generally similar to that for transistor 1021. Thus, the collector of transistor 1022 is connected to the emitters of two transistors 1041 and 1042. The base electrode of transistor 1042 is connected to the third stage of storage register 317 through the series combination of a resistor 1043 and the diode 1031. The common terminal of resistor 1043 and diode 1031 is returned to the B+ supply through the resistor 1032. The collector of transistor 1042 is connected through a resistor 1044 to the base electrode of transistor 1041.

The output circuit for transistor 1041 comprises a relay 1045 having one terminal of its operating coil 1046 connected to the collector of the transistor, the other end of the coil being returned to the B+ supply. The normally open contacts 1047 of this relay are connected in an operating circuit between the E− supply and the shift circuits.

The collector of transistor 1042 is connected to one end of the operating coil 1048 for a relay 1049. The other terminal of coil 1048 is connected to the B+ supply. The normally open contacts 1051 of this relay are connected through a series resistor to the conductor 339 that leads to EOM control relay 363 and rewind operating relay 351 in FIG. 11.

In considering the operation of the circuits illustrated in FIG. 22, it should be noted that each of the incoming lines from storage register 317 (FIG. 10) carries a negative-going signal from each stage of the code storage register in which a code bit has been recorded. As an initial example, it may be assumed that that space function code word 1235 has been recorded in storage register 317. As a consequence, negative-going signals are available at the base electrodes of transistors 1001 and 1005. Accordingly, each of these transistors, which is normally held cut off, is rendered conductive. There is no negative signal from the fourth stage of the code storage register. Consequently, transistor 1004, which is normally biased toward conduction, remains in conductive condition. Under these circumstances, a complete conductive path is established from B+ through the three transistors 1005, 1001, and 1004 to the operating coil of relay 1013, energizing the relay and closing contacts 1014.

With the closing of contacts 1014, a positive-going signal is supplied to the base electrode of transistor 1015. It is thus seen that transistor 1015 is rendered conductive each time the input signals from storage register 317 drive transistors 1001 and 1005 to conduction, provided there is no inhibiting signal supplied to the base electrode of transistor 1004. With the code combination under consideration, code word 1235, there is no negative-going signal supplied to the base electrode of transistor 1004 and the energizing circuit for relay 1013 is completed to energize transistor 1015.

The input signal from the second stage of the storage register, through diode 1024, controls conduction in transistors 1021 and 1022. Transistor 1022 is normally biased to be conductive. With the code word 1235, a negative-going signal is supplied to the base electrode of transistor 1022 through diode 1024. Accordingly, transistor 1022 is driven to cut off, with the result that the potential on the collector electrode of the transistor increases substantially. The resulting increase in the positive potential at the base electrode of transistor 1021 causes transistor 1021 to conduct.

The incoming signal through diode 1031 determines conductivity in transistors 1027, 1028, 1041 and 1042. In connection with the code word under consideration, the code combination 1235, the conductive state of transistors 1041 and 1042 is immaterial because, as noted above, transistor 1022 is cut off and no complete circuit can be established through either of transistors 1041 and 1042.

With the code word 1235, there is a negative-going signal supplied through diode 1031 to the base electrode of transistor 1028. This signal drives the transistor to cut off. As a consequence, the effective potential on the base electrode of transistor 1027 is increased in a positive direction and the transistor is rendered conductive. It is thus seen that a complete conductive path is established from the P+ supply through coil 1037 and transistors 1027, 1021 and 1015 to ground. Accordingly, relay 1038 is actuated, closing contacts 1039 and energizing space solenoid 227. This is the desired result, since the code word 1235 is the code combination assigned to the space function.

Other code combinations are effectively selected and employed to drive the function solenoids, in the manner described above, depending upon the received signals from storage register 317. Signals from the sixth stage of storage register 317 are supplied to a separate selector circuit connected to the collector electrode of transistor 1015; since the "six" and "not six" circuits are similar to the "two" and "not two" circuits comprising transistors 1021 and 1022, they have not been illustrated. It should be noted that actuation of the shift or capital solenoid is controlled by a suitable latching relay or like holding circuit that maintains the typewriter in shift condition by keeping the solenoid energized, following a received shift code word, until a shift release code is sensed on the tape.

As noted above, energization of any of the relays in the selection and driver circuits illustrated in FIG. 22 is dependent upon the absence of a code bit stored in the fourth level of register 317. Whenever there is a code bit present in the fourth level, the resulting negative-going signal supplied to the base electrode of transistor 1004 through diode 1011 drives the transistor to cut off and prevents actuation of relay 1013. This precludes the relay from rendering transistor 1015 conductive and prevents a function selection and drive operation. The circuit connection to inhibit circuit 407 of FIG. 12, in the base electrode circuit of transistor 1015, is used to maintain that transistor cut off for the requisite interval, during control operations as described above, when necessary to preclude erroneous function selection operations.

In connection with FIGS. 15, 16, 17 and 22, specific circuit data are set forth hereinafter. It should be understood that this material is presented merely by way of illustration of typical circuits and in no sense as a limitation upon the invention.

*Resistors*

*FIG. 15*

| | | |
|---|---|---|
| 503 | kilohms | 27 |
| 504, 601, 602, 606, 647, 613, 621, 633, 664 | do | 4.7 |
| 507, 512, 524, 527, 532, 646, 648 | do | 2.2 |
| 508, 511, 525, 528, 546, 614, 616, 620, 636, 652 | do | 10 |
| 509, 534, 615, 635, 651, 665 | do | 1 |
| 543, 545 | kilohms (adjustable) | 72 |
| 547 | ohms | 470 |
| 576, 668, 644 | kilohms | 6.8 |
| 622 | do | 22 |
| 642 | ohms | 270 |

*FIG. 16*

| | | |
|---|---|---|
| 681, 682, 686, 692 | kilohms | 2.2 |

*FIG. 17*

| | | |
|---|---|---|
| 753, 816, 845 | ohms | 470 |
| 754, 763, 859 | kilohms | 4.7 |
| 756, 765, 818 | do | 2.2 |
| 757, 823, 842, 846, 857 | do | 10 |
| 761, 813, 821, 837, 841, 855 | do | 1 |
| 793, 795, 803, 805, 819, 834, 839 | do | 6.8 |
| 814 | kilohm adjustable | 6.5 |
| 737 | kilohms | 22 |
| 847 | do | 560 |
| 848 | ohms | 330 |

*FIG. 22*

| | Kilohm |
|---|---|
| 1002, 1006, 1017, 1025, 1033, 1044 | 4.7 |
| 1008, 1009, 1019 | 1 |
| 1016 | 12 |
| 1023, 1029, 1043, 1032, 1026 | 2.2 |

*Capacitors*

*FIG. 15*

| | Microfarad |
|---|---|
| 505 | 0.15 |
| 523 | 0.01 |
| 529, 578 | 0.05 |
| 533 | 0.10 |
| 513 | 0.47 |
| 544 | 2 |
| 548, 558, 568 | 0.05 |

*FIG. 17*

| | |
|---|---|
| 703, 718, 762, 775, 741, 738, 815, 817, 836, 835, 838, 851 | 0.05 |
| 755 | 5 |
| 764, 849 | 1 |
| 843 | 2 |

*Voltage supplies*

*FIGS. 15, 16*

| | Volts |
|---|---|
| Line 506 | +10 |
| Line 645 | +24 |
| Line 617 | about +14 |
| Lines 623, 689, 685 | —10 |

*FIG. 17*

| | |
|---|---|
| Line 701 | +10 |

*FIG. 22*

| | Volts |
|---|---|
| B+ | +10 |
| C+ | +30 |
| E— | —10 |

In each of FIGS. 15, 16, 17 and 22, all of the illustrated diodes may be of type 1N456 with the exception of Zener diodes 656 (FIG. 15) and 739 (FIG. 17). The Zener diode 656 of FIG. 15 may be JEDEC type 1N3019A; Zener diode 739 of FIG. 17 may be type 1N4101A.

In FIGS. 15, 17 and 22, all NPN transistors may be type 2N1302. The PNP transistors in these same figures are type 2N1303. The transistors in FIG. 16 are type 2N525.

*Summary and conclusion*

In the foregoing description, the invention is described in connection with an automatic control system for a particular form of typewriter. Typewriter 31 is a convenient and efficient instrument for use with the control system because the internal mechanism of the typewriter itself provides for encoding of the individual characters. Thus, with this particular kind of typewriter it is not necessary to sense the movement of each individual key and to develop a characteristic code word signal representative of that key, because the typewriter mechanism provides selector bails and associated members that define each character in terms of a preselected code.

The present invention, however, can also be applied to advantage in other typewriter mechanisms. In a typewriter of the kind in which each key is linked directly to a movable type lever or other type element, individual sensing switches may be incorporated in the typewriter to detect movement of the keys, the type levers, or some other part of the connecting linkage for each character or function. The output signals from such sensing switches may be encoded, as by a conventional diode matrix or other convenient encoding apparatus. For playback operations, individual solenoids may be connected to each of the keys and may be actuated by the output signals from the control system, through a suitable de-coding circuit, which may again constitute a diode tree or like apparatus. On the other hand, a mechanical selection mechanism may be utilized, in a typewriter of this kind, to effect the decoding operation. As noted above, in a typewriter having a movable carriage, the control function with respect to that carriage is essentially the same as that employed in the system described above with respect to the movements of the type head 34. In the appended claims, references to a movable carrier that traverses a given path in the reproduction of a line of characters are intended to refer either to a movable type head, such as the type head 34, or to a movable carriage.

The invention may also be applied to other forms of business machines, such as bookkeeping and accounting machines. The control functions remain essentially the same, although there may be fewer characters entailed and a simpler code may be adopted in some instances.

In the foregoing specific description, references to speed of tape movement have been deliberately omitted. The tape speed for recording and playback is not particularly critical and is selected primarily on the basis of the capacity of the tape cartridge, availability of drive mechanisms, and other extraneous factors. A successful control system has been constructed using tape recording equipment operating at a speed of three and three-fourths inches per second; slower speeds of the order of two inches per second or even less are also quite practical. Of course, the lower the speed, the greater the capacity of a tape of given length with respect to recorded information. Hence, the tape speed should be held to the lowest level commensurate with accurate recording and reproduction.

It will be recognized that there is no necessity to utilize two tape cartridges in the system if the addressing modification (FIG. 13) is not employed. Thus, where each recorded message is to be reproduced in its entirety and without automatic addition of address or similar information, the system may be simplified by eliminating the second tape cartridge 62 and its associated drive and reading head. In this connection, it should also be noted that the basic addressing system need not include a reading head for a second track on the address tape, since in most applications there is no requirement for sensing of signals recorded on the auxiliary track of the address tape.

Some parts of the control system of the invention, as described above, are near duplicates of each other. Thus, and as noted in the foregoing description, the recording and reading heads may be physically integrated, using a single winding for both recording and reading purposes.

As noted above, both the recording system (FIG. 9) and the playback system (FIG. 10) require a timing means for duplicating a sequence of individual timing signals corresponding in number to the number of code bits in each code word. Furthermore, each of the individual timing circuits described hereinabove, the counters 255 (FIGS. 9 and 17) and 306 (FIGS. 10 and 15) must develop at least one additional signal that is a part of the same timing sequence. As actually constructed, in the detailed circuits illustrated above, each of the shift registers employed for timing purposes produces two additional timing signals in the same sequence with the signals employed for coding and encoding purposes. Moreover, the two timing devices 255 and 306 are never used simultaneously. Consequently, it will be apparent that the system may be modified to include but a single timing means that is employed both for recording and playback purposes without departing in any sense from the basic concept of the invention.

The two code storage means used for recording and playback are also closely related to each other. They register the same data at different times. Hence, a single storage register can be employed instead of the separate registers 251 (FIG. 9) and 317 (FIG. 10), with appropriate gating to convert from recording operation to playback and vice versa. Moreover, the recording AND circuits 261–266 (FIG. 9) are functional duplicates of playback AND circuits 311–316 (FIG. 10). A single group of AND devices, with appropriate switching in their input and output connections, may be utilized if desired.

In the foregoing description, the individual code words are set forth on the basis of the code levels in which individual selector latches of the typewriter are actuated in the course of a recording operation, and must consequently be actuated for print-out. Thus, the code word for the letter D has been expressed in the form 1346 (or 01346, in its recorded form), indicating that this letter is selected by actuation of the first, third, fourth and sixth character selection latches. Similar expressions have been used for the function codes, as evidenced by the "space" code word 1235.

On the other hand, and as will be apparent from examination of the sequential recording of FIG. 14, it would be equally possible to express the individual code words in accordance with conventional binary notation. Thus, if the value of one is added to a code bit requiring actuation of a selector latch, in the case of the character codes, and the value zero is assigned to a code bit which does not require the actuation of a latch, the code word 1346 for the letter D may be written as the binary number 101101. Similarly, the code word for the space function may be expressed as the binary number 010111. In each instance, an additional numeral one would be added, at the end, in the form of the code recorded on the magnetic tape, due to the presence of the "zero" level code pulse that starts each code word. The binary notation is applicable because, as recorded on the magnetic tape, the blank spaces between code bits are equally as significant as the recorded code bits themselves.

As noted above, the use of a high frequency signal as the recording signal affords a substantial advantages as compared with more conventional DC pulse recording. It is preferred that the operating frequency be well above sixty sycles per second, since it is desirable to include at least two full cycles in each recorded bit on the tape and also because it is desirable to avoid erroneous operation responsive to noise signals that might be recorded, even though at a low level, where the system is driven from a conventional sixty cycle source. At the same time, it is preferable to keep the recording frequency within the limitations of telephone lines and other conventional communication lines, usually about three thousand cycles, in the event that the system is to be operated over a communication link between the typewriter and the recording apparatus. Operating frequencies of one to three thousand cycles are preferred.

In some applications, it may be desirable to afford a more sophisticated arrangement for selecting individual letters or other messages from a tape containing a plurality of messages. Where the selection operation is to be employed quite frequently, the selector switch 56 at the front of the typewriter may be replaced, in the operating circuits, by a separate selector device. A selector apparatus of this nature, which would include a pulse signal generator and a settable counting apparatus, may be preset to the number of the desired message on the tape and started in operation, automatically repeating the selection operation until the required message is reached. The same device can be electrically connected in the print circuits to initiate playback and print out operations, automatically, when the selected letter is located.

In the specific description of the control system set forth hereinabove, the only source of auxiliary recorded information is the second tape cartridge 62. It will be recognized, however, that other forms of recorded data may be employed in the system. Thus, for automatic dating of letters or other messages, or similar operations, a separate small tape or other recording device may be incorporated in the control system, the required information being registered therein. To provide for insertion of such information in a letter or other message, a distinctive code word or combination of code words may be employed to identify, on the main record tape, the position at which the date or other pre-recorded matter is to be inserted. Of course, the auxiliary record would include an appropriate code, at the end thereof, to switch the system back to the main tape. Inasmuch as the basic control arrangement in a system of this kind is generally similar to that for the addressing modification described hereinabove in connection with FIG. 13, no specific circuits have been illustrated.

From the foregoing description, it wil be apparent that the control system of the present invention affords a practical and effective means for controlling a typewriter or other small business machine by recording initial operations of the machine on a magnetic tape and subsequently sensing that tape and actuating the typewriter to reproduce its original operations. The recording system is entirely independent of the speed of the typist; the requisite control data are recorded with the tape moving at a constant speed and with substantially constant spacing between code characters, despite any number of pauses of indeterminate length that may occur in the course of the original recording operation. Consequently, the system permits operation of the typewriter or related business machine at maximum speed on playback.

The magnetic tape record used by the invention is inexpensive and requires a minimum of storage space. It is convenient to handle and presents little possibility of breakage or other damage to the tape. The tape recording equipment required is of the simplest and most inexpensive kind. All basic information is recorded on a single track of a narrow, inexpensive tape.

With respect to the essentially single-track recording system of the present invention, it will be understood that it is not essential that a physically separate auxiliary track 289 be utilized for the carriage return signals and the start-of-message signals (see FIG. 9). Because these signals, and particularly the auxiliary return signal, may occurs simultaneously with code signals recorded on the main track 288, they should not be recorded on that main track in a form essentially identical with the character and function code signals. Since AC recording is employed, however, the auxiliary track signals may be superimposed on the main track by adopting a different operating frequency for the auxiliary oscillator-modulator 273. If this is done, the playback circuits are provided with suitable frequency-discrimination apparatus to segregate the auxiliary signals from the character and function code signals. Of course, other forms of multiplex recording may be employed, but frequency differentiation entails, in most instances, the least circuit complexity where it is desirable or essential to restrict recording to but one single track.

The use of AC recording for the code signals presents another advantage with respect to overall operation of the system. If the detector circuits in the playback system are provided with suitable frequency-discrimination characteristics, being tuned to the recording frequency, there is little likelihood that the system will be triggered to erroneous operation by switching transients and other noise signals if the recording apparatus is separated from the typewriter by a telephone line or other connecting link.

Hence, while preferred embodiments of the invention have been described and illustrated, it is to be understood that they are capable of variation and modification and we therefore do not wish to be limited to the precise details set forth, but desire to avail ourselves of such changes and alterations as fall within the purview of the following claims.

We claim:

1. An automatic control system for a keyboard-actuated business machine including character keys and function keys, comprising:

encoding means, including a plurality of sensing devices incorporated in said business machine, for developing electrical code signals comprising a series of characteristic code words representative of actuation of individual character and function keys;

recording means, coupled to said encoding means, for recording each code word as a "zero" code bit followed by a spaced sequence of code bits on a single recording track of a magnetic tape, individual code bits being recorded by magnetizing given lengths of the tape, the length of tape magnetized for said "zero" code bit being substantially different than the lengths magnetized for the succeeding code bits in each word;

playback means for sensing and converting said sequences of code bits, from said magnetic tape, into parallel code signals;

and electrically operated machine actuation means, incorporated in said business machine and coupled to said playback means, for actuating said machine, in response to said parallel code signals, to cause said machine to duplicate all of the machine actions initially effected by said character and function keys.

2. In an automtaic control system for a typewriter or like business machine actuated by a keyboard including a plurality of character keys and function keys, said control system including sensing means, incorporated in said machine, for sensing actuation of each of said character keys and function keys, a recording system comprising:

code storage means, coupled to said sensing means, for temporarily storing a single code word identifying actuation of any one of the keys of said machine, the code words for both kinds of keys being encoded in accordance with a common code and each including a predetermined number of code bits;

timing means for developing a sequence of individual timing signals, at least equal in number to said number of code bits and equally spaced in time, upon recording of any code word in said storage means;

a magnetic recording head;

a tape drive for moving a magnetic record tape past said recording head at a preselected constant speed;

a high-frequency oscillator having an output coupled to said recording head;

means for actuating said tape drive continuously over a period of time beginning immediately prior to each timing signal sequence and continuing throughout the time interval required for said timing signal sequence and for automatically interrupting said tape drive after completion of each timing signal sequence;

and modulating means, coupled to said code storage means and to said timing means, to modulate the output of said oscillator on a timed basis in accordance with the code word stored in said storage means during each time period in which said tape drive is actuated and thereby record each code word on said tape as a coded series of high-frequency burst signals.

3. In an automatic control system for a typewriter or like business machine actuated by a keyboard including a plurality of character keys and function keys, said control system including sensing means, incorporated in said machine, for sensing actuation of each of said character keys and function keys, a recording system comprising:

code storage means, coupled to said sensing means, for temporarily storing code words identifying individual actuated keys of said machine, the code words for both kinds of keys being encoded in accordance with a common code and each including a predetermined number $n$ of code bits;

timing means, comprising a series of at least $n+2$ monostable trigger circuits, for developing a sequence of $n+2$ individual timing signals, equally spaced in time, upon recording of any code word in said storage means;

a magnetic recording head;

a tape drive for moving a magnetic record tape past said recording head at a preselected constant speed;

a high-frequency oscillator having an output coupled to said recording head;

means for actuating said tape drive continuously throughout the time interval required for said timing means to develop each said equence of timing signals and for automatically interrupting said tape drive after completion of each timing signal sequence;

modulating means, coupled to said code storage means and to said timing means, to modulate the output of said oscillator on a timed basis in accordance with the initial timing signal from said timing means and further in conjoint accordance with $n$ succeeding timing signals and a code word stored in said storage means to thereby record the code word on said tape as a coded series of high-frequency burst signals always preceded by an initial high-frequency signal burst;

and reset means for re-setting said storage means in response to the last timing signal from said timing means.

4. In an automatic control system for a typewriter or like keyboard-actuated business machine of the kind comprising a unitary type head, means for moving said type head along a given path to reproduce a line of characters and for returning said type head along said path to an initial position to begin a new line, $n$ positioning devices, actuated by a plurality of character keys to position said type head for selective reproduction of individual characters in accordance with an $n$ level binary code in which a particular combination of two code bits is not utilized, and a plurality of function keys including a return key, a recording system comprising:

$n$ character code sensing devices, one for each positioning device, for developing parallel character code signals in said $n$ level code in response to actuation of said positioning devices;

a plurality of function sensing devices, one for each function key;

an encoding circuit, coupled to said function sensing devices, for developing parallel function code signals in said *n*-level binary code representative of individual machine functions, each function code signal including the aforesaid combination of two code bits not utilized in the character codes to distinguish the function codes from the character codes;

parallel-to-series converter means, coupled to said character code sensing devices and to said encoding circuit, for converting said character and function code signals to individual series code words each including a series of code bits, each code word having an additional "zero" bit added at the beginning thereof;

magnetic tape recording means, coupled to said converter means, for recording a message reproduced by said machine as a sequence of series code words on a magnetic tape, each recorded code bit of one binary value including a given number of cycles of a high frequency AC signal, said "zero" bit including a substantially larger number of cycles of said AC signal;

a record control device for initiating operation of said recording system;

a return duration sensing device for sensing return movement of said type head;

and means coupling said return control device and said return duration sensing device to said magnetic tape recording means to advance the tape and establish a blank tape interval of substantial length corresponding to the beginning of each recorded message and each recorded line.

5. An automatic control system for a keyboard-actuated business machine including character keys and function keys, comprising:

encoding means, including a plurality of sensing devices incorporated in said business machine, for developing electrical code signals comprising a series of characteristic code words representative of actuation of individual character and function keys in the course of reproduction of a message by said business machine;

recording means, coupled to said encoding means, for recording each code word as a spaced sequence of binary code bits on a single recording track of a magnetic tape, individual code bits of one binary value being recorded as magnetized elements of one magnetic state on said tape and code bits of opposite binary value comprising elements of a substantially different magnetic state on said tape;

record control means for actuating said encoding means and said recording means between a recording condition and a non-recording condition, said record control means including means for establishing a blank section of predetermined length at the beginning of each message recorded on said tape;

playback means for sensing and converting said sequences of code bits, from said magnetic tape, into parallel code signals;

electrically operated machine actuation means, incorporated in said business machine and coupled to said playback means, for actuating said machine, in response to said parallel code signals, to cause said machine to duplicate all of the machine actions initially effected by said character and function keys in reproducing a message;

print control means for actuating said playback means and said machine actuation means between a print out condition and a non-printing condition, said print control means including time delay means for deferring actual print out during sensing of said blank section of said tape at the beginning of a message;

and stop circuit means interlocking said print control means and said record control means to preclude simultaneous actuation thereof.

6. An automatic control system for a keyboard-actuated business machine according to claim 5, said control system further including manual control means, having a first output coupled to said encoding means and a second output coupled to said stop circuit means, for actuating said encoding means to record a "manual" code on said tape and subsequently automatically actuating said stop circuit means to interrupt recording operations.

7. An automatic control system for a keyboard-actuated business machine according to claim 5, said control system further including end-of-message control means comprising:

an EOM control switch having first and second output circuits producing momentary first and second output signals, in time sequence, upon actuation of said switch, said first output circuit being coupled to said encoding means to record an EOM code word on said tape;

time delay means coupled to said second output circuit of said EOM control switch and to said recording means to advance said magnetic tape for a predetermined time interval following said EOM code word without recording additional data on the tape;

said time delay means further being coupled to said stop circuit means to actuate said stop circuit means and interrupt recording operations upon termination of said time interval.

8. In an automatic control system for a typewriter or like keyboard-actuated business machine including a recording system, for recording machine operations as code signals on a magnetic tape, and a playback system, including a tape reading head, for actuating the machine in accordance with such recorded messages, adjacent code messages being spaced from each other longitudinally of the tape in a given direction, with a start-of-message signal that is distinctively different from said code messages recorded at the start of each message, a message selection control comprising:

detector means, including said reading head, for detecting said start-of-message signals;

tape advancing means for advancing the tape past said reading head in said given direction;

rewind means for driving the tape in the reverse direction;

selection actuating means for actuating said detector means and said tape advancing means, said actuating means including a time delay device for deferring actuation of said detector means for a predetermined time interval after actuation of said tape advancing means to prevent the detector means from detecting the first start-of-message signal on the tape;

initial stop means, coupling said detector means to said tape advancing means, for interrupting tape advance, near the beginning of a message, upon detection of a start-of-message signal on the tape;

reversing means for actuating said rewind means in response to actuation of said initial stop means;

and final stop means for interrupting operation of said rewind means upon further detection of the same start-of-message signal by said detector means, ending selection operation with a blank space on the tape aligned with said reading head.

9. In an automatic control system for a typewriter or like keyboard-actuated business machine including a recording system, for recording machine operations as code signals on a magnetic tape, and a playback system, including a tape reading head, for actuating the machine in accordance with such recorded messages, adjacent code messages being spaced from each other longitudinally of the tape in a given direction, the tape having a long start-of-message signal recorded at the start of each message and a short end-of-line signal recorded at the end of each line of the message, both such signals being distinctively different from the recorded code signals comprising the messages, a message selection control comprising:

detector means, including said reading head and a detector circuit connected thereto, for detecting said start-of-message signals, said detector circuit having a time-delay operating characteristic rendering said circuit insensitive to said end-of-line signals;

tape advancing means for advancing the tape past said reading head in said given direction;

rewind means for driving the tape in the reverse direction;

selection actuating means for actuating said detector means and said tape advancing means, said actuating means including a time delay device for deferring actuation of said detector means for a predetermined time interval after actuation of said tape advancing means to prevent the detector means from detecting the first start-of-message signal on the tape;

initial stop means, coupling said detector means to said tape advancing means, for interruputing tape advance, near the beginning of a message, upon detection of a start-of-message signal on the tape;

reversing means for actuating said rewind means in response to actuation of said initial stop means;

and final stop means for interrupting operation of said rewind means upon further detection of the same start-of-message signal by said detector means, ending selection operation with a blank space on the tape aligned with said reading head.

10. In an automatic control system for a typewriter or like keyboard-actuated business machine including a recording system, for recording machine operations as code signals displaced successively in a given direction on a magnetic tape, and a playback system, including a tape recording-reading head, for actuating the machine in accordance with such recorded code signals, successive line groups of code signals and successive code messages, each being spaced longitudinally of the tape, and the tape having recorded start-of-message signals and end-of-line signals that are distinctively different from said code signals and from each other, a correction control comprising:

detector means, including said tape recording-reading head, for detecting both said start-of-message and said end-of-line signals;

tape advancing means for advancing the tape past said reading head in said given direction at a slow speed;

rewind means for driving the tape in the reverse direction at a relatively high speed;

correction actuating means for actuating said detector means and said rewind means;

initial stop means, coupled to said detector means and to said rewind means, for interrupting tape rewind, near the beginning of a message line, upon detection of either a start-of-message signal or an end-of-line signal on the tape;

reversing means for actuating said tape advancing means in response to actuation of said initial stop means;

and final stop means for subsequently interrupting operation of said tape advancing means and ending tape movement with a blank space on the tape aligned with said head.

11. In an automatic control system for a typewriter or like keyboard-actuated business machine including a recording system, for recording machine operations as code signals displaced successively in a given direction and recorded at a given tape speed on a magnetic tape, and a playback system, including a tape reading head for reading said tape at said given tape speed, for actuating the machine in accordance with such recorded code signals successive line groups of code signals and successive code messages each being spaced longitudinally of the tape, and the tape having recorded start-of-message signals and end-of-line signals that are distinctively different from said code messages and from each other, a correction control comprising:

control signal detector means, coupled to said reading head, for detecting both said start-of-message and said end-of-line signals;

code signal detector means, coupled to said reading head, for detecting the presence of said code signals;

tape advancing means for advancing the tape past said reading head in said given direction at said given tape speed;

rewind means for driving the tape in the reverse directions at a substantially greater speed;

correction actuating means for actuating said control signal detector means and said rewind means;

initial stop means, coupled to said control signal detector means and to said rewind means, for interrupting tape rewind, near the beginning of a message line, upon detection of either a start-of-message signal or an end-of-line signal on the tape;

reversing means for actuating said tape advancing means and said code signal detector means in response to actuation of said initial stop means;

and final stop means, coupled to said code signal detector means, for interrupting operation of said tape advancing means, ending tape movement with a blank space on the tape aligned with said reading head, whenever said code signal detector detects a space of substantial length in said code signals.

12. In an automatic control system for a typewriter or like keyboard-actuated business machine including a recording system, for recording machine operations as code signals displaced successively in a given direction on main track of a magnetic tape, and a playback system, including a two-track tape reading head, for actuating the machine in accordance with such recorded message, successive groups of code signals, pertaining to adjacent lines of a code message, and successive code messages each being spaced longitudinally of the tape, and the tape further having start-of-message control signals and end-of-line control signals that are distinctively different from each other recorded on an auxiliary track of said tape;

a position-locating control comprising:

detector means, including a portion of said reading head, for detecting both of said control signals;

forward tape moving means for advancing the tape past said reading head in said given direction;

reverse tape moving means for driving the tape in the reverse direction;

actuating means for actuating said detector means and a first one of said tape moving means;

initial stop means, coupled to said detector means, for interrupting tape movement, upon detection of a control signal on the tape;

reversing means for actuating the second of said tape moving means in response to actuation of said initial stop means;

and final stop means for again interrupting tape movement with a blank space on the tape aligned with said reading head.

13. A position-locating control for an automatic control system for a keyboard-actuated business machine, according to claim 12, comprising:

additional detector means sensitive to only one of said control signals;

additional actuating means for actuating said additional detector means and the second of said tape moving means;

and said stop means and reversing means performing their functions with respect to said additional detector and actuating means as well as the original detector and actuating means.

14. An automatic control system for controlling operation of a keyboard-actuated business machine in accordance with recorded data from a principal record and an auxiliary record, said principal record comprising a magnetic tape having a message recorded thereon in accordance with a predetermined signal code, said message ending with a given end-of-message (EOM) function code signal, said auxiliary record comprising at least one auxiliary message recorded in accordance with the same code, said auxiliary message ending in an auxiliary function code signal, said system comprising:

a principal sensing device for sensing said principal record;

an auxiliary sensing device for sensing said auxiliary record;

playback means, having first and second inputs coupled to said principal and auxiliary sensing devices, respectively, for converting the recorded signals from said records into electrical actuating signals;

electrically operated machine actuating means, incorporated in said business machine and coupled to said playback means, for actuating said machine in response to said electrical actuating signals to reproduce the machine functions represented by the code signals of said records;

and switching means, included in said playback means, for switching said playback means from its second input to its first input upon sensing of said auxiliary code from said auxiliary record.

15. An automatic control system for controlling operation of a keyboard-actuated business machine in accordance with recorded data from a principal record and an auxiliary record, said principal record constituting a magnetic tape having a message recorded thereon in accordance with a predetermined signal code, said message ending with a given end-of-message (EOM) function code signal, said auxiliary record comprising a plurality of auxiliary messages recorded in accordance with the same code, said auxiliary messages each ending in an auxiliary function code signal, said system comprising:

a principal sensing device for sensing said principal record;

an auxiliary sensing device for sensing said auxiliary record;

playback means, having first and second inputs coupled to said principal and auxiliary sensing devices, respectively, for converting the recorded signals from said records into electrical actuating signals;

electrically operated machine actuating means, incorporated in said business machine and coupled to said playback means, for actuating said machine in response to said electrical actuating signals to reproduce the machine functions represented by the code signals of said records;

switching means, included in said playback means, for switching said playback means from its second input to its first input upon sensing of said auxiliary code signal from said auxiliary record, without interrupting playback operations;

and control means for interrupting operation of said playback means and for rewinding said magnetic tape upon sensing of said EOM code signal from said principal record.

16. An automatic control system for controlling operation of a typewriter in accordance with recorded data from a principal record and an auxiliary record, said principal record comprising a first magnetic tape having a message recorded thereon in accordance with a predetermined signal code, which message may include at least one auxiliary function code signal and ends with an end-of-message (EOM) function code signal, said auxiliary record comprising a second magnetic tape having auxiliary messages recorded thereon in accordance with the same code, each of which auxiliary messages may include an auxiliary function code signal and ends in an auxiliary function code signal, said system comprising:

a principal reading head and tape drive for sensing said principal record;

an auxiliary reading head and tape drive for sensing said auxiliary record;

playback means, having first and second inputs coupled to said principal and auxiliary reading heads, respectively, for converting the recorded signals from said records into electrical actuating signals;

electrically operated machine actuating means, incorporated in said business machine and coupled to said playback means, for actuating said machine in response to said electrical actuating signals to reproduce the machine functions represented by the code signals of said records;

and switching means, included in said playback means, for energizing said principal tape drive upon sensing of said auxiliary code signal from said auxiliary record and for energizing said auxiliary tape drive upon sensing of said auxiliary code signal from said principal record, said switching means being effective to prevent simultaneous energization of the two tape drives.

17. In an automatic control system for a typewriter or like keyboard-actuated business machine of the kind comprising a unitary type head, operating components including *n* positioning devices operable to position said type head for selective reproduction of individual characters in accordance with an *n* level binary code, and a plurality of function mechanisms, and further comprising a frame supportnig said operating components, a recording system comprising:

an auxiliary frame, including at least one auxiliary frame member, mounted in said machine at the base of the machine by a plurality of clamp members engaging the machine frame;

encoding means, including a plurality of sensing switches mounted on said auxiliary frame and each including a sensing element engaging a respective one of said operating components, for developing parallel code signals in said *n* level code representative of each individual machine character and machine function;

parallel-to-series converter means, coupled to said character code sensing switches and to said encoding circuit, for converting said parallel code signals to individual series code words each including a series of code bits;

magnetic tape recording means, coupled to said converter means, for recording said series code words on a magnetic tape;

playback means for sensing and converting said recorded code words, from said magnetic tape, into parallel code signals;

and electrically operated machine actuation means, including one operating solenoid for each sensing switch, mounted on said auxiliary frame in said business machine and each electrically coupled to said playback means, for actuating said operating components of said machine, in response to respective ones of said parallel code signals, to cause said machine to duplicate all of the recorded machine actions.

18. In an automatic control system for a typewriter or like business machine actuated by a keyboard including a plurality of character keys and function keys, one of which a carrier return key, said control system including sensing means, incorporated in said machine, for sensing actuation of each of said character keys and function keys, a recording system comprising:

code storage means, coupled to said sensing means, for temporarily storing code words identifying individual actuated keys of said machine, the code words for both kinds of keys being encoded in accordance with a common binary code and each including a predetermined maximum number of code bits;

timing means for developing a sequence of individual timing signals, at least equal in number to said number of code bits and equally spaced in time;

a magnetic recording head including first and second recording elements;

a tape drive for moving a magnetic record tape past said recording head at a preselected constant speed;

recording signal source means for supplying recording signals to said first and second recording elements;

means for actuating said tape drive continuously throughout the time interval required for said timing means to develop each said sequence of timing signals and for automatically interrupting said tape drive after completion of each timing signal sequence;

first gating means, coupled to said recording signal source means, to said code storage means, and to said timing means, to gate the output from said recording signal source means to said first recording element on a timed basis in accordance with each code word to thereby record each code word on a first track of said tape as a coded series of binary signals;

record initiating means for conditioning all of the foregoing elements of the system for a recording operation;

and second gating means for gating the output of said signal source means to said second recording element in response to actuation of said record initiating means and in response to actuation of said carrier return key to record distinguishable "record" and "return" signals on a second track of said tape.

19. A recording system for automatic control of a typewriter or like keyboard-actuated business machine, according to claim 18, in which said code storage means comprises a code storage register of *n* stages, *n* being equal to said maximum number of code bits, in which said timing means develops a sequence of at least *n* individual timing signals on individual output circuits, in which said recording signal source means comprises a high frequency oscillator, and in which said first gating means comprising a group of *n* AND circuits each having two inputs, one input coupled to an individual stage of said storage register and the other input coupled to an individual output circuit of said timing means.

20. A recording system for automatic control of a typewriter or like keyboard-actuated business machine, according to claim 18, said machine including a manual key and an end-of-message key, said code storage means including a code storage register coupled to said sensing means and to said manual key and said end-of-message key, said recording system further comprising power supply means for actuating the system and means for cutting off said power supply means upon actuation of either of said manual and end-of-message keys.

21. A recording system for automatic control of a typewriter or like keyboard-actuated business machine, according to claim 18, in which one of said function keys is a shift key and said sensing means includes a shift function sensing device, said system further comprising a bistable trigger circuit, interposed between said shift function sensing device and said code storage means and having two output circuits coupled to said code storage means, said trigger circuit producing a momentary output signal on one of said output circuits whenever the shift key is depressed and producing a momentary output signal on its other output circuit whenever the shift key is released to provide for the storage of both upper case and lower case code signals in said code storage means.

22. A recording system for automatic control of a typewriter or like key-board-actuated business machine, according to claim 18, said machine including a carrier member that transverses a given path for reproduction of a line of characters, one of said function keys being a return key for returning said carrier member to an initial position to being a new line, said recording system further comprising:

a sensing device for sensing return movement of said carrier member along said path toward its initial position;

and blanking means, coupled to said sensing device, for actuating said tape drive for a return time interval substantially longer than said recording time interval during return movement of said carrier member to afford a blank space on said tape identifying said return time interval.

23. A recording system for automatic control of a typewriter or like keyboard-actuated business machine, according to claim 22, in which said blanking means actuates the tape drive continuously during return movement of said carrier member whereby said return time interval corresponds to the time interval required for complete return movement of said carrier member.

24. In an automatic control system for a typewriter or like keyboard actuated business machine comprising a carrier member that traverses a given path in an advancing direction for reproduction of a line of characters and that traverses said path in a return direction to an initial position to begin a new line, said business machine having a keyboard comprising a plurality of character keys and function keys, including a carrier return function key, a recording system comprising:

a magnetic recording head;

a tape drive for moving a magnetic recording tape past said recording head at a given recording speed;

sensing means for sensing actuation of said character keys and function keys;

encoding and conversion means, coupled to said sensing means, to said tape drive, and to said recording head, for actuating said tape drive and said recording head, under control of said sensing means, to record on a single channel of the tape a sequence of substantialy equally spaced individual series binary code words representative of actuation of the individual character and function keys of said machine;

and blank means, actuated by said carrier return key, for actuating said tape drive during each return interval to afford a blank space on the tape identifying said return interval.

25. A recording system for automatic control of a typewriter or like keyboard-actuated business machine, according to claim 24, in which said magnetic recording head includes two separate recording windings, said encoding and conversion means is coupled to a first recording winding of said recording head to record on a first track of the magnetic tape; and said system further including means, coupled to said blanking means and to said second recording winding of said magnetic head, for recording a signal representative of the initiation of each return movement of said carrier on a second track of the tape.

26. A recording system for automatic control of a typewriter or like keyboard-actuated business machine, according to claim 25, said system further including a record operation initiation device and means coupling said record operation intiating device to said tape drive and to said second recording winding to record start-of-message signals identifying the beginning of each recording operation on said second track of the tape, said start-of-message signals and said return signals on said second track being substantially different from each other to distinguish therebetween.

References Cited

UNITED STATES PATENTS

| | | | |
|---|---|---|---|
| 3,277,454 | 10/1966 | Chao | 340—174.1 |
| 3,124,645 | 3/1964 | Whitney | 178—17.5 |
| 3,119,988 | 1/1964 | Barry | 340—174.1 |
| 3,115,620 | 12/1963 | Cooper et al. | 197—19 |
| 2,838,603 | 6/1958 | Hudec | 178—17.5 |
| 2,767,243 | 10/1956 | Steeneck | 178—17.5 |
| 2,700,067 | 1/1955 | Lockemann et al. | 178—17.5 |
| 3,153,240 | 10/1964 | Walter | 340—174.1 |
| 3,119,996 | 1/1964 | Comstock | 340—345 |
| 3,025,941 | 3/1962 | Blodgett et al. | 197—20 |

BERNARD KONICK, *Primary Examiner.*

A. I. NEUSTADT, *Assistant Examiner.*